US010679298B2

(12) United States Patent
Ehrhart et al.

(10) Patent No.: US 10,679,298 B2
(45) Date of Patent: Jun. 9, 2020

(54) DASHBOARD INTERFACE, PLATFORM, AND ENVIRONMENT FOR AUTOMATED NEGOTIATION, BENCHMARKING, COMPLIANCE, AND AUDITING

(71) Applicant: AON SINGAPORE CENTRE FOR INNOVATION STRATEGY AND MANAGEMENT PTE., LTD., Singapore (SG)

(72) Inventors: Bryon Gerard Ehrhart, Chicago, IL (US); Nichole Benson, Burnsville, MN (US)

(73) Assignee: AON SINGAPORE CENTRE FOR INNOVATION STRATEGY AND MANAGEMENT PTE., LTD., Singapore (SG)

( * ) Notice: Subject to any disclaimer, the term of this patent is extended or adjusted under 35 U.S.C. 154(b) by 323 days.

(21) Appl. No.: 15/667,317

(22) Filed: Aug. 2, 2017

(65) Prior Publication Data
US 2017/0330285 A1 Nov. 16, 2017

Related U.S. Application Data

(63) Continuation-in-part of application No. 15/198,797, filed on Jun. 30, 2016, now Pat. No. 9,741,078.
(Continued)

(51) Int. Cl.
*G06Q 40/08* (2012.01)
*G06Q 50/18* (2012.01)
(Continued)

(52) U.S. Cl.
CPC .......... *G06Q 40/08* (2013.01); *G06F 3/0481* (2013.01); *G06F 3/0482* (2013.01); *G06F 16/93* (2019.01);
(Continued)

(58) Field of Classification Search
CPC ........ G06Q 40/08; G06Q 10/06; G06Q 40/04; G06Q 40/12; G06Q 50/188; G06F 16/93;
(Continued)

(56) References Cited

U.S. PATENT DOCUMENTS 6,594,635 B1 * 7/2003 Erlanger ............ G06Q 30/0207
701/1
6,807,635 B1 10/2004 Kleckner
(Continued)

OTHER PUBLICATIONS

SAP. "Apps for SAP Quotation and Underwriting for Insurance". Retrieved from <https://help.sap.com/doc/PRODUCTION/3b458e683c61426cb45d8ee581c1f1ce/3.0.04.3/en-US/FSIPW_10SP06_AppsOverview.en-US.pdf> on Aug. 16, 2019. Originally published Dec. 2016. (Year: 2016).*
(Continued)

*Primary Examiner* — Nathan A Mitchell
(74) *Attorney, Agent, or Firm* — Gardella Grace P.A.

(57) ABSTRACT

In an illustrative embodiment, an automated system provides for automatic negotiation, benchmarking, compliance, and auditing. The system may include computing systems and devices for receiving a request for transmitting a message to a remote party, and in response, providing a customization user interface including a message template with editable and non-editable input fields as well as a document selection interface for linking documents to the message. Message recipients associated with the remote party may be identified as having security access permissions corresponding to access parameters for the linked documents. In response to receiving inputs for the editable input fields, the message template may be converted to a message transmission format for transmitting the message with the one or more linked documents and transmitted to the remote party. The message and linked documents may be stored in at least one portion of a data repository.

19 Claims, 46 Drawing Sheets

Related U.S. Application Data

(60) Provisional application No. 62/262,880, filed on Dec. 3, 2015.

(51) Int. Cl.

| | | |
|---|---|---|
| *G06Q 40/00* | (2012.01) | |
| *H04L 29/06* | (2006.01) | |
| *H04L 12/58* | (2006.01) | |
| *G06F 3/0482* | (2013.01) | |
| *G06F 16/93* | (2019.01) | |
| *G06Q 40/04* | (2012.01) | |
| *G06Q 10/06* | (2012.01) | |
| *G06F 3/0481* | (2013.01) | |
| *G06F 40/186* | (2020.01) | |
| *G06F 3/0484* | (2013.01) | |

(52) U.S. Cl.
CPC ........... *G06F 40/186* (2020.01); *G06Q 10/06* (2013.01); *G06Q 40/04* (2013.01); *G06Q 40/12* (2013.12); *G06Q 50/188* (2013.01); *H04L 51/08* (2013.01); *H04L 63/105* (2013.01); *G06F 3/04847* (2013.01)

(58) Field of Classification Search
CPC .... G06F 3/0481; G06F 3/0482; G06F 17/248; G06F 3/04847; H04L 51/08; H04L 63/105
See application file for complete search history.

(56) References Cited

U.S. PATENT DOCUMENTS

| | | | |
|---|---|---|---|
| 7,130,823 B1 | 10/2006 | Rayner et al. | |
| 7,599,860 B2 | 10/2009 | Bird et al. | |
| 8,301,544 B2 | 10/2012 | Chatter et al. | |
| 8,463,624 B2* | 6/2013 | Hashim | G06Q 10/0633 |
| | | | 705/4 |
| 8,635,140 B2* | 1/2014 | Ziade | G06Q 40/00 |
| | | | 283/57 |
| 8,719,063 B1* | 5/2014 | Wade | G06Q 40/08 |
| | | | 705/4 |
| 8,739,030 B2 | 5/2014 | Ahuja et al. | |
| 9,025,938 B2 | 5/2015 | Roberts, Jr. et al. | |
| 9,741,078 B2 | 8/2017 | Ehrhart | |
| 9,747,556 B2* | 8/2017 | Garrison | G06F 16/958 |
| 9,940,678 B2* | 4/2018 | Propati | G06Q 40/00 |
| 2001/0042936 A1 | 11/2001 | Kessel et al. | |
| 2002/0032646 A1* | 3/2002 | Sweeney | G06Q 40/02 |
| | | | 705/38 |
| 2002/0082875 A1* | 6/2002 | Best-Devereux | G06Q 40/00 |
| | | | 705/4 |
| 2002/0152098 A1* | 10/2002 | Evans | G06Q 40/08 |
| | | | 705/4 |
| 2003/0033212 A1 | 2/2003 | Sandhu et al. | |
| 2004/0186750 A1* | 9/2004 | Surbey | G06Q 10/10 |
| | | | 705/4 |
| 2005/0055299 A1* | 3/2005 | Chambers | G06Q 40/04 |
| | | | 705/36 R |
| 2005/0071203 A1* | 3/2005 | Maus | G06Q 40/02 |
| | | | 705/4 |
| 2005/0256797 A1 | 11/2005 | Tyulyaev | |
| 2007/0150299 A1 | 6/2007 | Flory | |
| 2008/0294468 A1* | 11/2008 | Toland, Jr. | G06Q 40/00 |
| | | | 705/4 |
| 2011/0151831 A1 | 6/2011 | Pattabiraman | |
| 2012/0215711 A1 | 8/2012 | Brief et al. | |
| 2012/0284641 A1 | 11/2012 | Sitrick et al. | |
| 2013/0246901 A1 | 9/2013 | Massand | |
| 2013/0339065 A1* | 12/2013 | Denning | G06Q 40/08 |
| | | | 705/4 |
| 2014/0164255 A1 | 6/2014 | Daly et al. | |
| 2014/0298207 A1 | 10/2014 | Ittah et al. | |
| 2015/0269628 A1 | 9/2015 | Urtso et al. | |
| 2016/0125511 A1* | 5/2016 | Shaaban | G06F 17/40 |
| | | | 705/26.81 |
| 2017/0161838 A1 | 6/2017 | Ehrhart | |

OTHER PUBLICATIONS

Non-Final Office Action issued in U.S. Appl. No. 15/198,797 dated Jan. 10, 2017.

Notice of Allowance issued in U.S. Appl. No. 15/198,797 dated Apr. 12, 2017.

Extended European Search Report issued in EP Application No. 16870055.7 dated Jul. 11, 2019.

International Search Report and Written Opinion issued in International Application No. PCT/IB2016/001848 dated May 15, 2017.

International Preliminary Report on Patentability issued in International Application No. PCT/IB2016/001848 dated Jun. 5, 2018.

\* cited by examiner

FIG. 3C

| Layer 1 | | | | |
|---|---|---|---|---|
| | Effective Date | Quote | Wait for Firm Order | Decline |
| ☐ ABCP Property Cat XOL (3 Layers) 334 | | | | |
| First Layer 332a | 12/18/2015 | | | |
| Second Layer 332b | 12/18/2015 | ○ | ○ | ○ |
| Third Layer 332c | 12/18/2015 | ○ | ○ | ○ |

First Layer 336
Layer Details
○ Quote  ○ Wait for Firm Order  ○ Decline
   338a         338b              338c Estimated Subject Premium: 200,000

Number of Reinstatements:

Reinstatement on Same Event:

Ceded Premium Basis:

Earned

Limit: 5,000,000

Retention:

| Quote ContractSectionID | Editable | FieldName | DataType | Quote ContractSection | Displayed |
|---|---|---|---|---|---|
| 400040030 | TRUE | OccurrenceLimit | Money | 115000 | 115000 |
| 400040030 | TRUE | PerPersonLimit | Money | 20000 | 20000 |
| 400040030 | | ValidateBusinessSegmentID | Char | 9 | Workers Co |
| 400040030 | | BrokerageRate | Float | 2.50% | 2.50% |
| 400040030 | | MarginDollars | Money | 55000 | 55000 |
| 400040030 | | ThruDate | DateTime | 12/31/2015 | 12/31/2015 |
| 400040031 | TRUE | OccurrenceLimit | Money | | |
| 400040031 | TRUE | PerPersonLimit | Money | | |
| 400040031 | | ValidateBusinessSegmentID | Char | 9 | Workers Co |
| 400040031 | | BrokerageRate | Float | 2.50% | 2.50% |
| 400040031 | | MarginDollars | Money | 10000 | 10000 |
| 400040031 | | ThruDate | DateTime | 12/31/2015 | 12/31/2015 |

604a, 604b, 606a, 606b, 608, QuoteContractSection 602, ValidateBusinessSegment, QuoteTemplate 550, 600

FIG. 6A

| Quote ContractSectionID | Editable | FieldName | DataType | Quote ContractSection | Quote A Not Submitted | 612 |
|---|---|---|---|---|---|---|
| 400040030 | TRUE | OccurrenceLimit | Money | 115000 | 125000 | 612a |
| 400040030 | TRUE | PerPersonLimit | Money | 20000 | 25000 | 612b |
| 400040030 | | ValidateBusinessSegmentID | Char | 9 | | |
| 400040030 | | BrokerageRate | Float | 2.50% | | |
| 400040030 | | MarginDollars | Money | 55000 | | |
| 400040030 | | ThruDate | DateTime | 12/31/2015 | | |
| 400040031 | TRUE | OccurrenceLimit | Money | | 12500 | 612c |
| 400040031 | TRUE | PerPersonLimit | Money | | | 612d |
| 400040031 | | ValidateBusinessSegmentID | Char | 9 | | |
| 400040031 | | BrokerageRate | Float | 2.50% | | |
| 400040031 | | MarginDollars | Money | 10000 | | |
| 400040031 | | ThruDate | DateTime | 12/31/2015 | | |

| Quote ContractSectionID | Editable | FieldName | DataType | Quote ContractSection | Quote A Not Submitted |
|---|---|---|---|---|---|
| 400040030 | TRUE | OccurrenceLimit | Money | 115000 | 125000 — 612a |
| 400040030 | TRUE | PerPersonLimit | Money | 20000 | 2500 — 612b |
| 400040030 | | ValidateBusinessSegmentID | Char | 9 | |
| 400040030 | | BrokerageRate | Float | 2.50% | |
| 400040030 | | MarginDollars | Money | 55000 | |
| 400040030 | | ThruDate | DateTime | 12/31/2015 | |
| 400040031 | TRUE | OccurrenceLimit | Money | | 12500 — 612c |
| 400040031 | TRUE | PerPersonLimit | Money | | 5000 — 612d |
| 400040031 | | ValidateBusinessSegmentID | Char | 9 | |
| 400040031 | | BrokerageRate | Float | 2.50% | |
| 400040031 | | MarginDollars | Money | 10000 | |
| 400040031 | | ThruDate | DateTime | 12/31/2015 | |

| Quote ContractSectionID | Editable | FieldName | DataType | Quote ContractSection | Quote A Submitted | Displayed |
|---|---|---|---|---|---|---|
| 400040030 | TRUE | OccurrenceLimit | Money | 115000 | 125000 | 125000 |
| 400040030 | TRUE | PerPersonLimit | Money | 20000 | 25000 | 25000 |
| 400040030 | | ValidateBusinessSegmentID | Char | 9 | | WorkersCo |
| 400040030 | | BrokerageRate | Float | 2.50% | | 2.50% |
| 400040030 | | MarginDollars | Money | 55000 | | 55000 |
| 400040030 | | ThruDate | DateTime | 12/31/2015 | | 12/31/2015 |
| 400040031 | TRUE | OccurrenceLimit | Money | | 12500 | 12500 |
| 400040031 | TRUE | PerPersonLimit | Money | | 5000 | 5000 |
| 400040031 | | ValidateBusinessSegmentID | Char | 9 | | WorkersCo |
| 400040031 | | BrokerageRate | Float | 2.50% | | 2.50% |
| 400040031 | | MarginDollars | Money | 10000 | | 10000 |
| 400040031 | | ThruDate | DateTime | 12/31/2015 | | 12/31/2015 |
| 400040032 | TRUE | OccurrenceLimit | Money | | | |
| 400040032 | TRUE | PerPersonLimit | Money | | | |
| 400040032 | | ValidateBusinessSegmentID | Char | 9 | | WorkersCo |
| 400040032 | | BrokerageRate | Float | 2.50% | | 2.50% |
| 400040032 | | MarginDollars | Money | 0 | | 0 |
| 400040032 | | ThruDate | DateTime | 12/31/2015 | | 12/31/2015 |

FIG. 6D

| Quote ContractSectionID | Editable | FieldName | DataType | Quote ContractSection | Quote A Submitted | Quote B Submitted | Displayed |
|---|---|---|---|---|---|---|---|
| 400040030 | TRUE | OccurrenceLimit | Money | 115000 | 12500 | | 12500 |
| 400040030 | TRUE | PerPersonLimit | Money | 20000 | 25000 | | 2500 |
| 400040030 | | ValidateBusinessSegmentID | Char | 9 | | | Workers Co |
| 400040030 | | BrokerageRate | Float | 2.50% | | | 2.50% |
| 400040030 | | MarginDollars | Money | 55000 | | | 55000 |
| 400040030 | | ThruDate | DateTime | 12/31/2015 | | | 12/31/2015 |
| 400040031 | TRUE | OccurrenceLimit | Money | | 12500 | | 12500 |
| 400040031 | TRUE | PerPersonLimit | Money | | 5000 | | 5000 |
| 400040031 | | ValidateBusinessSegmentID | Char | 9 | | | Workers Co |
| 400040031 | | BrokerageRate | Float | 2.50% | | | 2.50% |
| 400040031 | | MarginDollars | Money | 10000 | | | 10000 |
| 400040031 | | ThruDate | DateTime | 12/31/2015 | | | 12/31/2015 |
| 400040032 | TRUE | OccurrenceLimit | Money | | | 500000 | 500000 |
| 400040032 | TRUE | PerPersonLimit | Money | | | 150000 | 150000 |
| 400040032 | | ValidateBusinessSegmentID | Char | 9 | | | Workers Co |
| 400040032 | | BrokerageRate | Float | 2.50% | | | 2.50% |
| 400040032 | | MarginDollars | Money | 0 | | | 0 |
| 400040032 | | ThruDate | DateTime | 12/31/2015 | | | 12/31/2015 |

FIG. 6E

| | Authorization Confirmation 730 | | | |
|---|---|---|---|---|
| | Authorize Response 720 | Authorization Expiration 730 | Subjectivity 740 | Comments 750 |
| Layer 1 710a | 15.000000% 720a | 3/10/2016 730a | Subjectivity 1 740a | |
| Layer 2 710b | 1.123452% | | Subjectivity 2 | Comments 1 750a |
| Layer 3 710c | 25.000000% | 3/10/2016 | | |
| Layer 4 710d | Declined 720b | | | Decline Comments 1 750b |

Placement Permissions for [Jane Doe] ~ 1446

1442a

Placement Permissions ~ 1444a
- ● For all placements
- ○ Read and edit ~ 1448
- ○ Read only
- ○ Document only
- ○ No access
○ For each placement

| Placement | Year | Permission |
|---|---|---|
| Cedent name written out in full<br>*Placement name written out in full – out of least five words in the database; if truncated, hover; if needed truncate base text well* | YYYY | |
| West Bend Mutual Insurance Company<br>*(UT7678, UT7679, UT7681) – Medi-Lab, Workers Compensation and Cash Excess of Loss Reinsurance Agreement* | 2018 | |
| Renaissance Reinsurance Ltd.<br>*Cat Retrocec (Participation) – Agora (Pensacola) – Access* | 2018 | |
| Assurant, Inc. FlexiDrive, LLC, Manheim<br>*Remarketing, Inc., Manheim Investments, Inc.* | 2017 | |
| Virginia Farm Bureau Mutual Insurance Company Auto<br>*Physical Damage Excess of Loss Virginia Farm Bureau Ins Co* | 2017 | |
| National Union Fire Insurance Company of Pittsburgh, PA | 2017 | |

| Category | Product |
|---|---|
| Proportional | Proportional Open Cover |
| Proportional | QS & Surplus |
| Proportional | Quota Share |
| Proportional | Retro |
| Proportional | Surplus Share |
| XOL | Aggregate (Stop Loss) |
| XOL | Catastrophe XL |
| XOL | Clash/Contingency Cover |
| XOL | Combined Product Excess of Loss |
| XOL | Industry Loss Warranty (Non-Retro) |
| XOL | Non-Cat Excess of Loss |
| XOL | Reinstatement Premium Protection |
| XOL | Retro Cat |
| XOL | Retro Industry Loss Warranty |
| XOL | Retro Non-Cat |
| XOL | Risk & Cat XL |
| XOL | Risk XL |
| XOL | Working Excess |

FIG. 16A

| |
|---|
| Accident & Health |
| Aviation |
| Casualty |
| Cyber |
| Fidelity & Surety |
| Identify Theft |
| Investment Banking |
| Life |
| Marine & Energy |
| Motor/Automobile |
| Professional Liability |
| Property |
| Retro |
| Workers Compensation |
| Power |

FIG. 16B

DASHBOARD INTERFACE, PLATFORM, AND ENVIRONMENT FOR AUTOMATED NEGOTIATION, BENCHMARKING, COMPLIANCE, AND AUDITING

CROSS-REFERENCE TO RELATED APPLICATIONS

This application is a continuation-in-part of and claims priority to the following prior patent application: U.S. patent application Ser. No. 15/198,797, entitled "Dashboard Interface, Platform, and Environment for Automated Negotiation, Benchmarking, Compliance, and Auditing," filed Jun. 30, 2016, which is related to and claims priority to U.S. Provisional Patent Application Ser. No. 62/262,880 filed Dec. 3, 2015. The above identified applications are hereby incorporated by reference in their entireties.

BACKGROUND

Insurance brokers act as intermediaries for their clients, which may be entities seeking insurance coverage for certain risks. Insurance brokers bring clients together with insurance providers (known as "insurance carriers") who may be willing and able to provide the desired insurance coverage on beneficial terms for the client.

Reinsurance negotiation practice involves discrete provision of quote request, modification, and acceptance or declination during a life cycle involving parameter adjustments, contract document additions, and other information handling that is largely manually entered and shared between parties to a negotiation. This process is slow, laborious, and prone to loss of information important to transaction auditing. Additionally, the process makes benchmarking of negotiation metrics cumbersome and difficult.

SUMMARY OF ILLUSTRATIVE EMBODIMENTS

The forgoing general description of the illustrative implementations and the following detailed description thereof are merely exemplary aspects of the teachings of this disclosure, and are not restrictive.

The present application describes dashboard user interfaces, methods, systems, and transactional environments for automated transaction negotiation, benchmarking, compliance, and auditing. During the automated process, in some embodiments, a quote template engine aids the user (e.g., broker) in customizing quote requests and follow-on quote information based upon learned parameters used in past negotiations. For example, data derived from completed transactions may be used to automatically identify preferred quote parameters based upon product type, geography, vendor, customer, or other common parameters. A real-time notification engine may alert parties (e.g., clients, customers, brokers and/or vendors) to the negotiation when new information is available and/or automatically present updating information for user review. This allows faster exchange of information leading to prompt completion of transactions. Information, in another example, may be created once and selectively shared with multiple parties. For example, depending upon negotiation partner, a party to the negotiation may select to share certain standard contracts or other documents (e.g., product details, warranties, etc.) uploaded and securely stored in the negotiation environment. During negotiations, an audit trail management engine tracks information shared and stores the steps of the negotiation for later audit review. The audit trail may automatically support financial market compliance requirements such that parties are reassured as to compliance without needing to individually manage and store compliance documentation. Additionally, parties to the negotiation may have the ability to review modifications to the agreement throughout the course of the negotiation. Further, a data mining engine may analyze the audit trail information to identify negotiation metrics related to the parties participating in the transactional environment. The negotiation metrics may be presented in report format to gain greater understanding of vendor appetites, trends in pricing, transaction volume, and other information around the globe. The information may be presented based on a number of negotiation variables including, in some examples, product type, geography, market, vendor, and deal size.

In certain embodiments, an automated system provides for automatic negotiation, benchmarking, compliance, and auditing. The system may include computing systems and devices for receiving a request for transmitting a transaction message to a vendor, and in response, providing a customization user interface including a transaction message template with editable and non-editable input fields as well as a document selection interface for linking transaction documents to the transaction message. Message recipients associated with the vendor may be identified that have security access permissions corresponding to access parameters for the linked transaction documents. In response to receiving inputs for the editable input fields, the transaction message template may be converted to a message transmission format for transmitting the transaction message with the one or more linked transaction documents and transmitted to the vendor. The transaction message and linked documents are stored in at least one portion of a data repository.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 3A through 3F are example screen shots of a user interface for automated negotiation of reinsurance quotes;

FIGS. 6A through 6E are example quote development stages in negotiating a quote through a platform for automated transaction negotiation, benchmarking, compliance, and auditing;

FIG. 7 illustrates an example response received by a broker for a previously submitted quote;

FIGS. 14A-14I illustrate various dashboard interface screens for managing vendor security access;

FIGS. 16A-16B illustrate products and lines of business associated with different types of quote templates.

DETAILED DESCRIPTION OF ILLUSTRATIVE EMBODIMENTS

Figure 1:
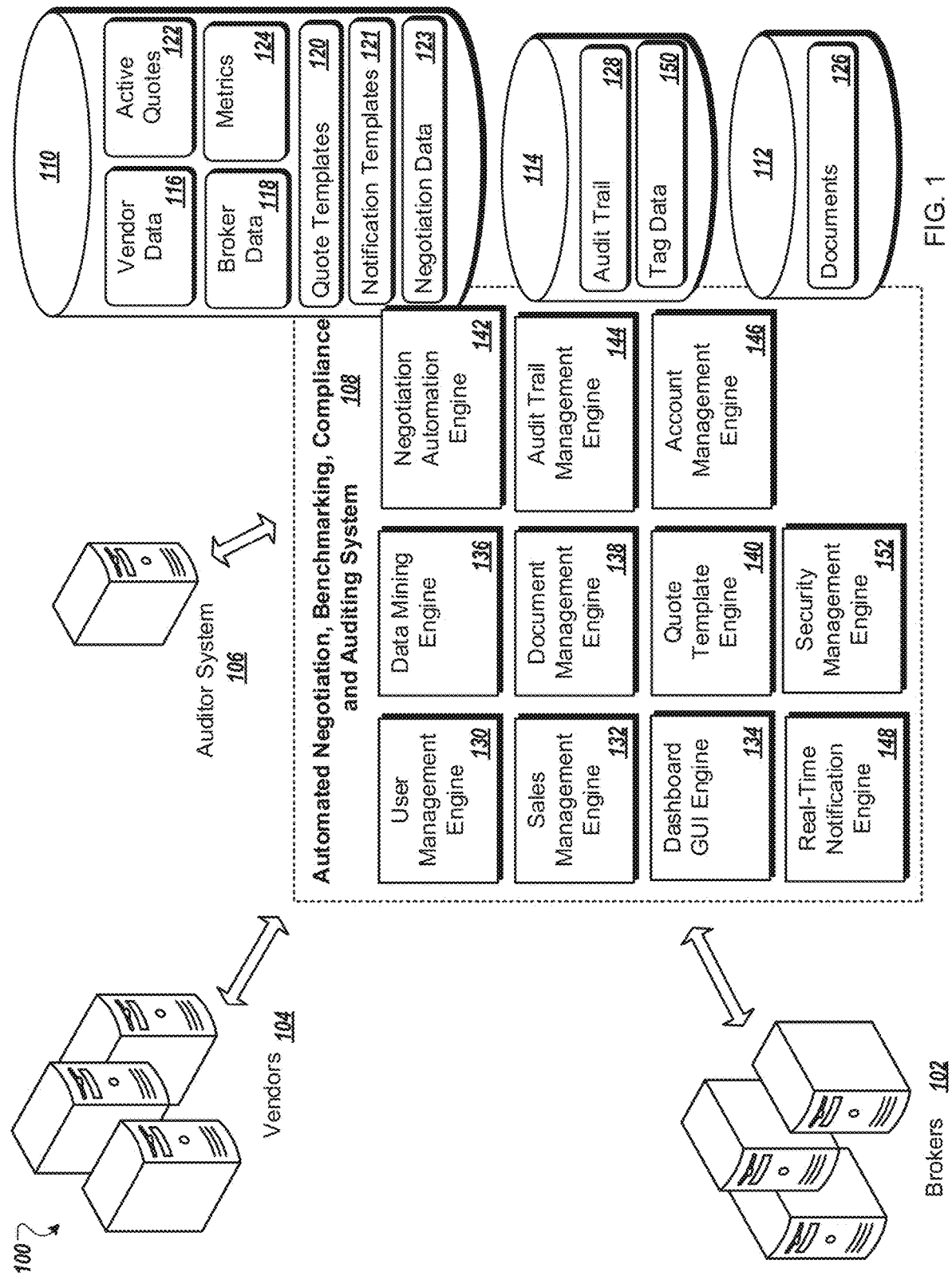
FIG. 1 is a block diagram of an example environment for automated transaction negotiation, benchmarking, compliance, and auditing.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

The present disclosure describes a dashboard interface, methods, systems, platforms, and transactional environments for automated transaction negotiation, benchmarking, compliance, and auditing. The transaction, for example, may include reinsurance quote negotiation. Turning to FIG. 1, an example environment 100 includes a number of vendor (e.g., reinsurance carrier) computing systems 104, a number of broker computing systems 102 (e.g., individual computing devices, servers, and/or organizational computing systems), and at least one auditor computing system 106 in communication with a network-based system 108 providing a variety of software engines 130 through 148 for supporting a platform for automated transaction negotiation, benchmarking, compliance, and auditing. The system 108 manages transaction data in a transaction data repository 110, audit trail information in an audit trail repository 114, and transactional documents (e.g., contracts, agreements, etc. created and uploaded by the brokers 102 and/or vendors 104) in a document repository 112.

In some implementations, the system 108 authenticates users connecting through the vendor computing systems 104 and broker computing systems 102 through a user management engine 130. The user management engine 130, for example, may authenticate users and/or computing systems 102, 104 based upon information stored within broker data 118 and vendor data 116. In some examples, user passwords, valid computing system addresses, dashboard activity data, etc. may be maintained for individual reinsurers (via vendor data 116) and/or brokers (via broker data 118) connecting to the system 108.

A broker connected to the system 108, in some implementations, can prepare a reusable quote template, via a quote template engine 140, to request a transactional quote from one or more of the vendors represented by the vendor computing systems 104. The quote template engine 140, for example, may supply stock transactional data elements for selection in preparing a quote template specific to a particular customer, groups of customers, product type, market, geographic region, etc. The broker may store one or more quote templates 120 in the transactional data repository 110. In some implementations, each quote template 120 may have an associated notification template 121 that may be used by the negotiation automation engine 142 in preparing quote requests and other types of messages and notifications associated with a transaction negotiation (e.g., final order, final lines) to be sent do the vendors 104.

After preparing the quote template 120, the broker 102 can select one or more vendors (e.g., reinsurance carriers) from the vendors managed by the user management engine 130 through a negotiation automation engine 142, and customize the quote template for the vendor(s). A dashboard GUI engine 134, in some embodiments, provides the broker computing systems 102 with an interface for quote template creation and negotiation management. The brokers, in some embodiments, may select individual reinsurers for quote preparation based upon vendor data 116 maintained in the transactional data repository 110. The vendor data 116, in some examples, may include information regarding markets, regions, risk appetite, etc. for each reinsurer within the environment 100. In some implementations, the vendor data 116 may also include bound layer information indicating deductible tier preferences for each of the vendors 104. For example, some vendors 116 may have preferences regarding deductible amounts and tiers of deductibles established by the bound layers of a provided quote.

In some implementations, when customizing the quote request, the broker includes a document 126. In some examples, the broker uploads a document, such as a contract agreement, via a document management engine 138. The document management engine 138 may store the uploaded document in the document repository 112. In some embodiments, an audit trail management engine 144 correlates the uploaded document 126 with the initiated transaction.

Upon submission of a quote request by the broker via the negotiation automation engine 142, in some implementations, an audit trail management engine 144 logs audit trail information 128 regarding the quote request in an audit trail repository 114. The audit trail management engine 144, for example, may track messages exchanged between parties in a negotiation including exact verbiage communicated to the parties, negotiation terms, and shared documents throughout a transaction for future audit purposes (e.g., by the auditor computing system 106 and/or internally by the broker computing systems 102 and vendor computing systems 104). For example, audit and/or legal requirements may dictate that brokers maintain copies of any documents or messages exchanged between parties (e.g., brokers 102 and vendors 104) in a reinsurance negotiation. Rather than rely on manual compliance filing of emails and documentation by brokers, which can lead to gaps, oversight, and inconsistencies in audits, the audit trail management engine 144 may automatically manage the filing and tracking of audit trail data 128 without any manual interaction from the brokers 102. In some implementations, the audit trail management engine 144 may use data mirroring to automatically generate copies of messages and other documentation that may be stored within access-controlled compliance folders within the audit trail repository 114 and/or document repository 112. In some examples, the audit trail management engine 144 may automatically generate, organize, and maintain the auditor/legal-mandated documentation without the brokers 102 having to manually generate, track, organize, and store the documents, which can greatly reduce errors in maintaining a proper audit trail data 128. Additionally, the automatic saving of email messages by the audit trail management engine 144 without any manual interaction by the brokers 102 may provide an additional layer of assurance that information within the email messages has not been tampered with, which improves audit integrity.

In some implementations, in addition to auto-filing the audit trail data 128 including messages, responses, and associated with a negotiation, the audit trail management engine 144 may also assign various tags and attributes to the audit trail data 128, such as reportable attributes that are mandated by auditors, as the documents are filed within compliance folders in the audit trail repository 114. In some examples, the assigned tags and attributes may be stored in the audit trail repository as tag data 150. For any outgoing communications to vendors 104, the tag data 150 may include vendor information data (e.g., market names, contact names, email addresses), compliance filings data (e.g., document types, privacy settings, security configurations related to who can access the file after it is saved within the audit trail repository 114), data and time stamps for outgoing messages, and interaction data indicating how a vendor 106 receiving the message has interacted with the message and/or attached documentation. For example, the email messages transmitted by the system 108 from the brokers 102 to the vendors 104 may include a link 924 (FIG. 9B) that allows message recipients to access the documents associated with the message such that the audit trail management engine 144 may track when a message and associated documentation is accessed and/or downloaded by a vendor 104. For example, selection of the link 924 by the vendors 104, may cause the system to present a document access user interface screen to the vendors 104 that allows the vendors 104 to access the documents. The automatic tagging of the audit trail data 128 by the audit trail management engine 144 may also ensure that the compliance tracking of the data received, output, and processed by the system 108 is managed as a consistent global process rather than at the discretion of the brokers 102.

After the broker submits the quote request, targeted reinsurers can access and review quote information prepared by an account management engine 146 and presented by the dashboard GUI engine 134. In another example, a real-time notification engine 148 may identify one or more recipients (e.g., individual users and/or users identified in a particular user group) for real-time notification regarding submission of the quote request. The real-time notification, in some examples, may include a mobile device app notification, a SMS message notification, an email notification, or an automated voice mail notification. The type of notification, in some embodiments, may be based in part upon user preferences managed by the user management engine 130. Further, if the reinsurer is reviewing information supplied by the system 108 presented by the dashboard GUI engine 134, in some embodiments, the dashboard GUI engine 134 may refresh the dashboard interface to supply real-time notification via the reinsurer dashboard.

The reinsurer, in some implementations, prepares a response to the quote request, for example via the dashboard GUI engine 134. The audit trail management engine 144 may track the response supplied by the reinsurer as part of the audit trail information 128 for this particular transaction. Further details regarding the negotiation process is provided in the following figures, below.

In some implementations, a data mining engine 136 statistically analyzes information regarding the various transactions supported by the system 108. The data mining engine 136 may compile terms of quotes from both accepted and declined quotes. Based on the terms and the accept/ decline rates, the data mining engine 136 may generate metrics 124 associated with the terms of the quotes, which may be stored in the transaction data repository 110. In certain embodiments, the quote template engine 140 may provide recommendations to users in populating the quote template 120, for example based upon metrics 124 or other common features of past templates and/or stored templates (e.g., in audit trail data 128 or quote templates 120).

In some implementations, the data mining engine 136 may also gather data and automatically generate metrics 124 associated with which data fields of quote templates are most frequently modified and customized and the most frequent types of changes that are made to the quote templates over predetermined periods of time. In addition, the data mining engine 136 may also compare the template modifications to the responses received from the vendors 104 to the quotes having the modified templates to determine which quote template versions were transmitted most often to which quote template versions were responded to most often. In some examples, the quote template engine 140 may periodically and/or automatically update a base or default template for various product types and/or lines of business to reflect a most commonly used and/or most commonly responded to template for each product/line of business combination. In one example, the default quote template for each product/line of business combination may be updated based on a previous twelve months of data gathered by the data mining engine 136, and may be updated at a frequency of two to three months, which may coincide with policy renewal periods.

FIGS. 16A-16B represent exemplary product types and lines of business that have default templates that may be maintained by the quote template engine 140. For example, FIG. 16A shows a diagram 1600 of types of products 1604 in product categories 1602, which may include proportional and excess of loss (XOL) product categories. In addition, FIG. 16B shows a diagram of lines of business 1606 that may be associated with each of the types of products 1604 to generate default quote templates.

Returning to FIG. 1, for each product/line of business combination, the data mining engine 136 may also determine metrics 124 associated with premium amounts initially offered to the vendors 104 and differences between the initially offered premium amounts and accepted premium amounts. In addition, the data mining engine 136 may also track the response rate for different types of quote request templates, which may include how many vendors 104 accepted the offer on the first round of negotiations versus subsequent rounds as well as whether a vendor 104 accepted any offer, which may be stored in the transaction data repository 110 by product/line of business as negotiation data 123. The negotiation data 123 allows a rate on line (ROL) to be calculated, which can be used by the quote template engine 140 to prompt brokers 102 during quote preparation with the ROL for that type of quote. For example, if a broker 102 is preparing a quote template for a contract that starts June 1, the quote template engine 140 may output a ROL trend line for the product the broker 102 is working on based on collected negotiation data 123 from January 1 and April 1.

In some examples, the system 108 may include a security management engine 152 that manages the ability of vendors 104 to locally control access by employees of the vendors (e.g., underwriters, managers, administrators, delegates) to the system 108 and may perform system access updates to reflect changes access permission changes made by the vendors 104. For example, the vendors 104 and brokers 102 may have multiple contracts and/or transaction negotiations ongoing at any one time, and each contract or transaction may have one or more assigned vendor employees who have designated roles with respect to the contract or transaction that have different document access control requirements.

In some implementations, the security management engine 152 may cause one or more dashboard interface screens to be presented to the vendors 104 that allow the vendors 104 to assign, reassign, or remove access control permissions to the vendor employees based on employment and/or structural changes that may be made within the vendor company without any interaction by the brokers 102. In addition, the security management engine 152 may modify access to data stored in the data repositories 110, 112, 114 based on security access modifications made by the vendors 104. For example, access to the documents 126 stored in the document data repository 126 may granted to a vendor employee who is added as a delegate for an assigned contract underwriter for the vendor 104. Details regarding the functionality of the security management engine 152 are discussed further herein.

In some implementations, a sales management engine 132 generates management and underwriter level placement progress reports. A "quote analysis" report, in some embodiments, may present the brokers real-time statistics related to the outcomes of quotes, captured along the timeline from request to bind. For example, the dashboard GUI engine 134 may update the dashboard interface of the brokers to present a graphical analysis of vendor declination reasons. The dashboard may display detailed analysis of entity declination reasons and entity acceptance reasons. Further, the sales management engine 132 may present the brokers with an analysis of percentage submissions quoted by each of a number of vendors, such as the percentage submission-to-quote presented for each of the top five vendors. The top five reinsurance carriers, in some examples, may be identified as the top five performing vendors within the dashboard environment, the five vendors determined to be most similar to the present vendor, and/or the top five vendors for the type metrics presently presented, etc. The sales management engine 132 may allow the brokers, via the dashboard interface, to review percentages of quotes submitted based upon deductible type. Similarly, the brokers may review percentages of quotes submitted based upon deductible ranges.

Turning to a "product types and industry analysis" report, in some embodiments, the sales management engine 132 may provide statistics regarding product types offered via the dashboard environment and purchasing trends across industry sectors. The dashboard interface for the brokers may present top product types by aggregate premiums. Furthermore, the information may be filtered by geography and/or by industry sectors. Further, the analysis may be broken down to illustrate top reinsurers for each of top product types and/or top industry sectors.

In some implementations, the sales management engine 132 may provide reports relating to analysis of trade volume and aggregate premiums across reinsurance carriers participating in the dashboard environment. For example, the analysis report may include the aggregate numbers of trades by a reinsurance carrier over a given period of time. The report may additionally include identification of a bound premium associated with the aggregate trades. The bound trades statistics and aggregate premium statistics may further be filtered by geography and/or by industry. Additional filtering options and combinations are possible, such as reinsurance carriers by premium and by geography.

Figure 2A:
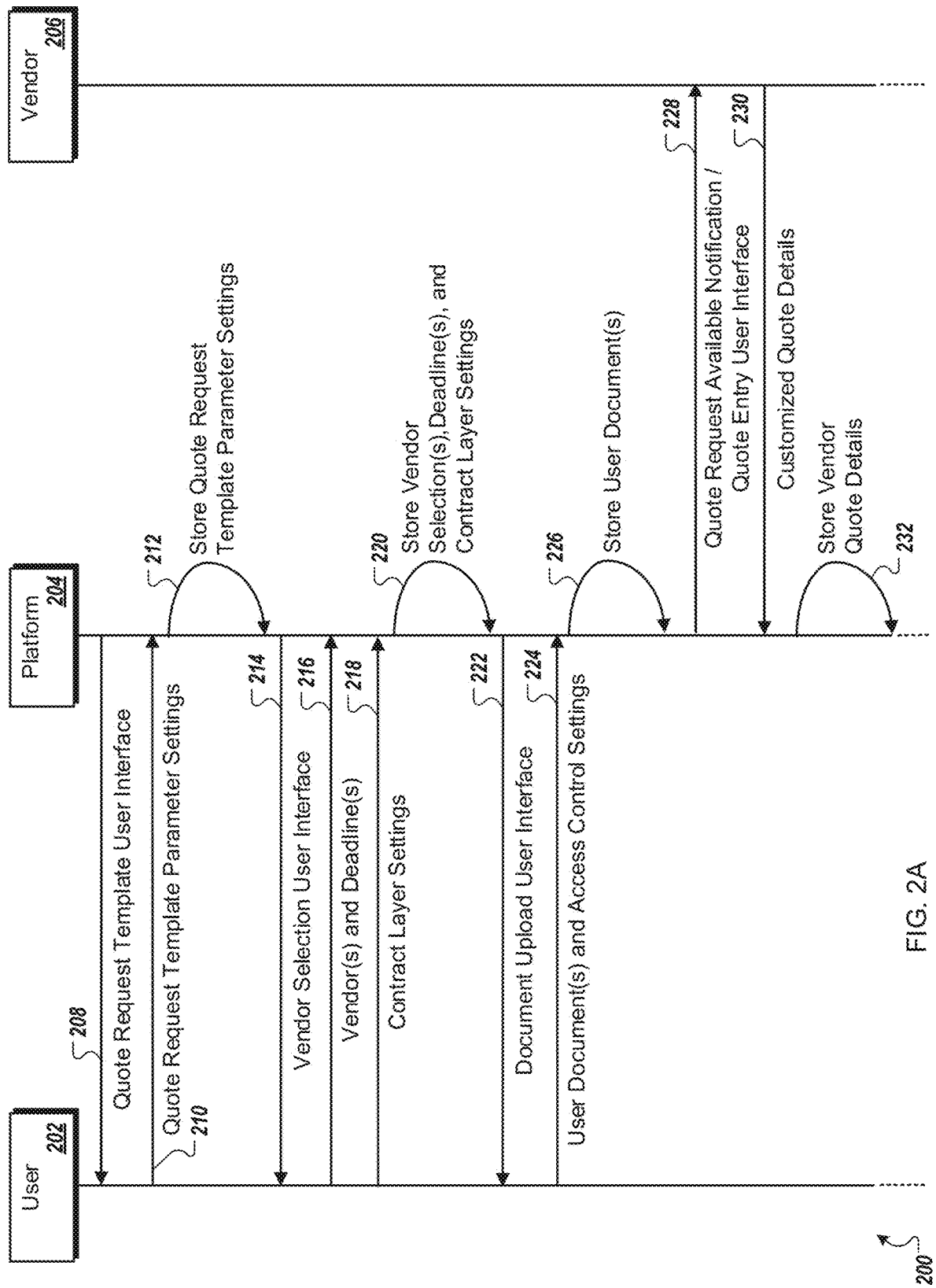
FIGS. 2A and 2B are a swim lane diagram illustrating an example method for negotiating a quote through a platform for automated transaction negotiation, benchmarking, compliance, and auditing.
Figure 2B:
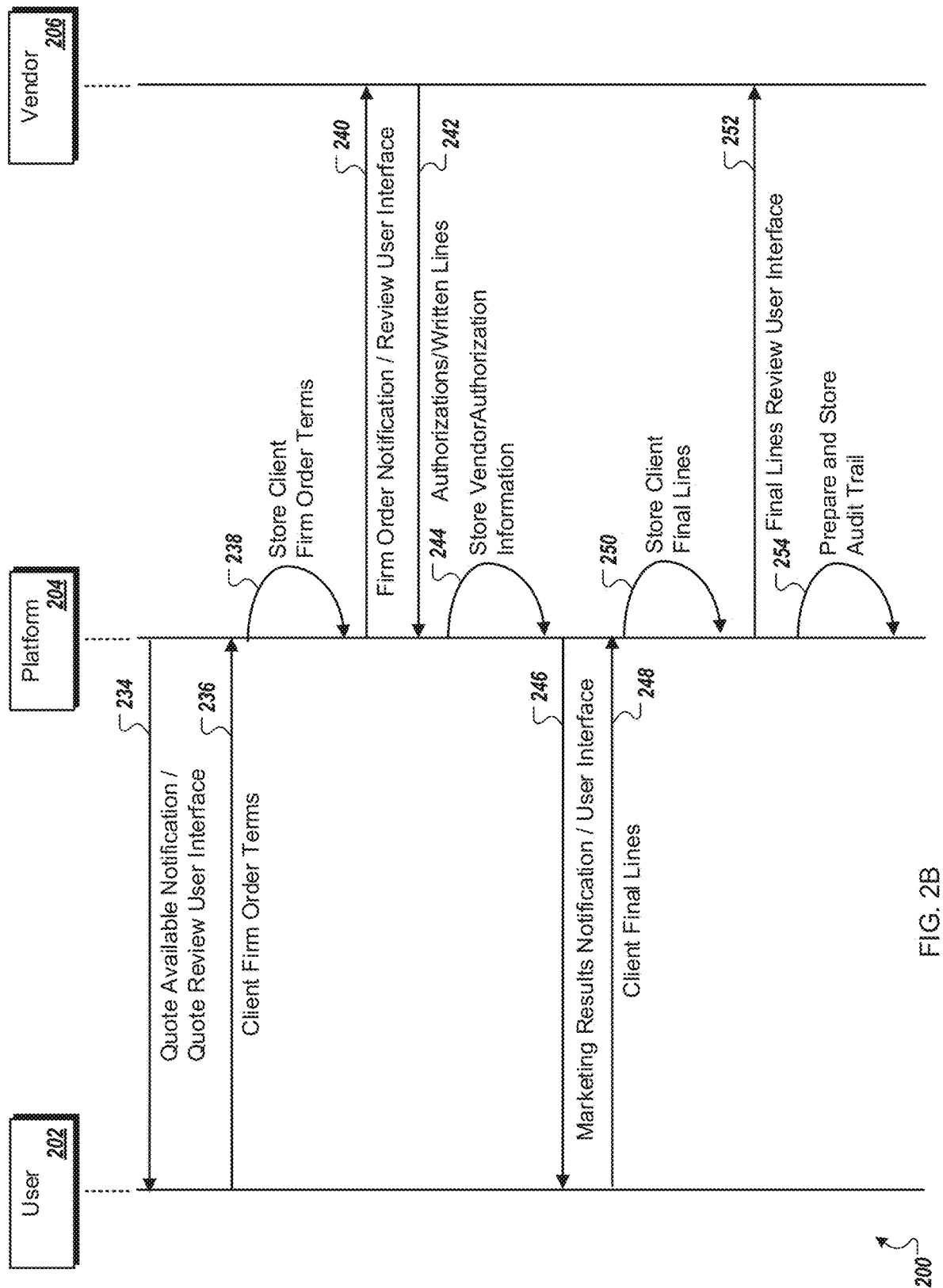

Turning to FIGS. 2A and 2B, a flow diagram illustrates communication flows between a broker 202, a platform 204, and a vendor 206 during an example transaction process 200. The transaction process 200, for example, may be supported by the environment 100 of FIG. 1, where the platform 204 represents the system 108, the broker 202 represents the broker computing systems 102, and the vendor 206 represents the vendor computing systems 104.

In some implementations, the transaction process 200 begins with the platform 204 supplying a quote request template user interface (208) to the broker 202. The quote request template user interface, for example, may be provided by the dashboard GUI engine 124 of FIG. 1. The quote request template may be based upon a number of selectable term options, product types, markets, geographical regions, and/or preferred vendors (e.g., quote variables).

Figure 5A:
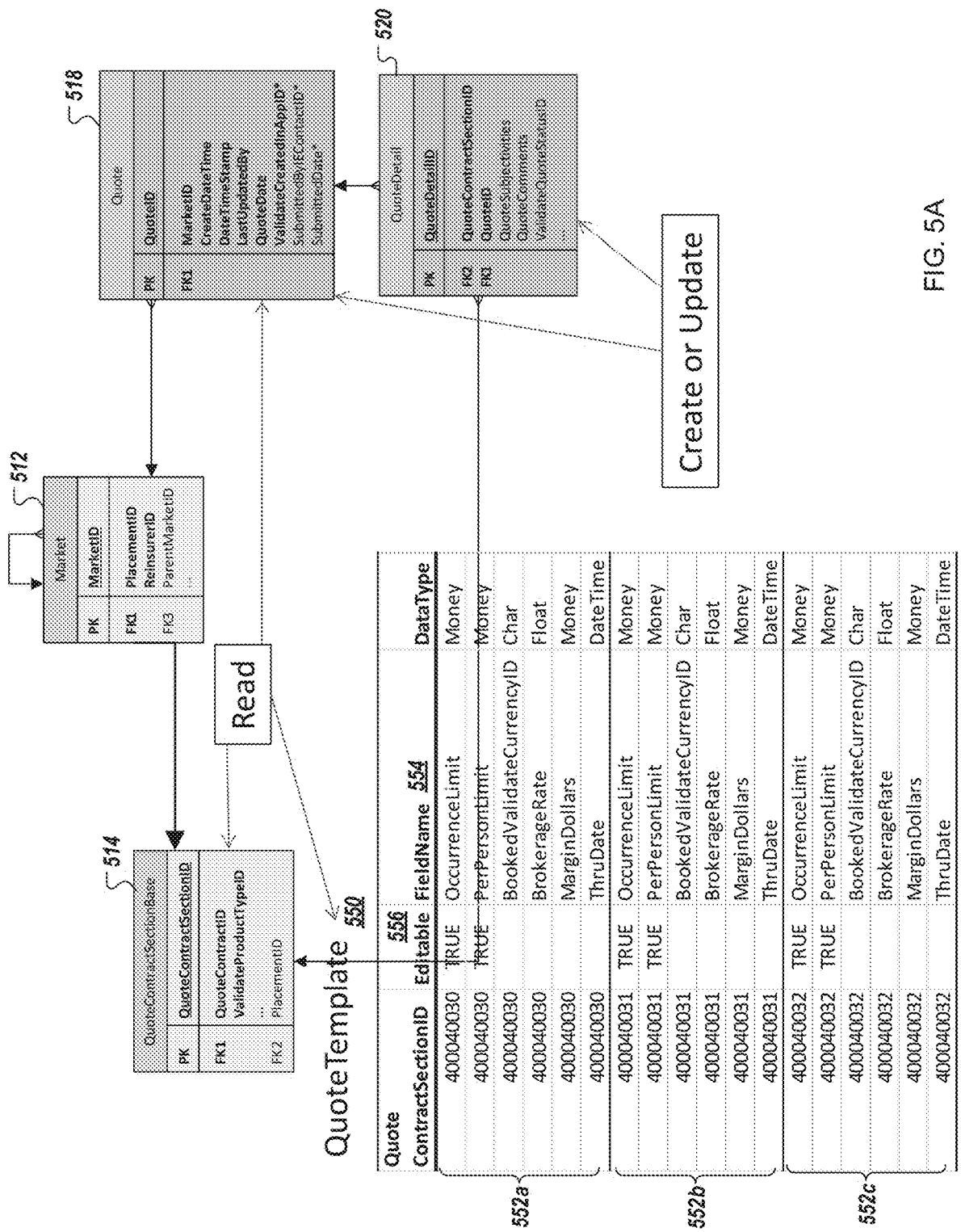
FIG. 5A illustrates an example quote template data field architecture.

Turning to FIG. 5A, in some implementations, the user builds a quote template 550. The quote template 550, as illustrated, includes a number of contract sections 552, each contract section 552 including a number of fields 554 (e.g., occurrence limit, per person limit, booked validate currency identifier, brokerage rate, margin dollars, and "thru" date for response deadline to the quote request). Certain terms, in some embodiments, (e.g., occurrence limit and per person limit, as illustrated) may be deemed editable 556 by the user when preparing the quote template. The editable field 556, when activated, may allow the negotiating party (e.g., vendor such as a reinsurer) to modify a proposed term presented by the initiating party (e.g., broker).

FIG. 5A also includes an entity relationship diagram superimposed onto the quote template 550 that illustrates relationships between the fields of the template 550 that may be stored within tables of a data repository, such as the transaction data repository 110 (FIG. 1). For example, a quote contract section 552 of a template may be populated based on relationships between a quote contract section base entity 514, market entity 512, quote entity 518, and quote detail entity 520.

Returning to FIG. 2A, in some implementations, the broker 202 responds by providing one or more quote request template parameter settings (210) to the platform 204. The quote request template parameter settings, for example, may include those terms selected by the broker 202 in preparing the quote template, such as the quote template 550 described in relation to FIG. 5A.

Figure 5B:
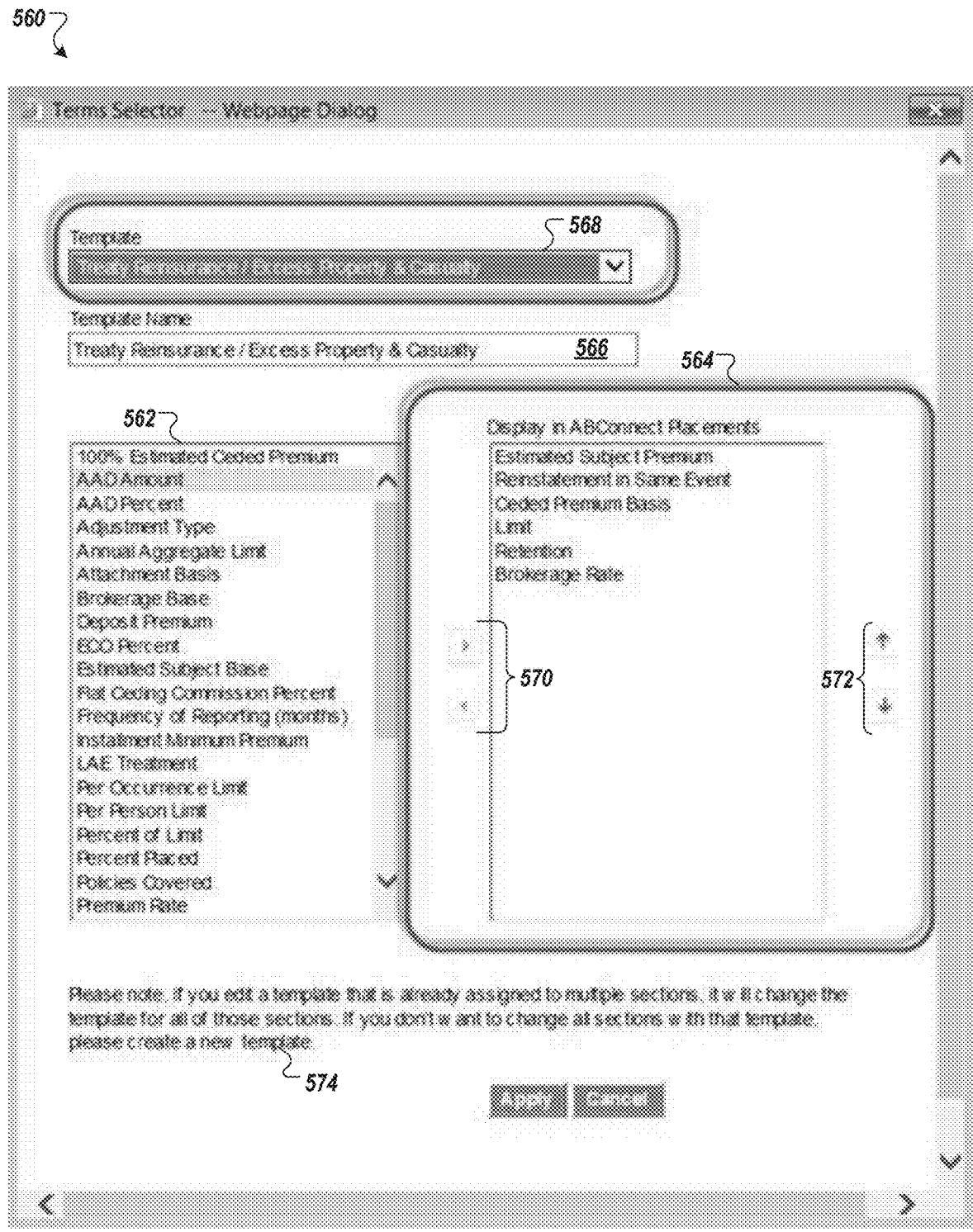
FIG. 5B illustrates an example quote template creation dialogue.

In some implementations, the broker 202 uses a quote customization user interface to provide the quote request template parameter setting(s). Turning to FIG. 5B, an example quote customization user interface 560 provides a mechanism for a user to select fields representing various template parameter settings. The user may enter the quote customization user interface 560, for example, from the quote edit user interface 330 of FIG. 3C. The user is presented with a menu containing available fields 562 from which to populate a second menu of selected template fields 564. The fields 562, for example, may be highlighted singularly or in groups and transferred into the second menu of selected template fields 564 using a set of movement controls 570. The fields in the selected template fields 564, further, may be rearranged by the user in a presentation order (e.g., using arrows 572). The fields 562 populating the selected template fields 564, for example, may be used to highlight features of a particular deal in a particular way.

In some implementations, a user has the option to create reusable templates, eliminating the need recreating field selections upon each quote. As illustrated, the present template has been named "Treaty Reinsurance/Excess Property & Casualty" in a name entry field 566. Further, the user may be provided the ability to edit a saved template. In this manner, for example, the user may adjust previously used templates to better fit a current scenario. The previously stored template may be selected, for example, through a template drop-down menu 568. Additionally or alternatively, as noted in a warning message 574 at the bottom of the quote customization user interface 560, the user may alter an existing template. The alteration, for example, may cause a change to the template in all sections using the template. Alternatively, the user may customize any section, or layer of coverage, within the template.

Returning to FIG. 2A, the platform 204, in some implementations, stores the quote request template parameter settings (212). For example, as illustrated in FIG. 1, the quote template engine 140 of the system 108 may store the quote request template parameter settings as quote template information 120 in the transaction data repository 110.

In some implementations, the platform 204 prepares and supplies, for presentation to the broker 202, a reinsurer selection user interface (214). The broker 202, through the reinsurer selection user interface, may select one or more reinsurers for sharing a quote request based upon the quote request template. The reinsurers, in some embodiments, may be filtered by the platform 204 and/or the broker 202 to aid in selection of one or more reinsurers. In some examples, the reinsurers may be filtered by the market(s) identified within the quote template, reinsurers having a past relationship with the broker 202, product types identified within the quote template, business segments identified within the quote template, reinsurers satisfaction ratings, and/or reinsurers providing services within a particular geographic region.

In some implementations, the broker 202 selects one or more reinsurers through the reinsurer selection user interface, and prepares a quote request, using the quote request template, specifically geared to negotiations with the selected reinsurer(s). For example, the broker 202 may supply one or more deadlines 216 associated with negotiations with the one or more reinsurers. Further, the broker 202, in some implementations, provides contract layer settings 218 specific to particular sections of the quote request being prepared for negotiation. The contract layer settings 218, in some examples, may include term values, term editing settings, and/or layer visibility settings. The contract layer settings 218, in some embodiments, may vary in part based upon different reinsurers selected through the reinsurer selection user interface. For example, a first contract layer may be made visible by the broker 202 to a first reinsurer but not a second reinsurer.

Turning to FIG. 6A, for example, a quote request 600, based upon the quote template 550 of FIG. 5A, includes two layers 604a, 604b in contract section 602. Each layer 604a, 604b includes values associated with at least a portion of the terms. Additionally, each layer includes a deadline 606a, 606b of Dec. 31, 2015.

Returning to FIG. 2A, in some implementations, the platform 204 stores the reinsurer selections, deadlines, and contract layer settings (220). For example, as illustrated in FIG. 1, the quote template engine 140 of the system 108 may store the deadline(s), reinsurer selection(s) and contract layer settings as active quote data 122 in the transaction data repository 110.

In some implementations, the platform 204 prepares a document upload user interface (222) for presentation to the broker 202. The document upload user interface, for example, may provide the broker 202 with the opportunity to upload one or more documents and associate the document(s) with the quote request. The documents, in some examples, may include contracts, contract addendums, electronic signatures, term agreements, client information (e.g., financial, structural, etc.), and/or broker information. In some embodiments, the document upload user interface allows the broker 202 to select a type of document. The type, for example, may be provided for audit trail purposes (e.g., contract proposal, contract addendum, executed contract, etc.). Additionally, the document upload user interface may allow the broker 202 to apply visibility settings associated with each document. For example, the broker 202 may elect to make the document visible to only one reinsurer associated with the quote request. In some embodiments, the broker 202 may later opt to "unshare" a particular document with one or more reinsurers. Further, in some embodiments, the broker 202 may apply read/write access controls to the document. Alternatively, documents may be read-only when supplied to the platform 204, for example to maintain content control for auditing purposes.

In some implementations, the broker 202 supplies, via the document upload user interface to the platform 204, one or more documents and document access control settings (224). For example, as illustrated in FIG. 1, the broker computing system 102 may supply the document(s) and access control setting(s) to the system 108 through the dashboard GUI engine 134.

In some implementations, the platform 204 stores the broker document(s) 226. For example, the document management engine 138 of the system 108 of FIG. 1 may store the broker documents and settings as document data 126 in the document repository 112.

Figure 9A:
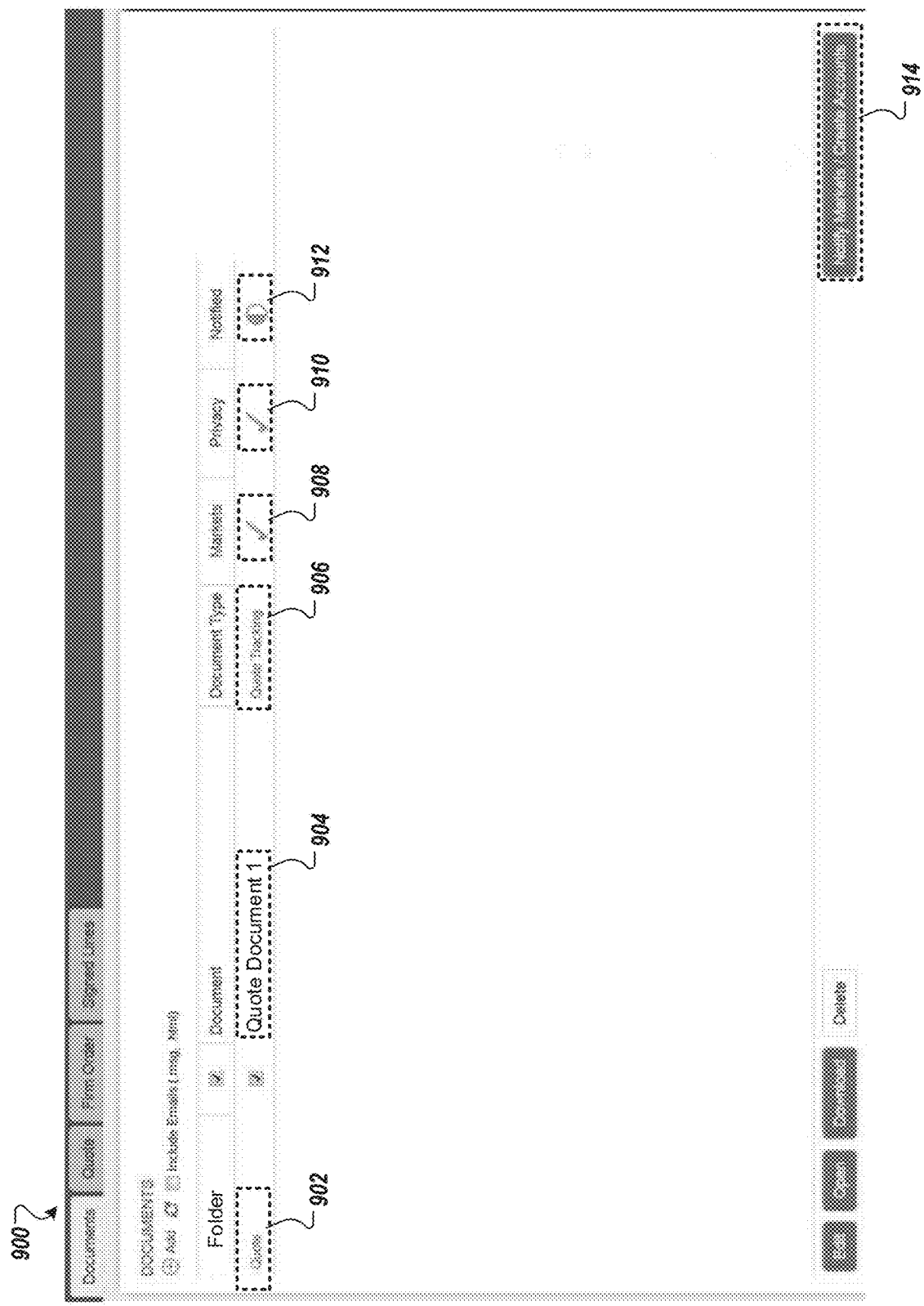
FIGS. 9A-9C illustrate exemplary user interface screens utilized by a broker when preparing a quote to be sent to vendors in various markets for a transaction negotiation.
Figure 9B:
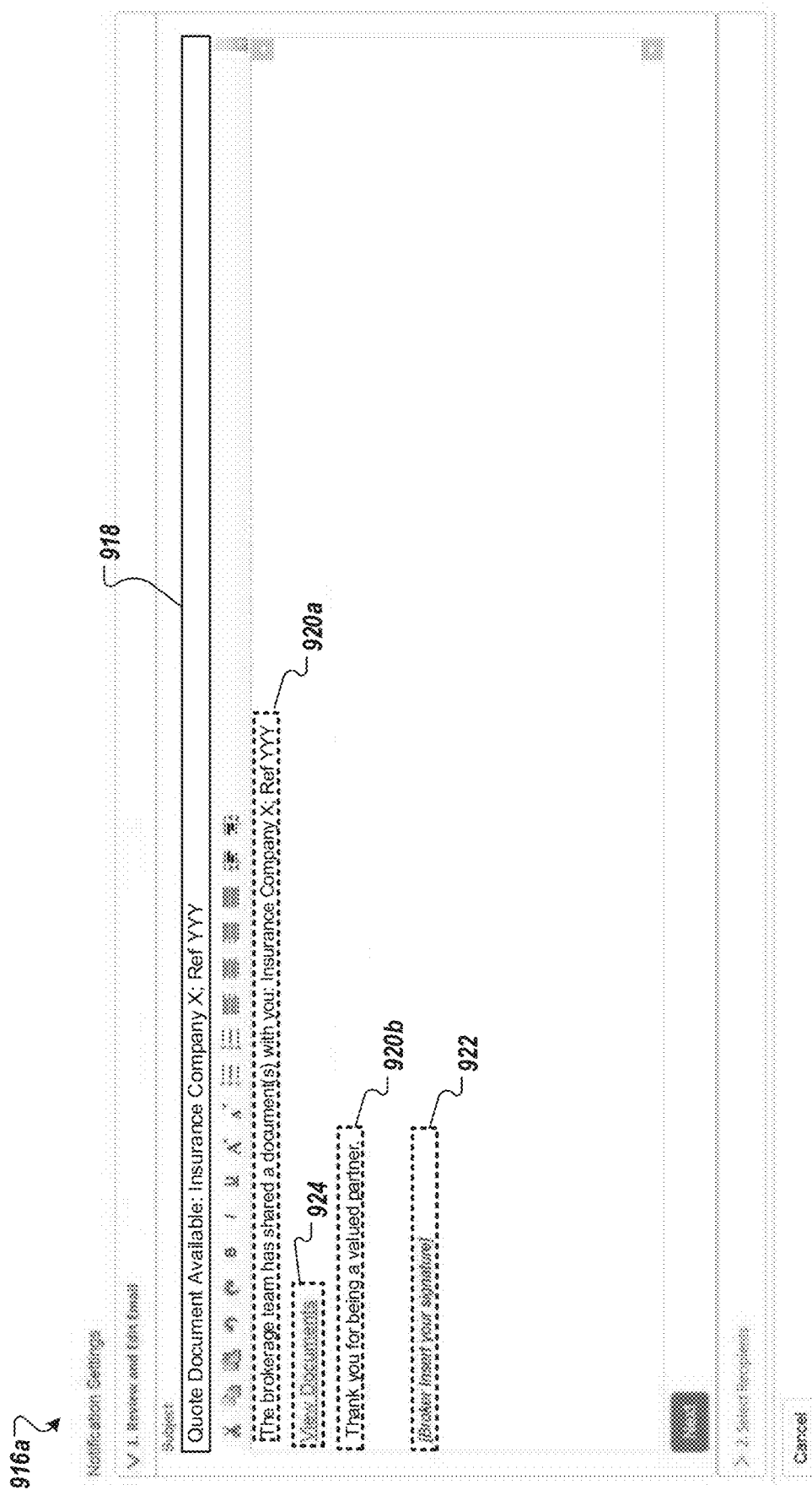
Figure 9C:
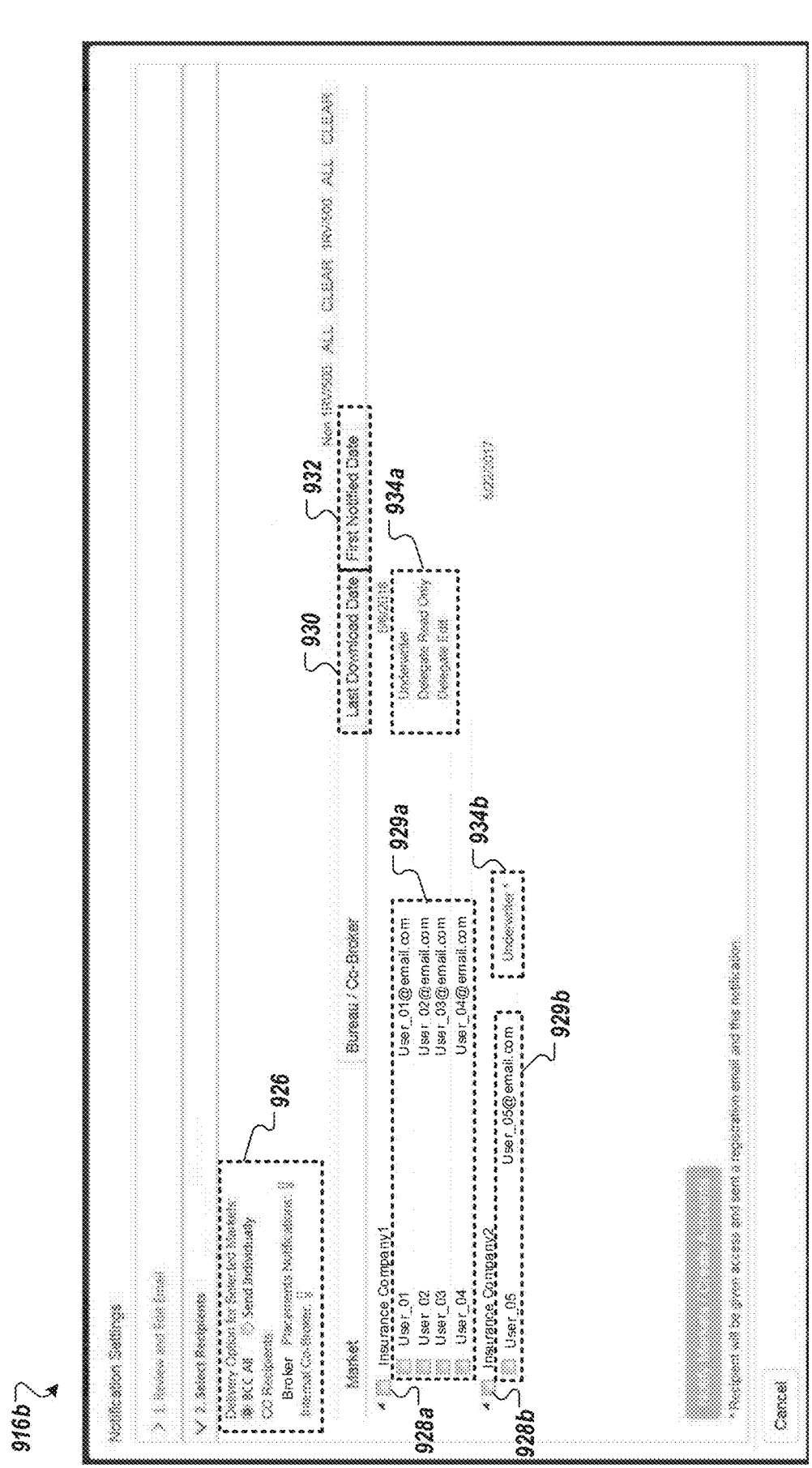

FIGS. 9A-9C illustrate exemplary dashboard interface screens utilized by a broker 202 when preparing a quote to be sent to vendors 206 in various markets for a transaction negotiation. The user interface screens provide indications regarding how the processing engines of the platform 204 function to automatically transmit communications related to contract negotiation to the vendors as well as track, tag, file, and control access to the audit trail data 128. For example, FIG. 9A illustrates a status user interface (UI) screen 900 that provides a summary view of which terms, layers, data points, and documentation of a contract have been shared with the vendors 206. In one example, for a particular quote 902, the UI screen 900 may indicate statuses of various documents, such as document 904, that have been prepared or are in the process of being prepared to send to the vendors. The UI screen 900 may also include a document type indicator 906 as well as indicators for whether various tasks associated with preparing the quote have been accomplished, such as a market (vendor) identification indicator 908 that indicates whether the vendors 104 who will receive the quote have been identified, a privacy indicator 910 indicating whether or not privacy or security settings have been configured, and a notification indicator 912 indicating whether the vendors 206 have received a message or other type of communication from the brokers 202 with the quote. When a market notification selection 914 on the UI screen is selected, the broker 202 is presented with the notification UI screens 916 for the quote 902 shown in FIGS. 9B and 9C.

For example, FIG. 9B illustrates a review and edit template UI screen 916a that allows a broker to modify a notification template prepared by the negotiation automation engine 142. The review and edit template UI screen 916a may also be utilized to prepare other types of messages exchanged between the brokers 202 and the vendors 206, such as firm order terms and client final lines. In some implementations, each quote template 120 stored in the transaction repository 110 may have an associated notification template 121 that may be used by the negotiation automation engine 142 in preparing quote requests to be sent do the vendors 206. In one example, the UI screen 916a may present a quote request message to the broker 202 in an email message format that may include a combination of editable and/or non-editable fields. For example, the quote request message may include a non-editable subject line 918, non-editable fields 920, and editable field 922 where the broker can add a customized signature. In other examples, the fields 918 and 920 may also be editable fields.

The quote request message shown in the UI screen 916a may also include a non-editable document link 924 that allows message recipients to access and interact with the documentation associated with the message within the platform environment of the platform 204. As the documents are accessed by clicking the link 924 within the quote message, the audit trail management engine 144 may track which users for a vendor 206 have performed various assigned tasks associated with the documents along with dates and times when the assigned tasks were performed. For example, assigned tasks may include access/view, download, partially edit, edit completed, or reply message with completed documents transmitted. A document status, including performed tasks with associated dates and times may be stored by the audit trail management engine 144 as audit trail data 128 with corresponding tag data 150.

FIG. 9C illustrates a recipient selection UI screen 916b that allows a broker 102 to select message recipients of the quote request message displayed in the UI screen 916a as well as view roles and responsibilities of each message recipient associated with vendors 104. The recipient selection UI screen 916b may also be utilized to prepare other types of messages exchanged between the brokers 202 and the vendors 206, such as firm order terms and client final lines. In some implementations, the UI screen 916b may include delivery option selections 926 in which the broker 102 can select whether to BCC recipients or send messages individually to the message recipients as well as whether to notify other internal brokers 102 associated with a contract or negotiation. In some examples, the negotiation automation engine 142, cooperation with the security management engine 152, may populate the UI screen 916b with names and contact information for message recipients 929 associated with markets 928 (e.g., vendors 206) who have access and/or assigned tasks associated with the documents included as part of the quote request message and may exclude any users who do not have access rights and/or assigned tasks associated with the documents included in the quote request message. In some implementations, the security management engine 152 may determine the message recipients 929 associated with the vendors that are displayed on the UI screen 916b based on document security access levels for one or more users associated with the vendors 106.

The UI screen 916b may also include security roles/responsibilities 934 for each of the users associated with a market 928, which may include underwriters, delegates with either read only or edit permissions, managers, or administrators. Each role/responsibility 934 for each of the users may have the ability to at least view the linked documents included as part of the quote request message. In the case of the role 934b in which the message recipient has not yet registered with the platform 204, the UI screen 916b may provide an indication (e.g., an asterisk) that the message recipient will also be sent a registration email in conjunction with the quote request message to gain access to the platform 204.

In some implementations, the UI screen 916*b* may also include fields indicating a last download date 930 and a first notified date 932 associated with each of the markets 928. The last download date 930 and/or first notified date 932 may be provided by the audit trail management engine 144, which tracks when and how users interact with various documents associated with a contract negotiation. For example, the UI screen 916*b* indicates that at least one of the users associated with market 928*a* interacted with the platform 204 to download a provided document on May 6, 2016. The UI screen 916*b* also indicates that none of the users have downloaded the provided document but were sent a message notification on May 22, 2017.

In some implementations, the platform 204 provides a quote request available notification and/or quote entry user interface (228) for presentation to the vendor 206. The notification/user interface, for example, may be provided in response to the broker 202 releasing the quote request for sharing with the reinsurer(s). For example, the document upload user interface may include a quote release. Alternatively, the broker 202 may release the quote request for sharing with the vendor 206 via a separate user interface (e.g., via the reinsurer selection user interface or other quote preparation user interface).

Figure 4:
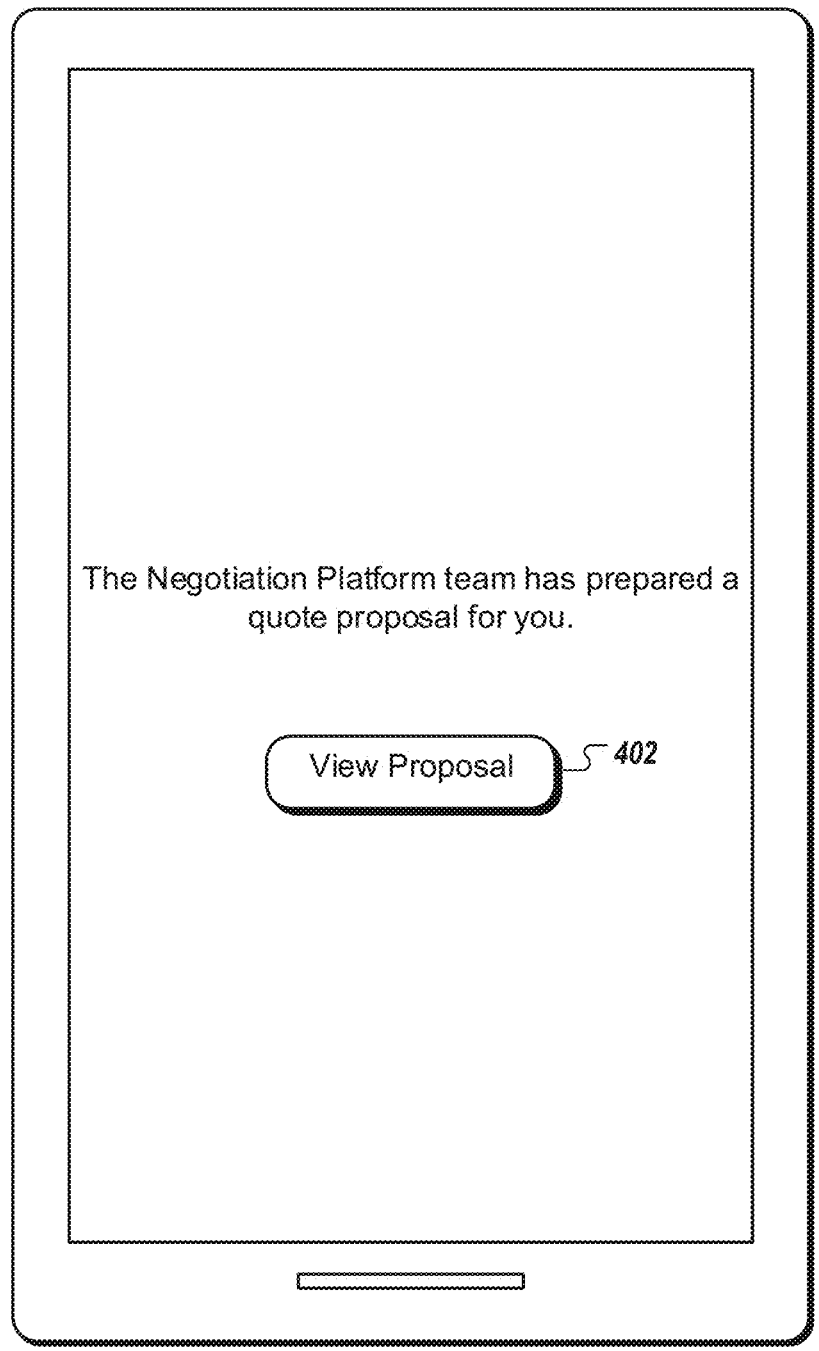
FIG. 4 is an example screen shot of an automated notification regarding a pending negotiation.

In the event of a quote request available notification, one or more users associated with the vendor 206, in some implementations, receive an automated notification via a personal computing device, such as a mobile device app notification or an email notification through an email application. Turning to FIG. 4, a mobile app notification interface 400 alerts the user regarding a new quote proposal and invites the user to view the proposal through selection of a "view proposal" control 402. The quote request available notification, for example, may be prepared and issued by the real-time notification engine 148 of the system 108, as illustrate din FIG. 1. Other examples of real-time notifications include SMS message, a dashboard alert (e.g., supplied by the dashboard GUI engine 134 of the system 108), and an automated voicemail message.

Figure 3A:
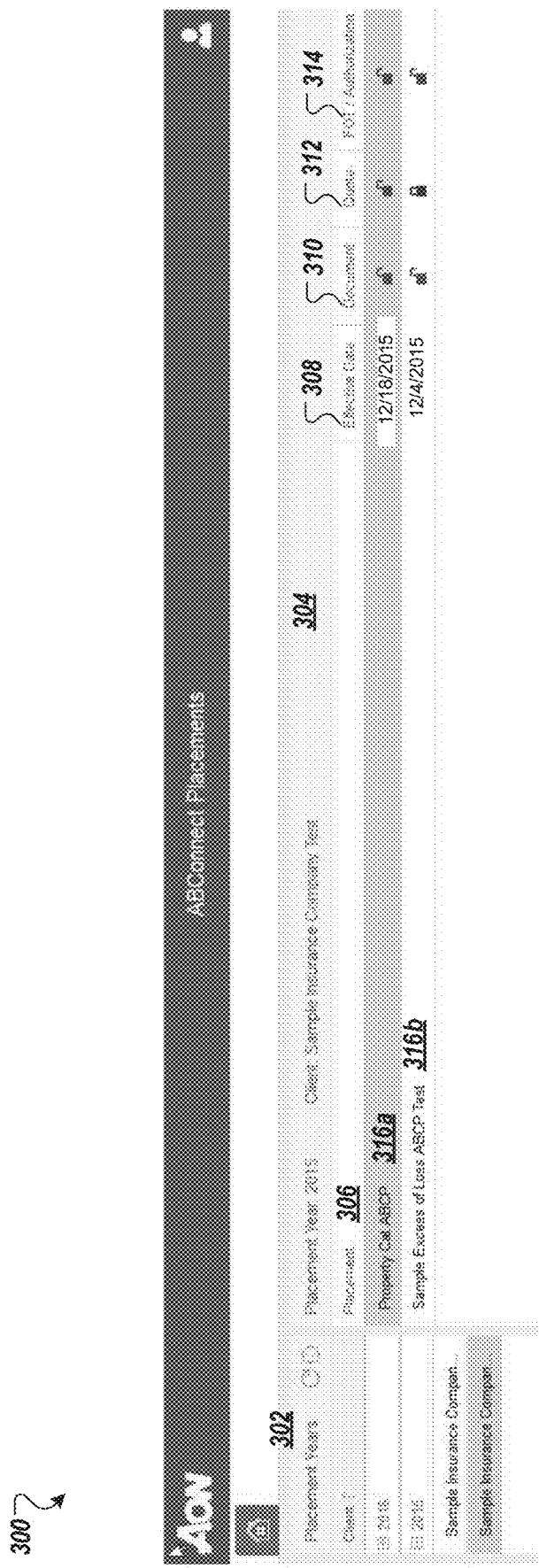

In the event of a quote entry user interface, in some implementations, the vendor 206 may be presented with a reinsurer dashboard interface 300, as illustrated in FIG. 3A. Turning to FIG. 3A, the dashboard interface 300 includes a listing of clients 302 by placement year. Year 2015 and client "Sample Insurance Company" are selected within the listing of clients 302, causing presentation of a listing of placements 304 related to client "Sample Insurance Company". Each placement 306 in the listing of placements 304 includes an effective date 308 (e.g., the date the broker released the quote request to the reinsurer), a document indicator 310 (e.g., indicating whether any documents are available), a quote indicator 312 (e.g., indicating whether the quote request is open for editing), and a firm order terms (FOT)/authorization indicator 314 (e.g., indicating whether the quote request is open for authorization). As illustrated, a new quote request 316*a* (dated Dec. 18, 2015 with a quote indicator 312 designated an unlocked state) is available for reinsurer selection.

Upon selection of the new quote request 316*a*, in some implementations, the reinsurer is presented with a quote edit user interface 330, as illustrated in FIG. 3C. Turning to FIG. 3C, the quote edit user interface includes a listing of contract layers 332, each including a respective effective date 334. As illustrated, a first layer 332*a* is selected, and layer details 336 are presented to the reinsurer for review and editing via a quote interface 338*a*. The layer details 336, for example, correspond to the visible quote request terms as designated in the quote contract section 602 of the quote request 600 of FIG. 6A. Turning to FIG. 6A, as illustrated, a displayed section 608 corresponds generally to the terms illustrated in the layer details 336. At this point in the negotiation, the reinsurer has not submitted the quote. Turning to FIG. 6B, a quote process diagram 610 illustrates that the term values of Quote A are "Not Submitted", a set of editable terms 612 being available for reinsurer modification, including a layer 1 occurrence limit term 612*a*, a layer 1 per person limit term 612*b*, a layer 2 occurrence limit term 612*c*, and a layer 2 per person limit term 612*d* (presently blank). Turning to FIG. 6C, a quote process diagram 620 illustrates that the layer 2 per person limit term 612*d* has been modified by the reinsurer with the addition of the value 5000. Returning to the quote edit user interface of FIG. 3C, the reinsurer may optionally modify the editable quote terms of the pending quote. Alternatively, the reinsurer may opt to wait for a firm order from the broker 338*b* or decline quoting 338*c*.

Figure 3B:
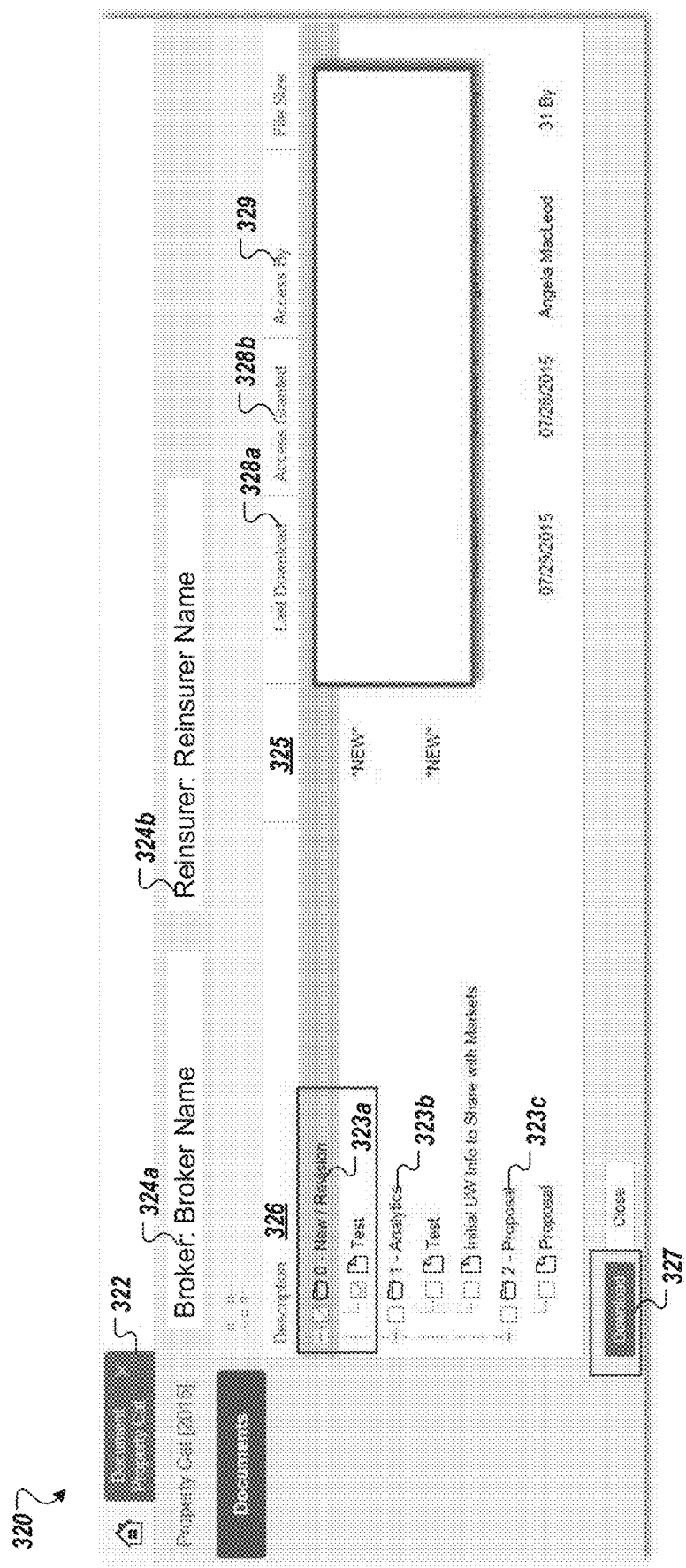

As part of reviewing the quote request provided by the broker 202, the vendor 206 may review one or more documents uploaded by the broker 202. Turning to FIG. 3B, a document review user interface 320 presents a number of document listings 326 of documents made available by a first party 324*a*, 324*b* to the negotiation for review and download 327 by a user of a second party 324*a*, 324*b* to the negotiation. For example, a first party 324*a* may correspond to the broker 202 of FIG. 2A, while a second party 324*b* may correspond to the vendor 206 of FIG. 2A. The user interface 320, in some embodiments, is accessible to the second party 324*b* via the reinsurer dashboard interface 300 of FIG. 3A (e.g., as evidenced by document indicator 310).

The document listings 326 of the document review user interface 320, in some implementations, are arranged by category 323 (e.g., new/revised, analytics, proposal) so the user may quickly identify relevant documents. In a particular example, a new/revised category 323*a* may draw attention to any documents added and/or revised since the user's last access to the user interface 320. Alternatively or in addition to the new/revised category 323*a*, one or more document listings 326 may be associated with a status indicator 325 (e.g., *NEW* as illustrated), demonstrating a present status of the associated document listing 326.

In some implementations, the document review user interface 320 may include one or more dates 328 associated with the document listings 326, such as a last downloaded date 328*a*, indicating the date the document was most recently accessed by the user (or, alternatively, another user associated with the reinsurer 324*b*) and an access granted data 328*b*, indicating the date the user was granted access to the corresponding document. If the document has previously been accessed by the second party 324*b*, in the illustrated example, an access by indicator 329 may identify a particular user of the second party 324*b* who most recently accessed the corresponding document of the particular document listing 326.

Although not illustrated, in some embodiments, one or more documents may include access rights identifying whether the second party may edit or otherwise modify (e.g., rename, append comments to, etc.) a particular document identified within the document listing 326.

Turning to FIG. 2A, upon editing one or more quote terms, the vendor 206 provides customized quote details (230) to the platform 204. The customized quote details, for example, may be entered via the dashboard GUI engine 134 of the system 108 of FIG. 1 and provided to the negotiation automation engine 142.

In some implementations, the platform 204 stores the reinsurer quote details (232). For example, the quote details may be stored to the active quotes data 122 in the transaction data repository 110 by the system 108, as illustrated in FIG. 1. Further, the present state of the negotiation may be updated in the audit trail data 128 of the audit data repository 114 by the audit trail management engine 144.

Turning to FIG. 2B to continue the transaction process 200 of FIG. 2A, in some implementations, the platform 204 provides a quote available notification and/or quote review user interface (234) to the broker 202. The notification/user interface, for example, may be provided in response to the broker 202 releasing the quote request for sharing with the reinsurer(s). For example, the document upload user interface may include a quote release. Alternatively, the broker 202 may release the quote request for sharing with the vendor 206 via a separate user interface (e.g., via the reinsurer selection user interface or other quote preparation user interface).

In the event of a quote available notification, one or more users associated with the broker 202, in some implementations, receive an automated notification via a personal computing device, such as a mobile device app notification, as described in relation to the automated notification process described in step 228. The quote available notification, for example, may be prepared and issued by the real-time notification engine 148 of the system 108, as illustrated in FIG. 1. Other examples of real-time notifications include SMS message, a dashboard alert (e.g., supplied by the dashboard GUI engine 134 of the system 108), and an automated voicemail message.

In the event of a quote review user interface, in some implementations, the broker 202 may be presented with the present terms of the quote, including the modification made by the vendor 206. For example, as shown in FIG. 6D, a quote process diagram 630 illustrates the terms associated with the pending quote, including the terms 612 editable by the reinsurer. The broker 202 may review these terms and determine, with the client, whether to accept the reinsurer's quote.

If the client agrees to the quote supplied by the vendor 206, in some implementations, the broker 202 issues a client firm order (236) to the platform 204. The firm order may either validate the terms of the quote as adjusted by the vendor 206 or reinstate the initial terms as supplied by the broker 202 in the quote request. The firm order, in some embodiments, may be placed via a firm order user interface 350 as illustrated in FIG. 3F.

Figure 3D:
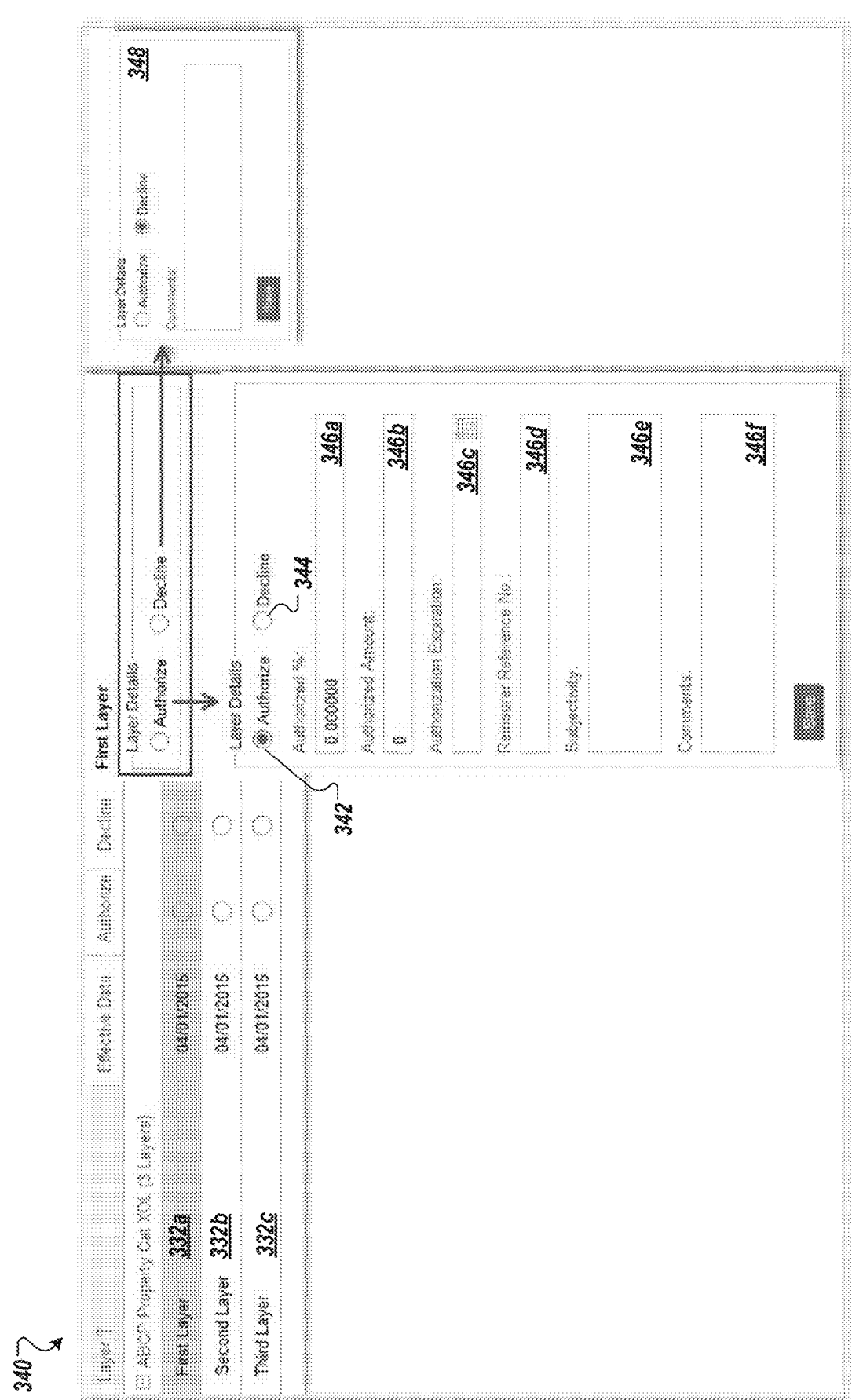
Figure 3E:
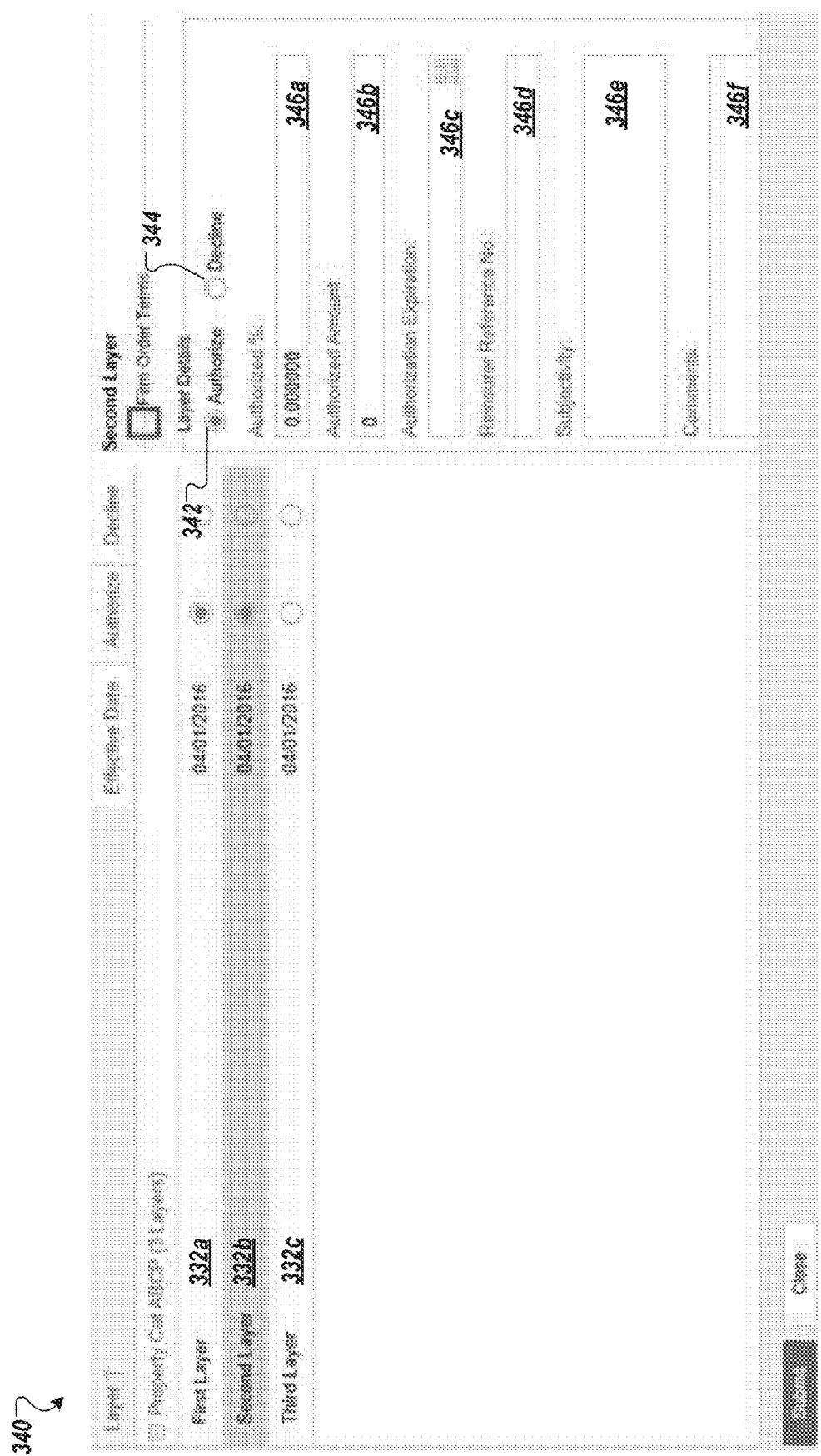
Figure 3F:
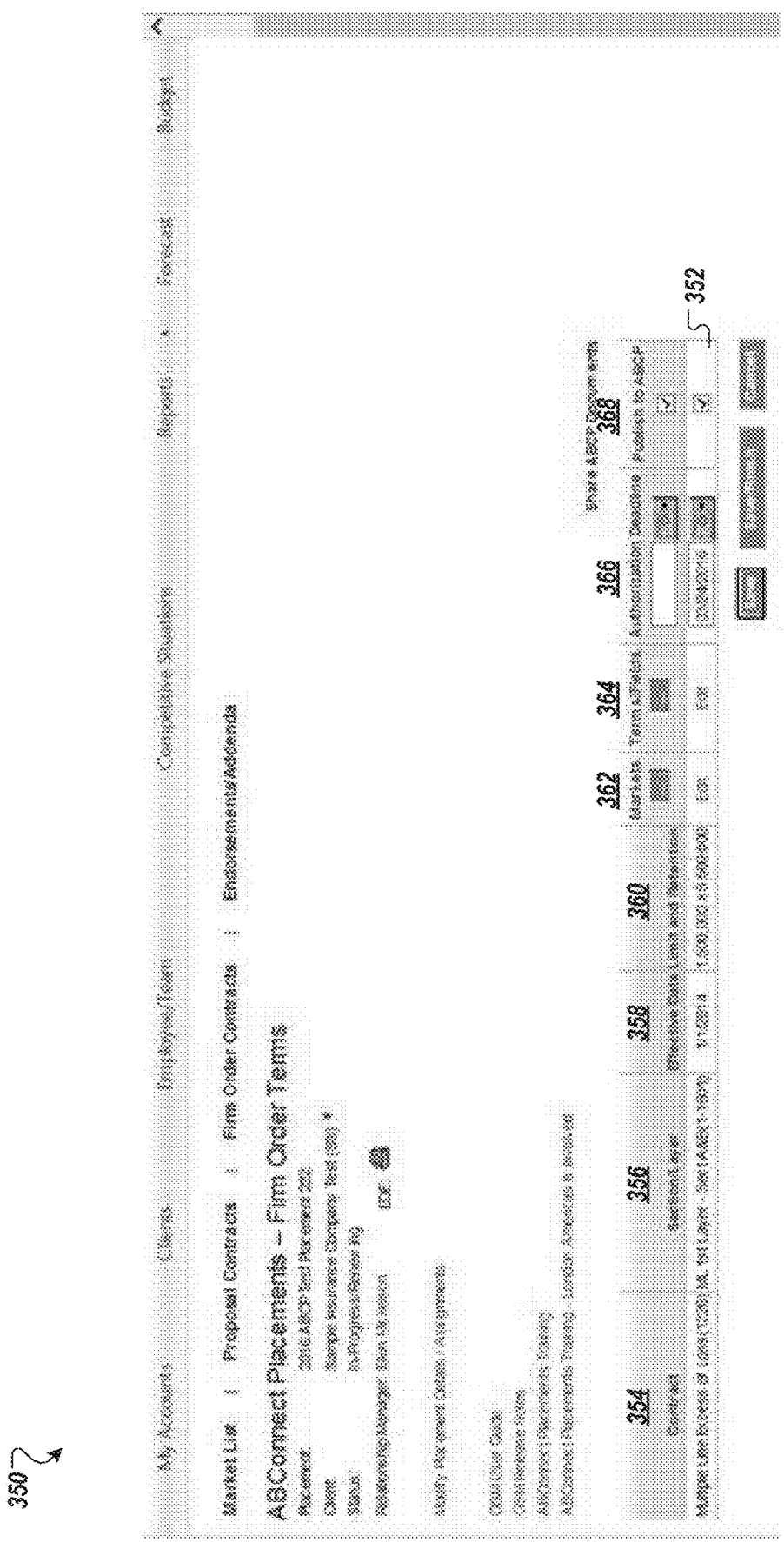

Turning to FIG. 3F, the firm order user interface 350 may include a listing of one or more pending transactions 352. Each pending transaction may be associated with an authorization deadline 366. Each pending transaction may include a transaction name or identifier 354, one or more layer identifiers 356, an effective date 358, and/or a limit and retention value 360. To modify the terms of the quote, a user may select a markets edit control 362 and/or a terms and fields edit control 364.

Upon selection of the markets edit control 362, in some implementations, the user may limit data access of particular markets. A selected market, for example, may be allowed to edit data, such as authorization percent, comments, and subjectivities. Additionally or alternatively, the user may grant read-only access to remaining markets using the markets edit control 362. While the quote enters a read-only state after submission, designated brokers within the selected market may utilize the control to unlock the read-only state and enter/edit data. The market edit control 362 may improve data quality and process management.

Upon selection of the terms and fields edit control 364, in some implementations, the user is presented with a graphical user interface for adding, removing, and/or exchanging present fields included in the pending quote as well as to adjust values associated with each of the terms represented by those fields. The user interface, for example, may be similar to the layer details illustrated in the graphical user interfaces of FIGS. 3D and 3E.

In some implementations, upon completion of validating, adjusting, or reinstating the terms of a particular transaction 354, the user may opt to publish the firm order (e.g., share with the associated reinsurer) via a publication control 368.

Once the firm order terms are established, these options are provided by the broker 202 to the platform 204, in some implementations, as client firm order terms (236).

In some implementations, the platform 204 stores the client firm order terms (238). For example, the firm order terms may be stored to the active quotes data 122 in the transaction data repository 110 by the system 108, as illustrated in FIG. 1. The firm order terms, for example, may be an adjustment validation or a term reinstatement. Further, the present state of the negotiation may be updated in the audit trail data 128 of the audit data repository 114 by the audit trail management engine 144.

In some implementations, the platform 204 provides, for presentation to the vendor 206, a firm order notification and/or firm order review user interface (240). The notification/user interface, for example, may be provided in real-time in response to the broker 202 providing the client firm order terms (236).

In the event of a firm order notification, one or more users associated with the vendor 206, in some implementations, receive an automated notification via a personal computing device, such as a mobile device app notification, as described in relation to the automated notification process described in step 228. The firm order notification, for example, may be prepared and issued by the real-time notification engine 148 of the system 108, as illustrate din FIG. 1. Other examples of real-time notifications include SMS message, a dashboard alert (e.g., supplied by the dashboard GUI engine 134 of the system 108), and an automated voicemail message.

In the event of a firm order review user interface, in some implementations, the vendor 206 is presented with the current terms of the quote, including any reinstatement made by the broker 202. For example, as shown in a layer authorization user interface 340 of FIG. 3D, the vendor 206 may elect to authorize 342 or decline 344 each individual layer 332 of the quote. In the event of authorization, the reinsurer is presented with a set of controls 346 for entering authorization details. In particular, the authorization controls 346, as illustrated, include an authorized percentage data entry field 346a for authorizing the quote up to a percentage difference from the present proposed values, an authorized amount data entry field 346b for authorizing the quote up to a monetary difference from the present proposed values, an authorization expiration data entry field 346c for entering a deadline for client acceptance of the authorization, and a reinsurer reference number data entry field 346d for entering a reinsurer-specific identifier related to the pending quote. Further, the authorization controls 346, as illustrated include a subjectivity text entry region 346e providing a text field for clarification and/or expansion on the meaning and scope of various quote terms and a comments text entry region 346f for adding any quote-specific information not captured by the remaining data entry fields 346.

Alternatively, if the reinsurer declines authorization of one or more of the layers 332, the reinsurer may enter comments into a text entry region of a declination dialogue box 348. For example, the reinsurer may supply reasons for declining authorization to the pending quote.

In some implementations, if the reinsurer declines authorization of one or more of the layers 332, the data mining engine 136 may generate metrics 124 associated with the reinsurer's risk appetite by comparing the terms of the declined layers and the terms accepted by the existing market. The generated metrics 124 may be stored in the transaction data repository 110.

FIG. 3E shows another exemplary screen shot of the layer authorization user interface 340 when the reinsurer selects a second layer 332b. In some embodiments, the vendor 206 may elect to authorize 342 or decline 344 the second layer 332b. In the event of authorization, the reinsurer is presented with a set of controls 346 for entering authorization details. In particular, the authorization controls 346, as illustrated, include an authorized percentage data entry field 346a for authorizing the quote up to a percentage difference from the present proposed values, an authorized amount data entry field 346b for authorizing the quote up to a monetary difference from the present proposed values, an authorization expiration data entry field 346c for entering a deadline for client acceptance of the authorization, and a reinsurer reference number data entry field 346d for entering a reinsurer-specific identifier related to the pending quote. Further, the authorization controls 346, as illustrated include a subjectivity text entry region 346e providing a text field for clarification and/or expansion on the meaning and scope of various quote terms and a comments text entry region 346f for adding any quote-specific information not captured by the remaining data entry fields 346.

Alternatively, if the reinsurer declines authorization of the second layer 332b, the reinsurer may enter comments into a text entry region of a declination dialogue box, such as the text entry region of the declination dialogue box 348 shown in FIG. 3C. For example, the reinsurer may supply reasons for declining authorization to the pending quote.

Upon authorization and/or declination, in some implementations, the vendor 206 provides the authorization and/or declination information (242) to the platform 204. The information may additionally include one or more documents supplied by the vendor 206. For example, the reinsurer may include a contractual agreement, detailed proposal, or other information related to the transaction as a separate document.

In some implementations, the platform 204 stores the reinsurer authorization information (244). For example, the information entered into the data fields 346 or declination reasons entered via dialogue box 348 may be stored to the active quotes data 122 in the transaction data repository 110 by the system 108, as illustrated in FIG. 1. The authorization information, for example, may be a quote validation. Further, the present state of the negotiation may be updated in the audit trail data 128 of the audit data repository 114 by the audit trail management engine 144.

In some implementations, the platform 204 provides a marketing results notification and/or quote review user interface (246) to the broker 202. The notification/user interface, for example, may be provided in response to the vendor 206 submitting the authorization and/or declination information for sharing with the broker 202.

In the event of a marketing results notification, one or more users associated with the broker 202, in some implementations, receive an automated notification via a personal computing device, such as a mobile device app notification, as described in relation to the automated notification process described in step 228. The marketing results notification, for example, may be prepared and issued by the real-time notification engine 148 of the system 108, as illustrate din FIG. 1. Other examples of real-time notifications include SMS message, a dashboard alert (e.g., supplied by the dashboard GUI engine 134 of the system 108), and an automated voicemail message.

In the event of a marketing results user interface, in some implementations, the broker 202 may be presented with the present terms of the quote, including the authorization information and/or declination comments submitted by the vendor 206. For example, as shown in FIG. 6E, a quote process diagram 640 illustrates the terms associated with the pending quote, including the terms 612 authorized by the reinsurer. The broker 202 may review these terms and share with the client. In some implementations, the broker 202 provides client final lines (248) regarding the finalized transaction terms to the platform 204. In some embodiments, the final lines include terms/contracts/details contained in one or more documents for sharing with the vendor 206. This confirms the agreement reached. In some embodiments, rather than including simply an automated collection of the agreed upon terms, the broker representative submitting information through the broker 202 has the opportunity to enhance or customize the final lines information with additional information. In some examples, the broker representative may add a personalized note, such as a thank you or a request for feedback, or other brokerage-specific information, Further, in some embodiments, the broker 202 may be invited to acknowledge and confirm the content of the final lines. In response to receiving the client final lines, in some implementations, the platform 204 stores the client final lines (250). For example, the client final lines information may be stored to the active quotes data 122 in the transaction data repository 110 by the system 108, as illustrated in FIG. 1. Further, the present state of the negotiation may be updated in the audit trail data 128 of the audit data repository 114 by the audit trail management engine 144. The details, in some embodiments, may be released to the data mining engine 136 of FIG. 1 for developing metrics data. The data mining engine 136, for example, may combine the present transaction data with other historical transaction data in developing metrics data 124, stored in the transaction data repository 110.

Figure 12A:
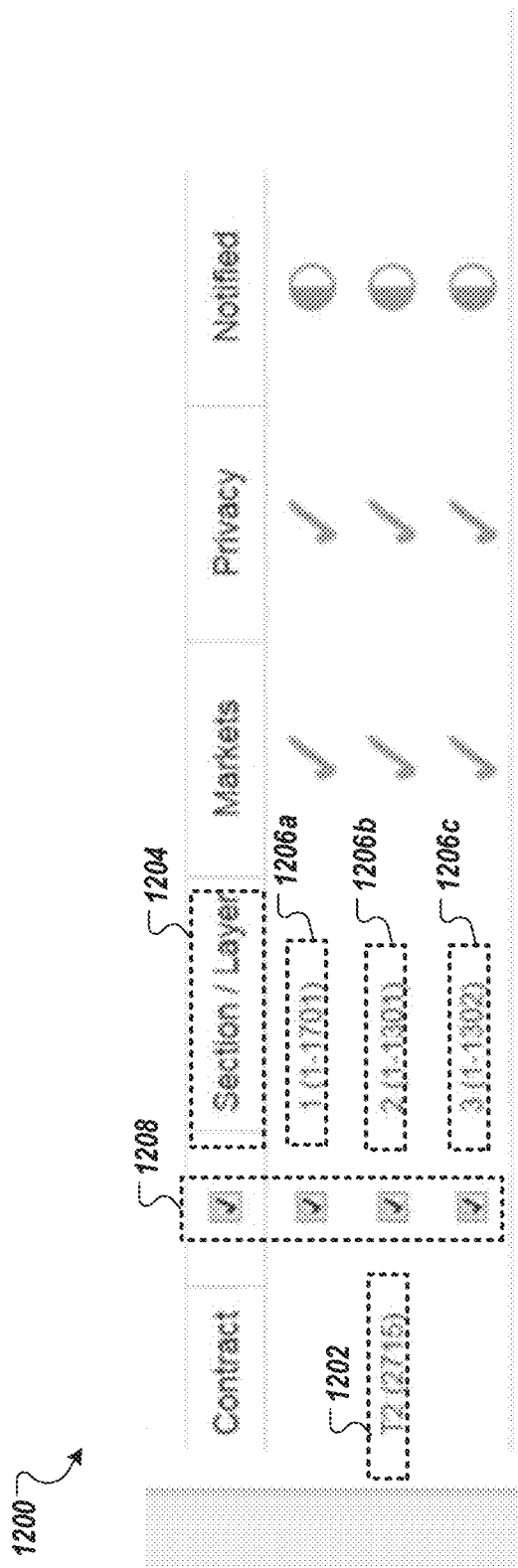
FIGS. 12A-12B provide an illustrative example of user interface screens for boundary layer template customization for vendors
Figure 12B:
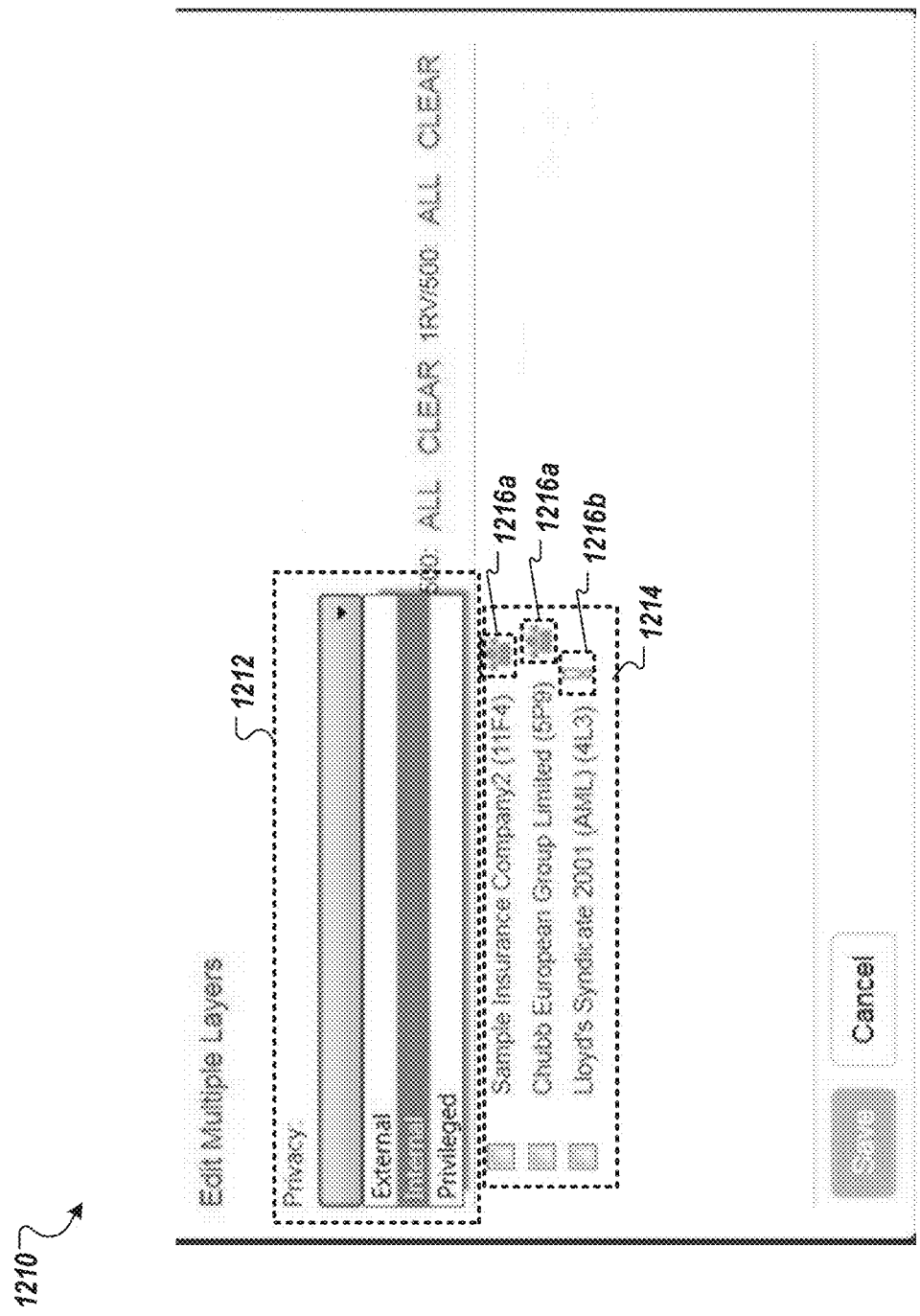

In some implementations where transaction negotiation documents are transmitted to multiple vendors 206 with different layer settings and preferences, the platform 204 can customize the layers within a negotiation template based on the layer settings and preferences for individual vendors 206. The layer customization allows the brokers 202 to control which vendors 206 are notified of bound lines for a quote or signed lines and which bound lines are presented to which of the vendors 206. For example, FIGS. 12A-12B provide an illustrative example of boundary layer template customization for vendors. FIG. 12A represents a portion of a dashboard interface screen 1200 that allows brokers 202 to provide customized final lines notifications within a final lines template to vendors 206 based on the layer settings and preferences. In some implementations, for a given transaction negotiation for a contract 1202, the brokers 202 may transmit final lines notifications to multiple vendors 206 having different layer settings and preferences 1204 for each section of the contract 1202. In one example, the layer settings and preferences 1204 presented on the dashboard interface screen 1200 may include a deductible range and/or classification code 1206a, 1206b, 1206c associated with each section of the contract that corresponds to stored preferences for a particular vendor, such as the information included in the vendor data 116 (FIG. 1). In some aspects, the deductible range and/or classification code 1206 may include corresponding verbiage associated with a specific region of the vendor 206 receiving the notification, such as Sarbanes-Oxley (SOX) compliance notifications that are used in the United States, or verbiage that is specific to a product or vendor. In some implementations, the platform 204 may automatically make one or more of the deductible range selections 1208 based on the stored preferences for a vendor 206. In addition, a broker 202 may be able to manually select or deselect the selections 1208 instead of or in addition to the automatic selections made by the platform 204.

FIG. 12B represents another portion of a dashboard interface screen 1210 that allows brokers 202 to provide customized transaction notifications to vendors 206, such as final lines notifications, based on the layer settings and preferences. In some implementations, a privacy layer selection 1212 may allow brokers 202 to select, on a layer-by-layer basis, which message recipients can view a particular layer or section of the final lines notification. For example, each contact associated with a vendor 1214 may have an assigned privacy or security level that corresponds to a highest level of privacy of a final lines notification or other type of message or document that the contact may be permitted to view. In the example of FIG. 12B, each section of a quote may have a corresponding privacy level of external, internal, or privileged in which "external" may indicate a lowest level of privacy and "privileged" may indicate a highest level of security. In some examples, for each of the vendors 1214, the dashboard interface screen 1210 may also include an icon 1216 indicating whether or not privacy levels have been assigned to one or more of the contacts associated with a vendor 1214. For example, icon 1216a may indicate that contact privacy levels have been assigned, while icon 1216b may indicate that contact privacy levels have not been assigned.

Figure 13A:
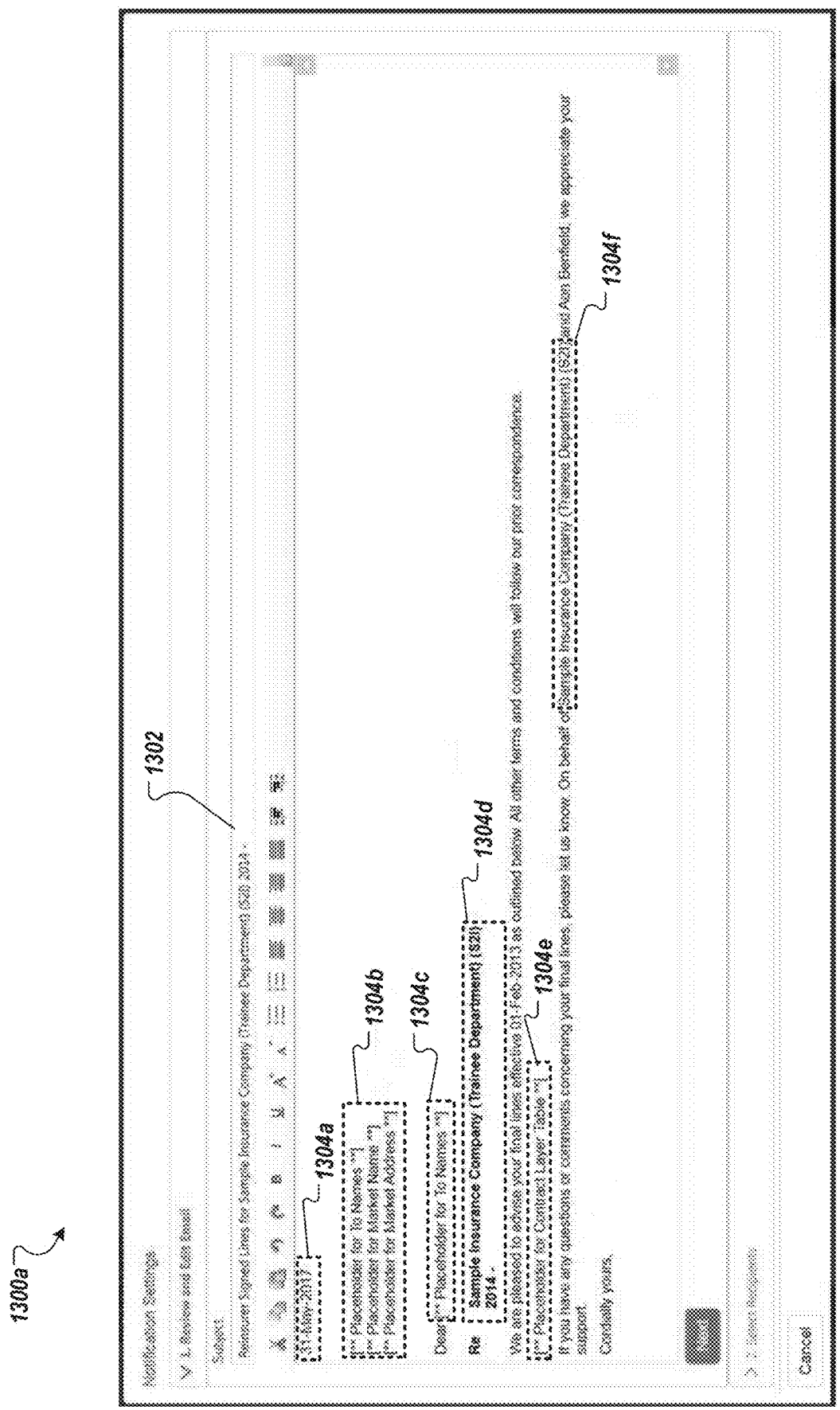
FIGS. 13A-13B illustrate exemplary dashboard interface screens utilized by a broker when preparing a message associated with a transaction negotiation to be sent to vendors.
Figure 13B:
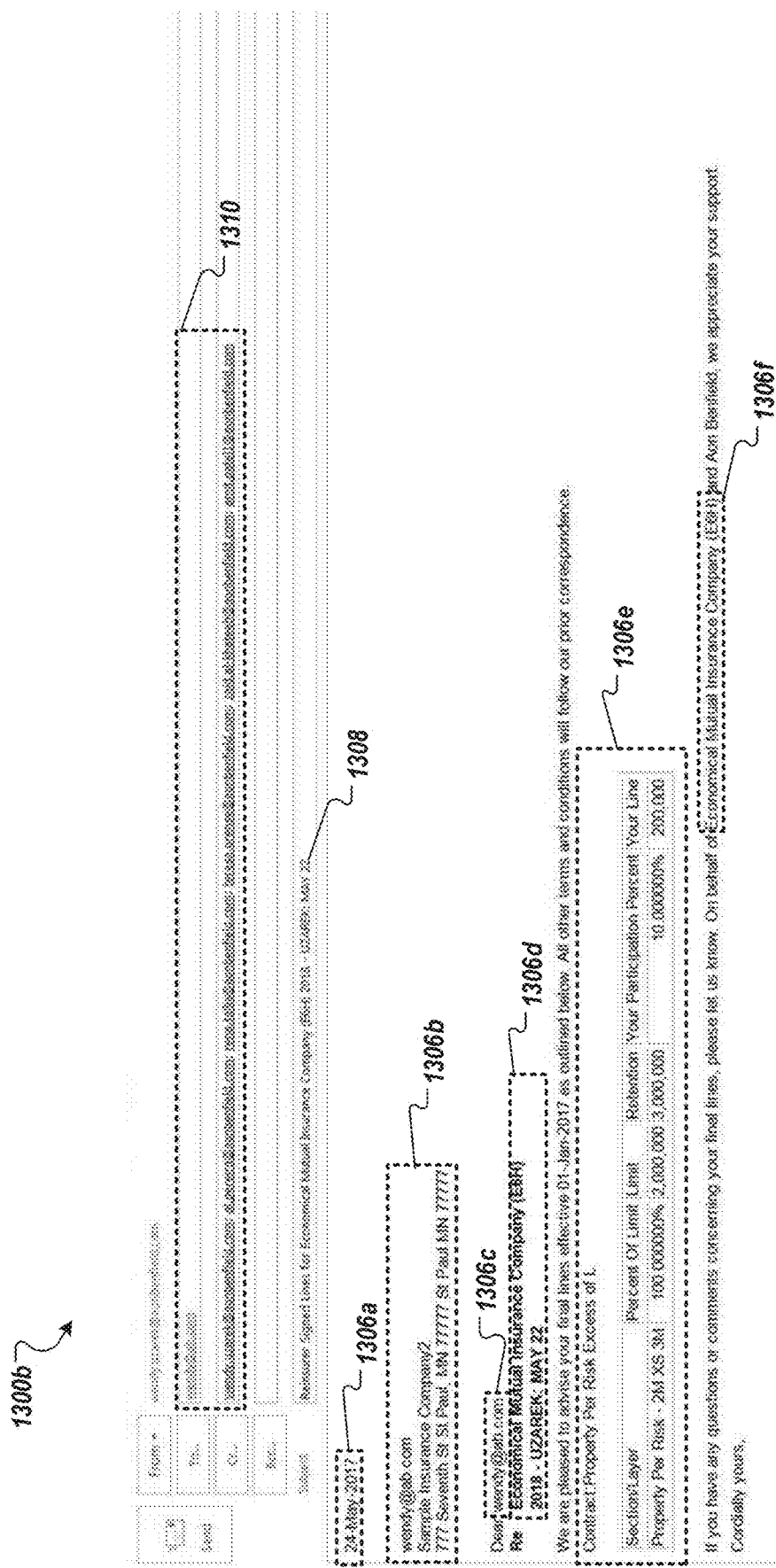

FIGS. 13A-13B illustrate an example of user interface screens utilized by a broker 202 when preparing a message associated with a transaction negotiation to be sent to vendors 206 in various markets. For example, FIG. 13A illustrates a review and edit template UI screen 1300a that allows a broker to modify a final lines notification message template prepared by the negotiation automation engine 142, and FIG. 13B represents a runtime final lines notification message 1300b that is populated with customized template details associated with one or more message recipients shown in the review and edit template UI screen 1300a.

Referring to FIG. 13A, the review and edit template UI screen 1300a may be similar to the UI screen 916a (FIG. 9B) that is used by the brokers 202 to prepare a quote request message. In some implementations, each quote template 120 (FIG. 1) stored in the transaction repository 110 may have an associated notification template 121 that may be used by a negotiation automation engine of the platform 204 in preparing final lines notifications to be sent do the vendors 206. In one example, the UI screen 1300a may present a final lines notification message to the broker 202 in an email message format that may include a combination of editable and/or non-editable fields. For example, the final lines notification message may include a non-editable subject line 1302, non-editable placeholder fields 1304, and editable fields that correspond to any fields within the template that are not non-editable placeholder fields 1304. In the example illustrated in FIG. 13A, the final lines notification message template may include non-editable placeholder fields for a message date 1304a, name and address information 1304b, greeting name 1304c, vendor and contract information 1304d, contract layer table 1304e, and vendor name 1304f.

FIG. 13B represents a runtime final lines notification message 1300b that is populated with customized template details associated with one or more message recipients shown in the review and edit template UI screen 1300a. In some implementations, the final lines notification message 1300b includes data fields that correspond to the placeholder fields presented in the review and edit template UI screen 1300a. In some examples, the subject line 1308 corresponds to the non-editable field 1302, and data fields 1306 correspond to each of the non-editable placeholder fields 1304. For example, at runtime when the final lines notification message 1300b is transmitted to the vendors 206, the platform 204 may populate each of placeholder fields 1304 with customized final lines information that corresponds to a particular vendor and transaction negotiation, such as a message date 1306a, name and address information 1306b, greeting name 1306c, vendor and contract information 1306d, contract layer table 1306e, and vendor name 1306f. In addition, the final lines notification message 1300b may include message recipients 1310 based on selections made by the brokers 202 at a recipient selection UI screen, such as the UI screen 916b (FIG. 9C). When a "send" selection 1312 is made, the final lines notification is sent to the vendors 206, and copies of the final lines notification and any corresponding documentation may be automatically copied, tagged, and stored as audit trail data in one or more data repositories by the platform 204.

Returning to FIG. 2B, in some implementations, the platform 204 provides a final lines review user interface (252) to the vendor 206 for review of the finalized information. For example, the reinsurer may access the completed transaction information via a dashboard interface.

In some implementations, the platform 204 prepares and stores the audit trail regarding the finalized transaction (254). Rather than updating the audit trail at each stage of the transaction, for example, audit trail information may be collected and stored after the transaction is finalized (or, alternatively, canceled at a prior step within the transaction process 200).

In some embodiments, with proper authorization, the auditor system 106, the vendor computing systems 104, or the brokers computing systems 102 may access the audit trail information 128 in the audit data repository 114 to search for misplaced information relating to current or past quotes. For example, in the event of a catastrophic system failure relating to a repository system relating to the vendor computing systems 104, the reinsurer may access the audit data repository 114 to retrieve documents relating to the state of negotiation.

In certain implementations, various departments within the organization managing the system 108 may access the audit data repository 114, the transaction data repository 110, and/or the document repository 112. For example, a legal department within the organization may access the audit trail information 128 for internal auditing in order to satisfy local and federal government compliance. A marketing department may utilize stored information to generate marketing data and develop marketing strategy.

Continuing the discussion relating to FIG. 1, in some exemplary embodiments, an information technology department within the organization may monitor the audit trail information 128 stored in the audit data repository 114 to assess the performance and functionality of the system 108, and the repositories 110, 112, 114. Alternatively, an information technology (IT) department may rely on data collected from the audit trail information 128 to assess the overall health of the environment 100.

In some embodiments, the accounting department within the organization may use the audit trail information 128 to generate reports detailing the financial state of the organization and sanity check transactions. The accounting department may compile statistical data relating to risk appetite, market trend, etc.

If, for example, disputes relating to the quotes arise during or after the completion of a transaction, internal and/or external audit teams may access the audit trail information 128 in the audit data repository 114 for proof of a binding contact including stated terms and conditions. External accounting agencies may similarly access the audit trail information 128 for independent auditing and/or settling possible dispute.

In certain embodiments, the audit trail information 128 may include both content data and metadata. The metadata may indicate a user identification number of a broker, a user identification number of a reinsurer and timestamp for a transaction. The metadata may be available to the internal/external auditors.

Although illustrated as a single entity "platform 204", the platform 204 may include a number of interoperating systems, such as a reinsurer-interfacing system, a broker-interfacing system, and an audit trail management system. Similarly, the broker 202 and/or vendor 206 may represent a number of computing devices and/or system. For example, a first broker user or computing device may supply the quote request template parameter settings (210), while a different broker user or computing device applies the contract layer settings (218).

Although illustrated in a particular series of events, in other implementations, the steps of the transaction process 200 may be performed in a different order. For example, the broker may iterate between setting template parameter settings (210), deadline(s) (216) and/or contract layer settings (218) while setting up a quote request for a reinsurer. Additionally, in other embodiments, the transaction process may include more or fewer steps while remaining within the scope and spirit of the transaction process 200.

FIG. 7 illustrates an example response received by a broker for a previously submitted quote. An authorization confirmation table 700 includes, for example, four contract layers 710 from up to four different reinsurers. Each layer may include an authorize response 720, an authorization expiration 730, a subjectivity 740, and comments 750. In some implementations, the broker may receive the authorization confirmation from four reinsurers, with each reinsurer responding to a different layer. Reinsurer 1 may respond to layer 1 710a with an authorize response 720a of 15.000000%, an authorization expiration date 730a of Mar. 10, 2016, and a subjectivity 1 740a. The authorize response 720a includes an authorized percentage difference from the present proposed values included in the quote. The authorization expiration 730a indicates the date of expiration for the authorization confirmation for layer 1 710a provided by Reinsurer 1. The subjectivity field 740a may include additional terms and conditions for the contract.

In certain embodiments, Reinsurer 2 may enter a comment 750a for layer 2 710b with response for adding any quote-specific information not captured by the remaining data entry fields. Reinsurer 4 for layer 4 710d may choose to decline the submitted quote in the authorize response 720b, and provide a reason for declination in a comment field 750b.

In some implementations, the authorization confirmation table 700 shown in FIG. 7 may be presented in a dashboard interface similar to those shown in FIGS. 3A-3E. The dashboard interface may be provided to the broker computing system 102 by the dashboard GUI engine 134. The dashboard GUI engine 134 may routinely update dashboard interface on the broker computing system 102 as reinsurers for different layers submit their responses separately. Alternatively, the dashboard GUI engine 134 may wait for responses from all reinsurers before sending the authorization confirmation table 700 to the broker computing system 102.

Figure 5C:
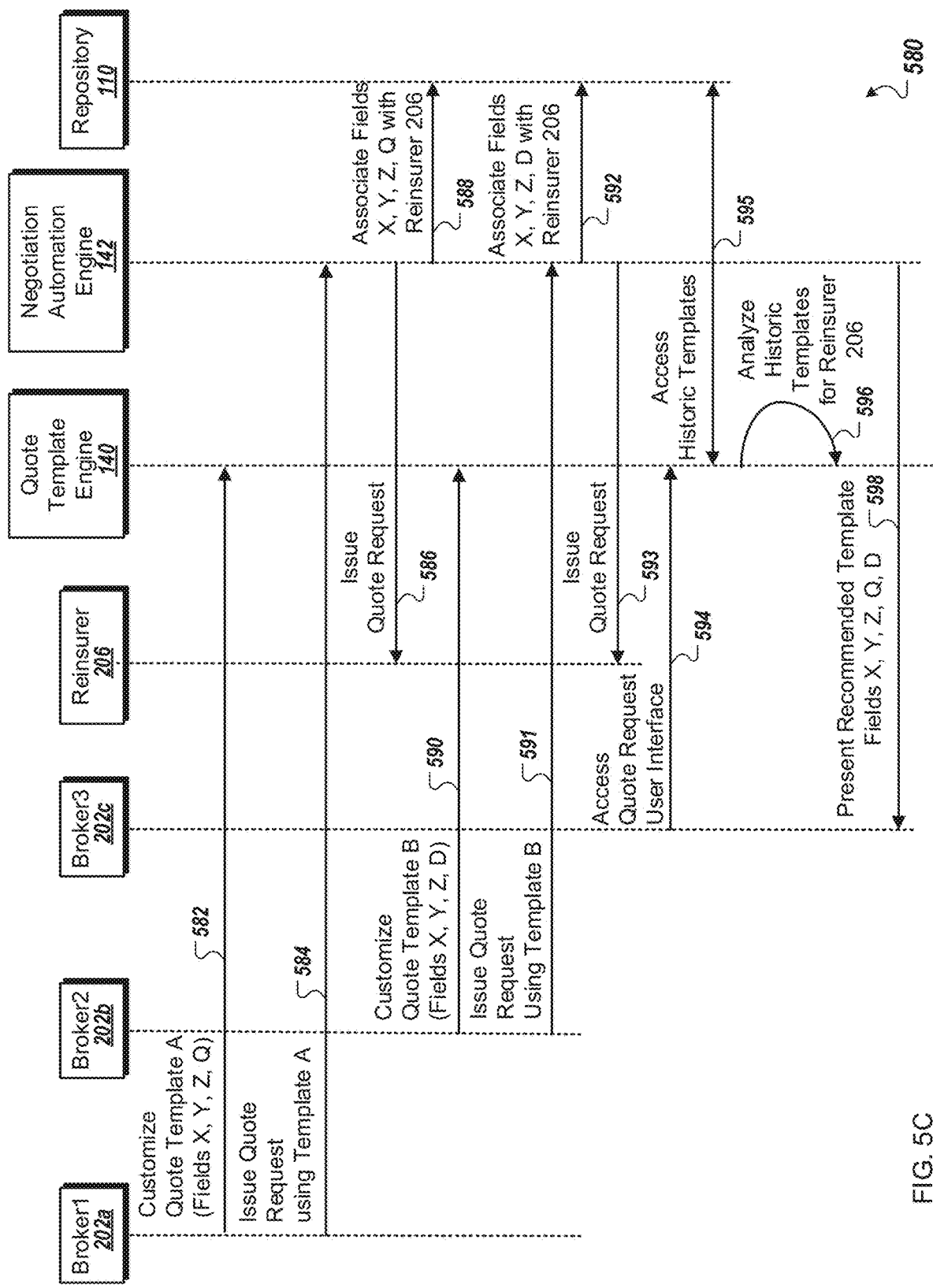
FIG. 5C is a swim lane diagram illustrating example communication flows.

FIG. 5C is a flow diagram illustrating communication flows between a first, second, and third brokers 202, vendor 206, negotiation automation engine 142, transaction data repository 110, and quote template engine 140 during example transaction processes 580. The transaction processes 580, for example, may be supported by the environment 100 of FIG. 1, where the brokers 202 represent the broker computing systems 102 and the vendor 206 represents the vendor computing systems 104.

In some implementations, a first broker 202a customizes (582) a quote template "Quote Template A" using fields X, Y, Z, and Q via the quote template engine 140. The quote template, for example, may be built using the user interface 580 described in relation to FIG. 5B. The first broker 202a may reside or do business in a first geographic region (e.g., country, province, continent, etc.). The first broker 202a may or may not have a preexisting business relationship with vendor 206.

In some implementations, the first broker 202a issues (584) a request for a quote via the negotiation automation engine 142. The request, for example, may be submitted by the first broker 202a via the quote request interface itself or via an additional user interface including selection of the preexisting quote template. The request, for example, may identify vendor 206 as a particular (targeted) reinsurer or as one of a list of reinsurers identified by the user. The reinsurer, in a particular example, may be selected by the first broker 202a via a reinsurer selection interface. The quote request, in another example, may be entered via a quote request interface such as the quote request 600 illustrated in FIG. 6A.

In some implementations, the negotiation automation engine 142 issues (586) the quote request to vendor 206. Issuance may be based upon selection of vendor 206 by the first broker 202a. Alternatively, the negotiation automation engine 142 may identify vendor 206 as an appropriate candidate for the quote request based upon the information provided by the first broker 202a. In transmitting the quote request, in some examples, the negotiation automation engine 142 may provide the vendor 206 with access to review quote information via a dashboard interface, or the negotiation automation engine 142 may issue a real-time notification regarding submission of the quote request by the first broker 202a.

In some implementations, the negotiation automation engine 142 associates (588) the fields selected in Quote Template A (X, Y, Z, Q) with the vendor 206 in the repository 110. The repository 110, for example, may include a collection of quote templates prepared via the quote template engine arranged in a database associating each quote template with contextual parameters such as, in some examples, creator of the quote request (e.g., broker), receiver(s) of the quote request (e.g., reinsurers), business segment, geography, deal size, date, product, client, etc.

Although illustrated as occurring after step 586 of issuing the quote request, in other embodiments, step 688 of associating the fields of Quote Template A may occur prior to or simultaneous with step 586. Additionally, although customizing the quote template is illustrated as being handled by the quote template engine 140, while issuance of the quote request is illustrated as being handled by the negotiation automation engine 142, each of these steps may be part of what the first broker 202*a* perceives as a single graphical user interface-guided process, for example managed by the dashboard GUI engine 134 of FIG. 1. Other modifications are possible while remaining within the scope and intent of the example transaction processes 580.

At a later time, a second broker 202*b* initiates a similar transaction process. In some implementations, the second broker 202*b* customizes (590) a quote template using fields X, Y, Z, and D via the quote template engine 140. The quote template, for example, may be built in a similar manner as described above in relation to step 582. The second broker 202*b* may reside or do business in a second geographic region different than the first geographic region. The second broker 202*b*, similar to the first broker 202*a*, may or may not have a preexisting business relationship with vendor 206.

In some implementations, the second broker 202*b* issues (591) a request for a quote via the negotiation automation engine 142. The request, for example, may be submitted by the second broker 202*b* in a similar manner as described above in relation to step 584.

In some implementations, the negotiation automation engine 142 associates (592) the fields selected in Quote Template B (X, Y, Z, D) with the vendor 206 in the repository 110. Association may be conducted in a manner similar as described above in relation to step 588.

In some implementations, the negotiation automation engine 142 issues (593) the quote request to vendor 206. Issuance may be implemented in a manner similar as described above in relation to step 586.

At a later time, a third broker 202*c* accesses (594) the quote request user interface via the quote template engine 140 to request a quote from at least vendor 206 (and, optionally, one or more additional reinsurers). The third broker 202*c* may reside or do business in a third geographic region (e.g., country, province, continent, etc.). The third broker 202*c* may or may not have a preexisting business relationship with vendor 206.

To aid in template development, in some implementations, the quote template engine 140 accesses (595) previously stored templates associated with vendor 206 from the repository 110 and analyzes (596) the previously stored templates to determine a recommended template. The previously stored templates, in some embodiments, may all be associated with vendor 206. The quote template engine 140, in some examples, may identify Template A and Template B as sharing certain contextual parameters with the quote request being developed by the third broker 202*c* such as, in some examples, creator of the quote request (e.g., broker), receiver(s) of the quote request (e.g., reinsurers), business segment, geography, deal size, date, etc. Further, the quote template engine 140 may consider the recency and frequency of use of each of the previously stored templates.

In some implementations, the quote template engine 140 presents (598) the recommended template fields X, Y, Z, Q, and D to the third broker 202*c* via the quote request user interface. For example, the recommended template fields X, Y, Z, Q, and D may be automatically populated in the menu 564 of the quote customization user interface 560 of FIG. 5B. In another example, the available fields in the menu 562 of the quote customization user interface 560 may be rearranged such that the recommended template fields X, Y, Z, Q, and D are presented at the top of the list.

These types of processes may continue, with the repository 110 building information regarding templates frequently used and fields most frequently desired by a number of brokers, and the quote template engine 140 may continue, based upon the increasing information, to refine recommendations based upon quote templates used in similar circumstances to those presented by a current requestor. In some implementations, the quote template engine 140 may track a usage history of each template for a requestor. The quote template engine 140 may also record a number of times a requestor uses a suggested template.

Figure 10A:
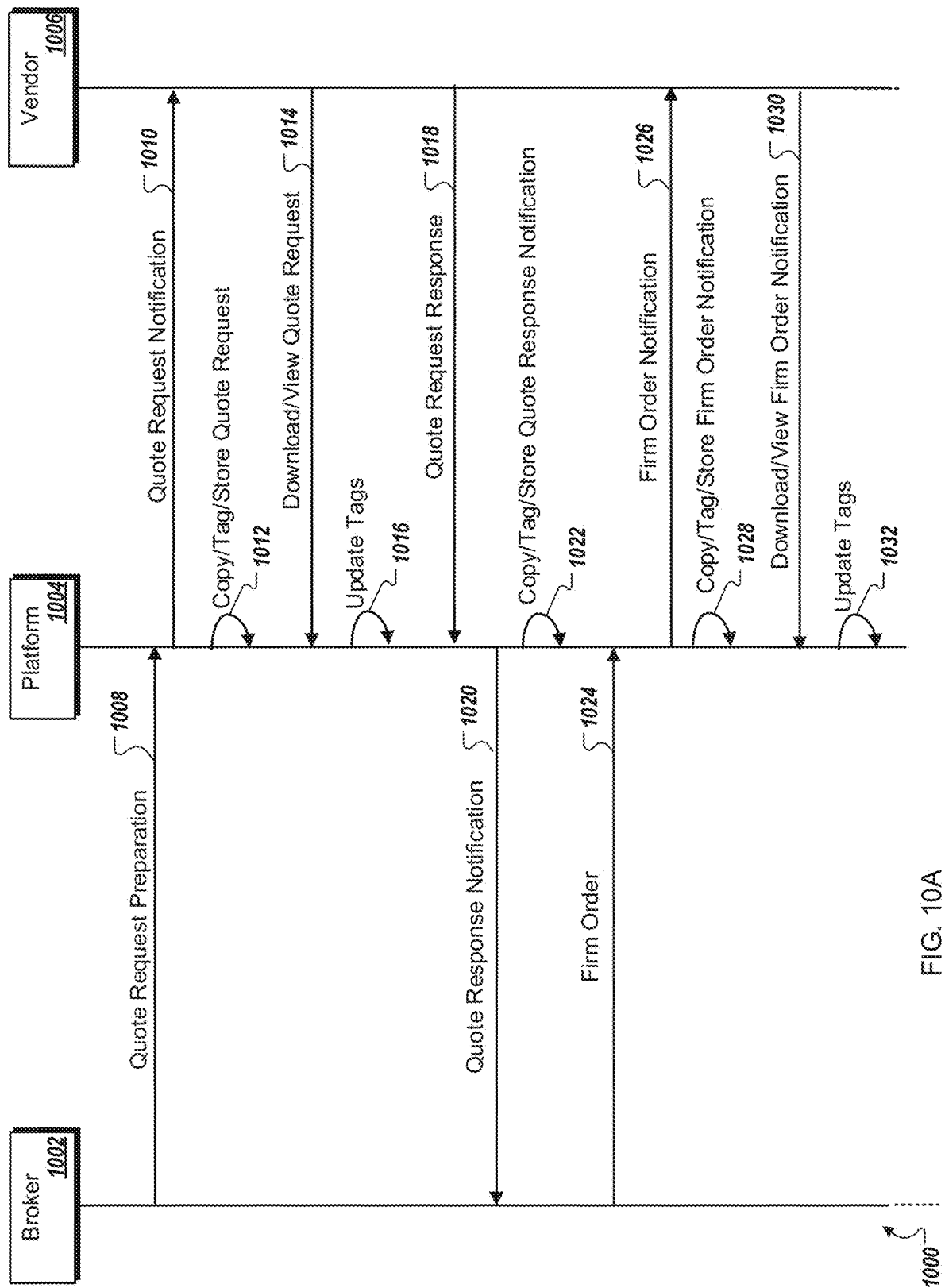
FIGS. 10A-10B are a swim lane diagram illustrating an example method for capturing audit trail data during transaction negotiation.
Figure 10B:
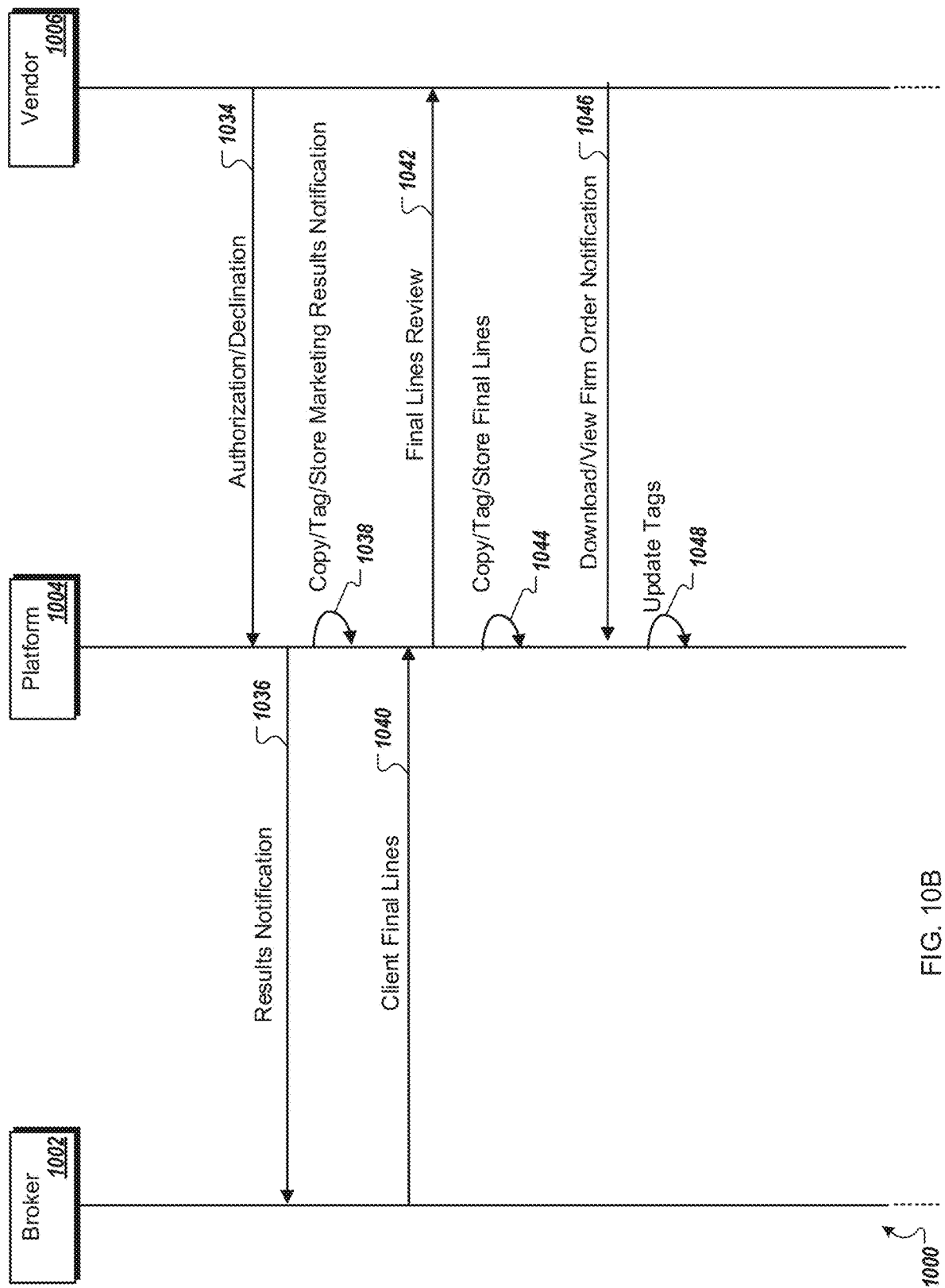

Turning to FIG. 10A-10B, a flow diagram illustrates communication flows between a broker 1002, a platform 1004, and a vendor 1006 during an example transaction process 1000 that illustrates an example of how audit trail data 128 is captured by the platform 1004 during the transaction negotiation. The transaction process 1000, for example, may be supported by the environment 100 of FIG. 1, where the platform 1004 represents the system 108, the broker 1002 represents the broker computing systems 102, and the vendor 1006 represents the vendor computing systems 104. The transaction process 1000 shown in FIGS. 10A-10B represents a condensed version of the transaction of the flow diagram of FIGS. 2A-2B and may not illustrate the multiple interactions shown in FIGS. 2A-2B that may occur between the user 1002 or vendor 1006 and the platform 1004 related to preparation and presentation of user interface screens and templates during the course of the transaction. For example, quote request preparation (1008) may include steps 208-226 of the flow diagram shown in FIG. 2A.

As shown in FIG. 10A, in some implementations, the transaction process 1000 begins with the broker 1002 using the platform 1004 to prepare a quote request to provide to one or more vendors 1006 (1008). For example, as discussed above, the broker 1002 may interact with the platform 1004 through various user interface screens to provide quote template parameter settings, select vendors, deadlines, and contract settings, and upload documentation associated with a quote request. In some examples, a prepared quote and any associated documentation may be transmitted by the platform 1004 to contacts associated with any selected vendors 1006 with a security access level that allows the recipient to at least view the quote request (1010). In some examples, the quote request may be transmitted to the vendors 1006 via an email message.

In some implementations, transmission of the quote request message to the vendors 1006 may trigger the platform 1004 to automatically copy, tag, and store the quote request and associated documents as audit trail data in storage locations based on security/access controls for the quote request (1012). For example, the quote request tags may include tags such as vendor names, contact names and email addresses for each of the vendors, document types, privacy/access settings for the message and each associated document, and date and time stamp indicating when the message was sent. In some examples, the storage locations for the quote request message and associated documents may be determined by the platform 1004 based on the assigned tags. In some aspects, the copying, tagging, and storing of the audit trail data may be performed in real time in response to transmitting the quote request message.

Figure 11:
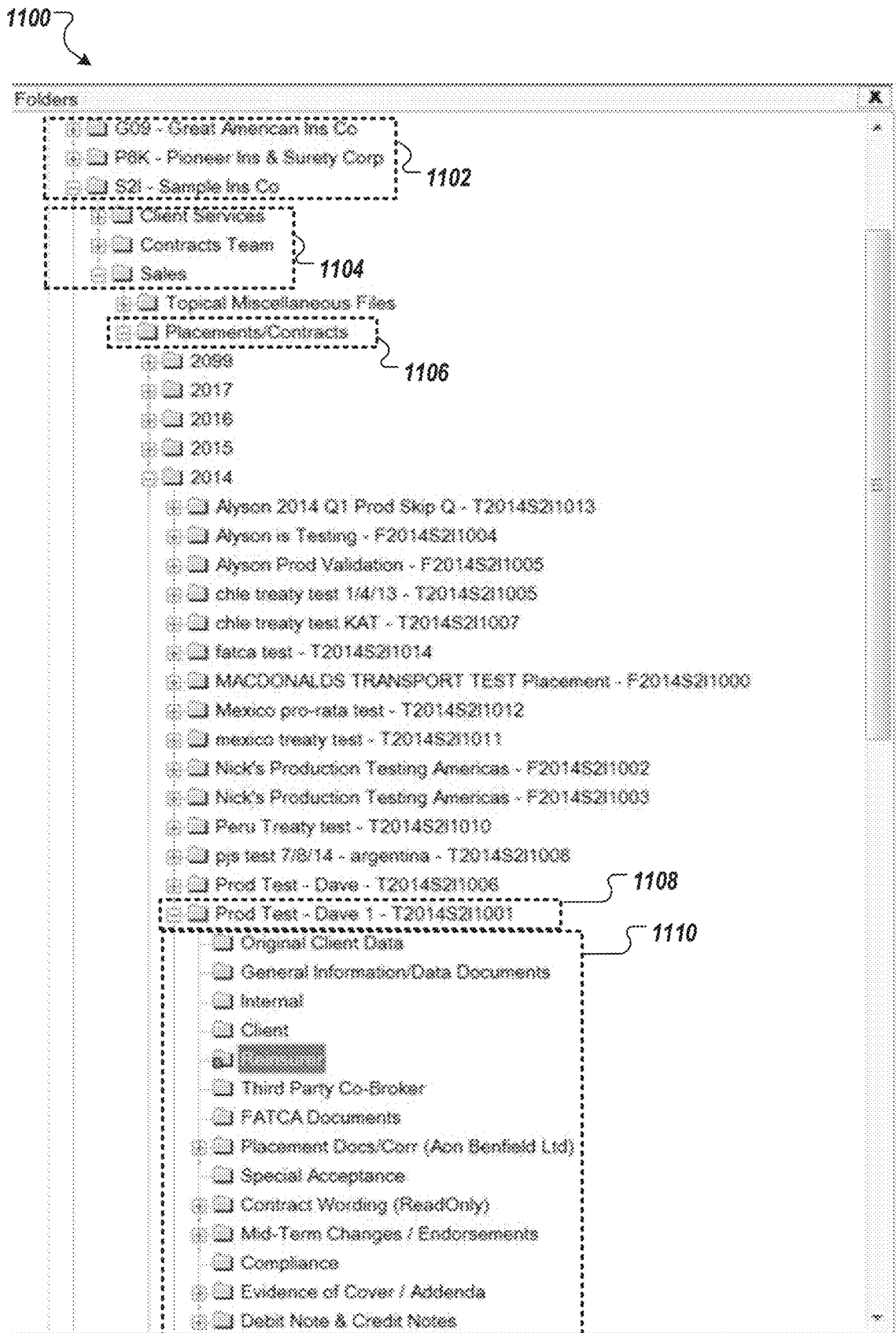
FIG. 11 illustrates an exemplary organizational structure for a saving audit trail data in a data repository.

FIG. 11 provides an illustrative example of how a document repository 1100 for the platform 1004 may be organized for the filing of audit trail data associated with a transaction, and the folders illustrated and described in FIG. 11 represent an organizational structure for the data repository 1100 that can be used to efficiently compile compliance data and audit trail reports and manage privacy/security controls for the documents stored in the data repository 1100. For example, each folder at each level of the organizational structure of the data repository 1100 may have individualized access control settings based on vendor, department, employee position, etc. to ensure that proper document security is maintained.

In some implementations, the audit trail data may be organized into vendor folders 1102 representing each of the vendors 1006 that have entered into transaction negotiations with the brokers 1002 and/or have registered accounts with the platform 1004. In some implementations, each vendor folder 1102 may include employee division/department folders 1104 representing each division/department within a vendor company to which a vendor contact may be assigned (e.g., client services, contracts team, sales). Each of the folders 1104 may drill further down into job title and even individual employee folders so that document access can be controlled down to an individual person accessing the platform 1004. In some examples, the platform may copy/mirror multiple versions of the same document into multiple folders based on the access controls associated with each of the folders.

In some embodiments, each of the employee division/department folders 1104 may include a contracts folder 1106 that retains files associated with transaction negotiations, such as those described herein. In some examples, the contracts folder 1106 may be organized chronologically, such as by year. In addition, each contracts folder 1106 may include a separate transaction folder 1108 for each negotiation that may occur with a particular vendor 1006. In some examples, a transaction folder 1108 may be established by the platform 1004 when a quote request message is transmitted to a vendor 1006. Each transaction folder 1108 may be organized into individual tag folders 1110 associated with each tag assigned to any of the documents for a transaction negotiation.

Figure 18:
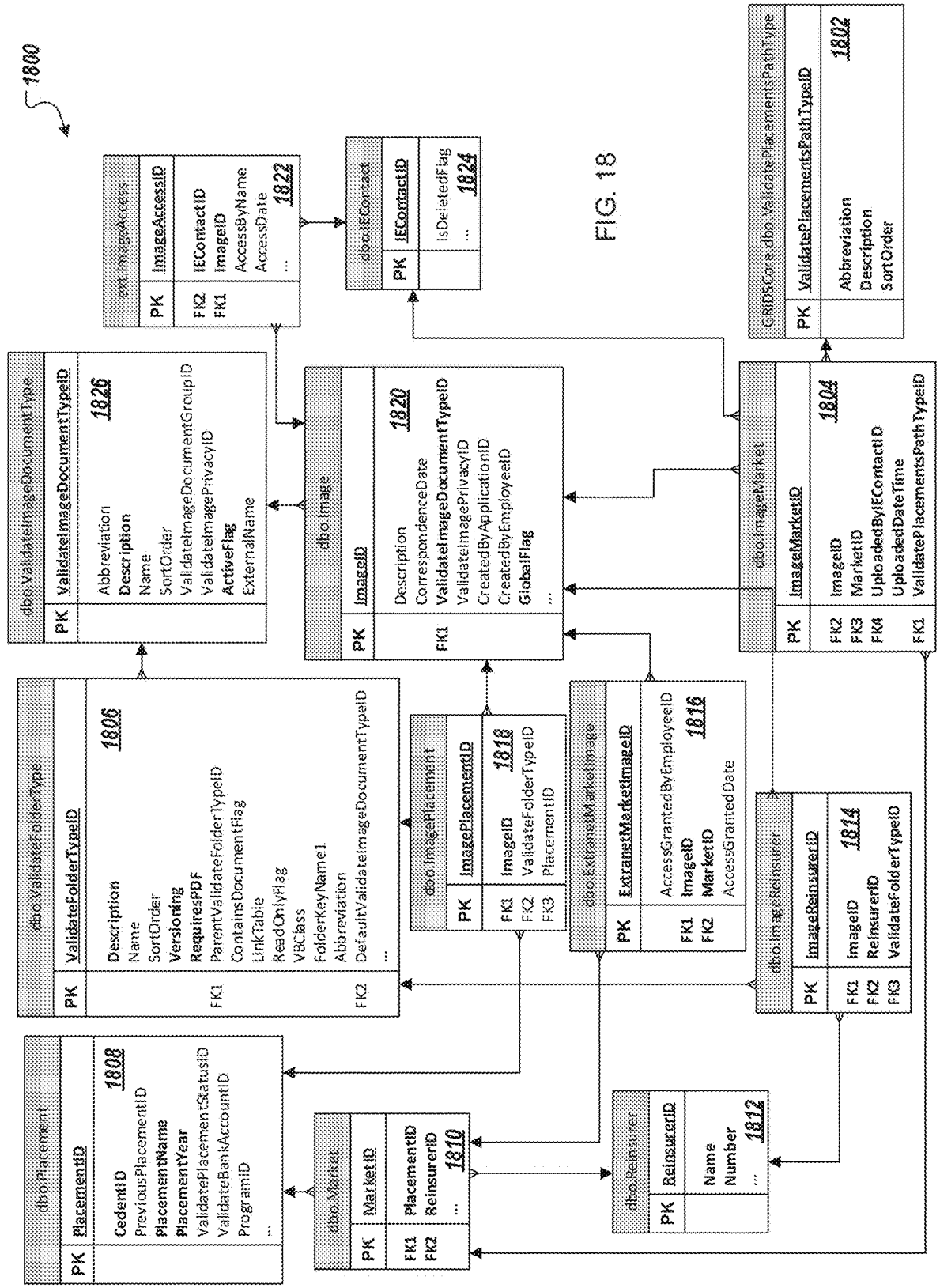

FIG. 18 illustrates a portion of an entity relationship diagram (ERD) 1800 that allows for maintaining document access security within the data repository 1100 of the platform 1004. In some implementations, when a broker 1002 transmits a message (e.g., quote request, firm order, final lines) to one or more vendors 1006 including one or more documents associated with the transaction negotiation, the platform 1004 is able to ensure that only those vendors 1006 and brokers 1002 associated with the negotiation are able to access the shared messages and documentation based on the relationships delineated in the ERD 1800. In addition, the relationships shown in the ERD 1800 allow specific vendors 1006 (e.g., underwriters) to access, download, and/or edit documents that have been the proper access permissions associated with the vendors 1006. The entity relationships established by the ERD 1800 may also allow the vendors 1006 to access documents that they have uploaded to the platform 1004 themselves. In some examples, when a user (e.g., broker 1002, vendor 1006) logs into the platform 1004 to access documents associated with a particular transaction negotiation, only those documents uploaded by the user or those documents that the user has been given access to are presented for selection on one or more graphical user interface screens of the platform 1004.

For example, a placement validation block 1802 may ensure that a platform user associated with a broker 1002 or vendor 1006 (also referred to as a reinsurer or market) may be provided access to documents (images) associated with a transaction negotiation (placement) that the platform user is involved with. In addition, image market block 1804 may provide relationship information to the placement validation block 1802 regarding which vendors 1006 particular documents are associated with, which may also be provided to image identification 1820 and insurance entity contact 1824 blocks. Further, a document stored within the data repository 1100 of the platform 1004 may be identified at the image identification block 1820 based on referenced entities in the image market block 1804, image reinsurer (user) block 1814, vendor document identification block 1816, document placement identification block 1818, and document access identification block 1822.

In some examples, a validate folder type block 1806 allows a document stored within a folder of the data repository 1100 to be categorized based on an associated transaction negotiation, and the information provided by the validate folder type block 1806 may be referenced at the image placement block 1818 and the image reinsurer block 1814, which may include reinsurer identification information provided in a reinsurer identification block 1812. In addition, a validate document type block 1826 may allow a particular document type to be categorized based on a folder in which the document is stored as indicated by the validate folder type block 1806 and document identification information provided by the image identification block 1820. Further, the ERD 1800 also provides for identifying a particular transaction negotiation (placement) at a placement identification block 1808, which can be used to identify associated vendors provided at the market identification block 1810 and the documents associated with the transaction negotiation provided at the document placement identification block 1818.

Returning to FIG. 10A, in some examples, the vendors 1006 may access the quote request and any associated documents at the platform 1004 by selecting a link provided in the quote request message (1014), such as the link 924 (FIG. 9B). In some implementations, when any of the vendor contacts who received the quote request message access the quote request at the platform 1004, the platform 1004 may update interaction tags for the quote request in real time that indicate date/time stamps associated with a particular type of interaction, which may include viewing, downloading, or editing (1016).

In certain embodiments, one or more of the vendors 1006 receiving the quote request may provide a quote request response indicating updated terms reflective of a current status of a negotiation through interactions with one or more UI screens provided by the platform 1004 (1018). In response, in some implementations, the platform 1004 may provide a quote response notification message to the brokers 1002 indicating that a quote response from a vendor 1006 is available for review (1020).

In some examples, transmission of the quote response notification to the brokers 1002 may trigger the platform 1004 to automatically copy, tag, and store the quote response notification and associated documents as audit trail data in storage locations based on security/access controls for the quote request (1022). For example, the quote request tags may include tags such as a date/time stamp for the quote response transmission, vendor name and contact information for the user providing the quote response, document types, privacy/access settings for the notification message and each associated document, and tags that indicate how any of the quote terms have been modified from the terms of an original quote request. In some examples, the storage locations for the quote request message and associated documents may be determined by the platform 1004 based on the assigned tags. In some aspects, the copying, tagging, and storing of the audit trail data may be performed in real time in response to transmitting the quote response notification.

If the client agrees to the quote response supplied by the vendor 1006, in some implementations, the broker 1002 may issue a client firm order to the platform 1004 (1024). The firm order may either validate the terms of the quote as adjusted by the vendor 1006 or reinstate the initial terms as supplied by the broker 1002 in the quote request. The firm order, in some embodiments, may be placed via a firm order user interface 350 as discussed above (FIG. 3F). In some examples, a firm order notification and any associated documentation may be transmitted by the platform 1004 to contacts associated with the vendor 1006 with a security access level that allows the recipient to at least view the firm order (1026). In some examples, the firm order notification may be transmitted to the vendors 1006 via an email message.

In some implementations, transmission of the firm order notification message to the vendor 1006 may trigger the platform 1004 to automatically copy, tag, and store the firm order and associated documents as audit trail data in storage locations based on security/access controls for the firm order (1028). For example, the firm order tags may include tags such as vendor name associated with the firm order, contact names and email addresses for the vendor, document types, privacy/access settings for the message and each associated document, and date and time stamp indicating when the notification message was transmitted to the vendor 1006. In some examples, the storage locations for the firm order notification message and associated documents may be determined by the platform 1004 based on the assigned tags. In some aspects, the copying, tagging, and storing of the audit trail data may be performed in real time in response to transmitting the firm order notification message.

In some examples, the vendors 1006 may access the firm order and any associated documents at the platform 1004 by selecting a link provided in the firm order notification message (1030). In some implementations, when any of the vendor contacts who received the firm order notification message access the firm order at the platform 1004, the platform 1004 may update interaction tags for the firm order in real time that indicate date/time stamps associated with a particular type of interaction, which may include viewing, downloading, or editing (1032).

Turning to FIG. 10B, in certain embodiments, the vendor 1006 receiving the firm order notification may transmit authorization and/or declination information via UI screens to the platform 1004 along with associated documents indicating agreement with the terms stated in the firm order and/or reasons for a declination of any of the terms (1034). In response, in some implementations, the platform 1004 may provide a results notification message to the brokers 1002 indicating that authorization/declination information from a vendor 1006 is available for review (1036).

In some examples, transmission of the results notification to the brokers 1002 may trigger the platform 1004 to automatically copy, tag, and store the results notification and associated documents as audit trail data in storage locations based on security/access controls for the quote request (1038). For example, the results tags may include tags such as a date/time stamp for the results notification transmission, vendor name and contact information for the user providing the authorization/declination information, document types, privacy/access settings for the results notification message and each associated document, and tags that indicate whether particular terms of the negotiation were authorized and/or declined. In some examples, the storage locations for the results notification message and associated documents may be determined by the platform 1004 based on the assigned tags. In some aspects, the copying, tagging, and storing of the audit trail data may be performed in real time in response to transmitting the results notification.

In some implementations, the broker 1002 may provide client final lines to the platform 1004 indicating finalized transaction terms (1040). In some embodiments, the final lines may include terms/contracts/details contained in one or more documents for sharing with the vendor 1006, which confirms the agreement was reached. In some examples, in response to receiving the client final lines, the platform 1004 may transmit a final lines review notification and any associated documentation to contacts associated with the vendor 1006 with a security access level that allows the recipient to at least view the firm order (1042). In some examples, the final lines review notification may be transmitted to the vendors 1006 via an email message.

In some implementations, transmission of the final lines review notification message to the vendor 1006 may trigger the platform 1004 to automatically copy, tag, and store the firm order and associated documents as audit trail data in storage locations based on security/access controls for the final lines review notification (1044). For example, the final lines tags may include tags such as vendor name associated with the final lines, contact names and email addresses for the vendor, document types, privacy/access settings for the message and each associated document, and date and time stamp indicating when the notification message was transmitted to the vendor 1006. In some examples, the storage locations for the final lines notification message and associated documents may be determined by the platform 1004 based on the assigned tags. In some aspects, the copying, tagging, and storing of the audit trail data may be performed in real time in response to transmitting the final lines review notification message.

In some examples, the vendors 1006 may access a final lines review UI screen and any associated documents at the platform 1004 by selecting a link provided in the final lines review notification message (1046). In some implementations, when any of the vendor contacts who received the final lines review notification message access the final lines review UI screen at the platform 1004, the platform 1004 may update interaction tags for the final lines in real time that indicate date/time stamps associated with a particular type of interaction, which may include viewing, downloading, or editing (1048).

Although illustrated in a particular series of events, in other implementations, the steps of the transaction process 1000 may be performed in a different order. For example, the copying, tagging, and storing of documents and other audit trail data (1012, 1022, 1028, 1038, 1044) may be performed before, after, or simultaneously with the transmission of a corresponding notification message to the brokers 1002 or vendors 1006. Additionally, in other embodiments, the transaction process may include more or fewer steps while remaining within the scope and spirit of the transaction process 1000.

Turning to FIGS. 14A-14I, various dashboard interface screens for managing vendor security access for the system 108 are illustrated. In some implementations, each vendor 104 in the environment (FIG. 1) may control system access for individual users from their respective companies to take a processing and management burden off the brokers 102 through interaction with the dashboard interface screens that are presented to the vendors 104 by the security management engine 152. In some examples, the security management engine 152 may process security modification requests from the vendors 104 to automatically determine whether any requested security updates may result in a document management gap for any transaction documents, update folder security settings for the audit trail data 128, and generate fraud detection reports based on the requested security updates.

Figure 14A:
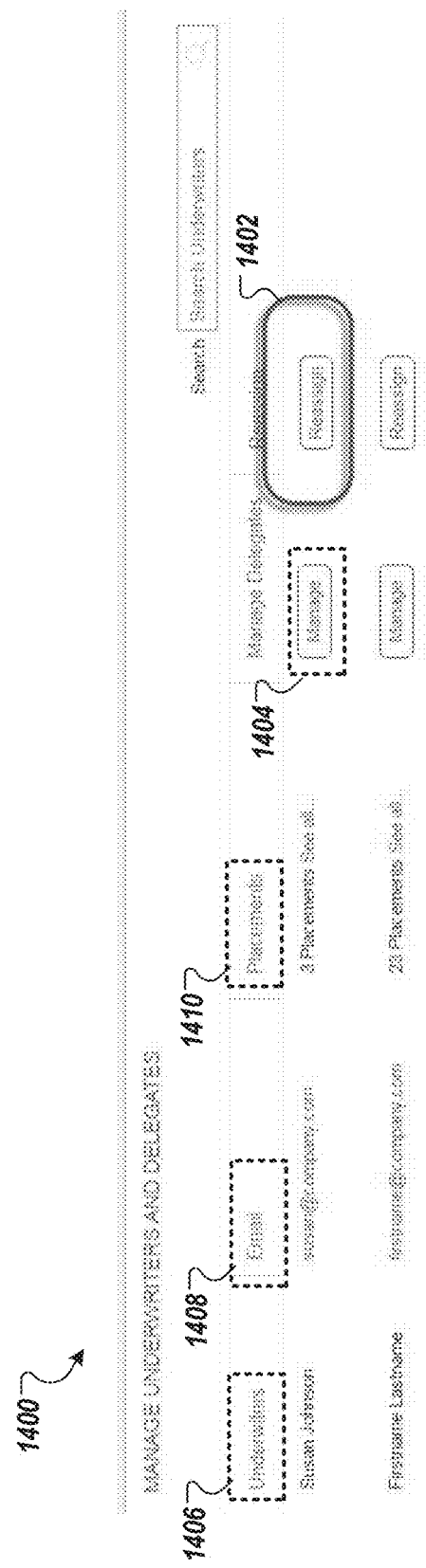

FIG. 14A represents a dashboard interface screen 1400 for managing underwriters and delegates for a vendor. In some implementations, the dashboard interface screen 1400 includes a list view of underwriters 1406 associated with a particular vendor, contact information 1408 (e.g., email address) for each of the underwriters 1406, and assigned placements 1410 (e.g., contracts, transactions) for each of the underwriters 1406. In some examples, the dashboard interface screen 1400 may also include selections to manage 1404 or reassign 1402 one or more of the placements 1410 assigned to an underwriter 1406. For example, in response to receiving a reassign selection 1402, the security management engine 152 may present a series of user interface screens to the vendor 104 that allow the vendor 104 to reassign one or more of the placements 1410 to another underwriter. In response to receiving a manage selection 1404, the security management engine 152 may cause one or more user interface screens to be presented to the vendor 104 that allow the vendor 104 to add and/or remove delegates to act on behalf of an underwriter 1406.

Figure 14B:
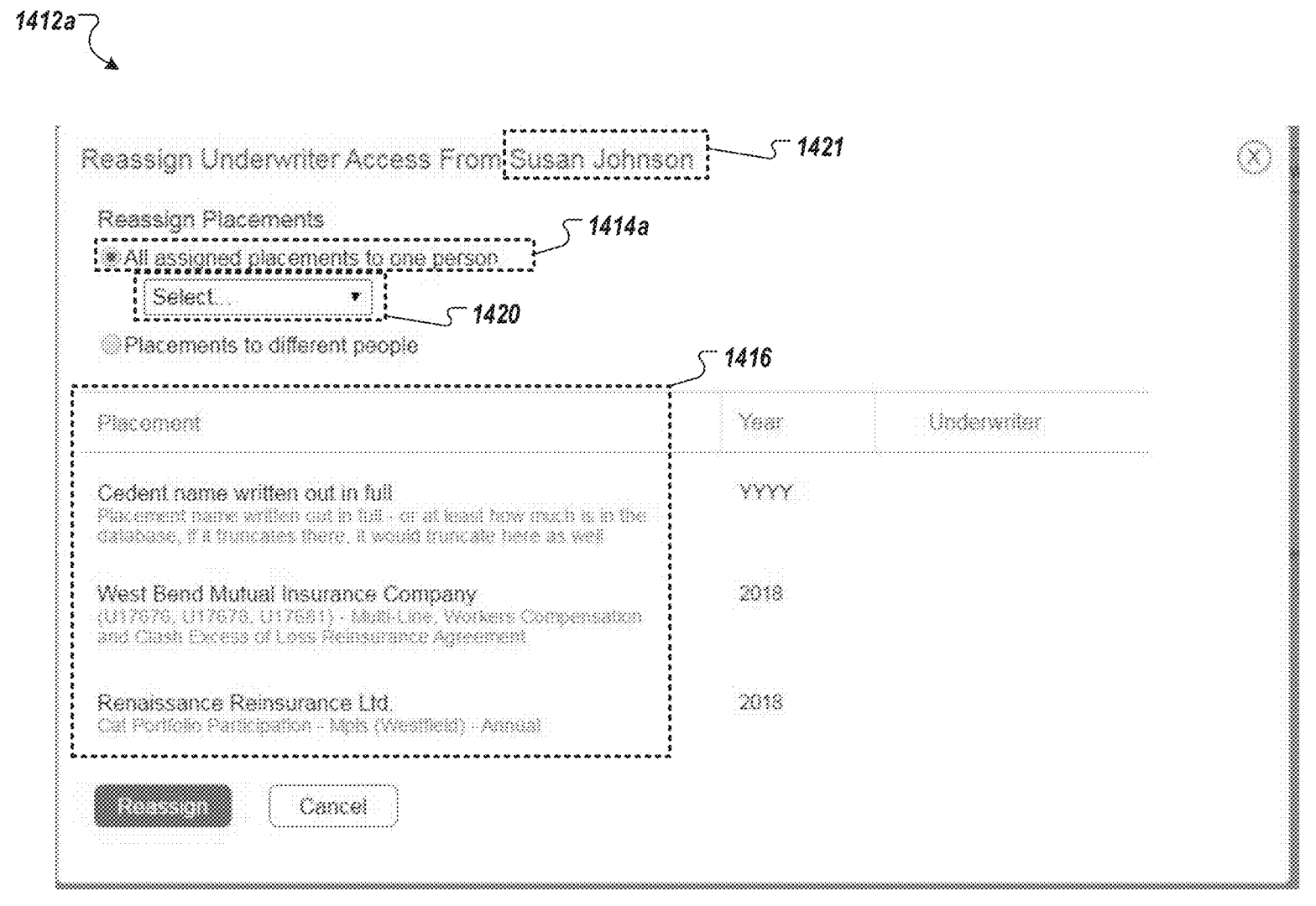
Figure 14C:
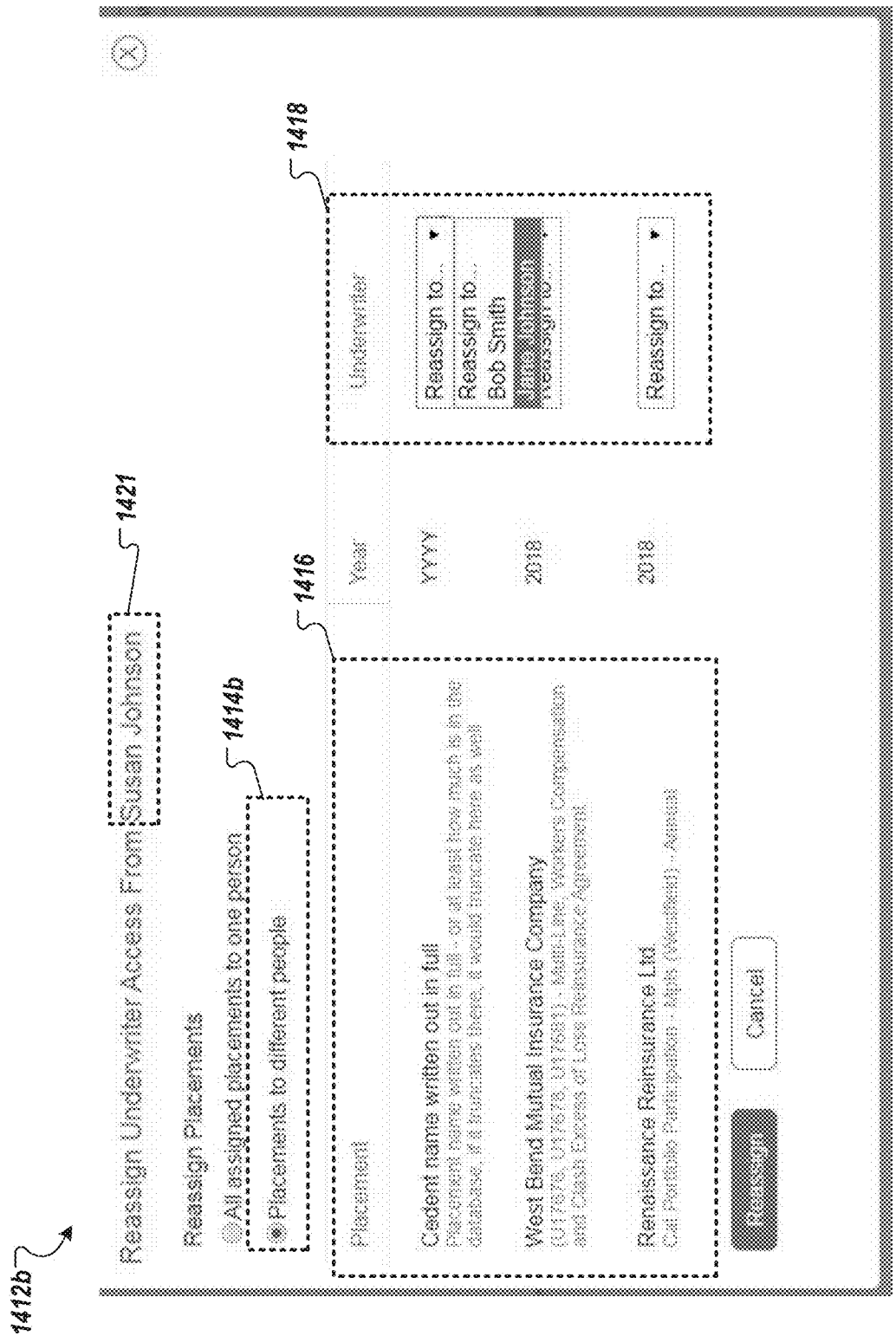

For example, FIGS. 14B-C illustrate dashboard interface screens 1412 for reassigning an underwriter 1406 when the reassign selection 1402 is received from the interface screen 1400 at the security management engine 152. In some implementations, underwriter reassignment may be performed when an underwriter employee leaves the vendor reinsurance company, and the tasks previously assigned to the underwriter are assigned to another underwriter within the company. For example, FIG. 14B shows dashboard interface screen 1412a when a selection 1414a is made to reassign all placements 1416 for one underwriter 1421 to another underwriter that is selected from dropdown menu 1420. In some examples, the dropdown menu 1420 may include a list of the underwriters for the vendor. In one example, the list of underwriters in the dropdown list 1420 may include only those underwriters that have the same security access and editing permissions as the underwriter 1421. FIG. 14C shows dashboard interface screen 1412 when a selection 1414b is made to reassign each placement 1416 for the underwriter 1421 to different underwriters. In some examples, when the selection 1414b is made, dropdown menus 1418 may be displayed on the interface screen 1412b next to each placement 1416 that allows different underwriters to be selected from each of the placements 1416. Just as with the dropdown menu 1420, the dropdown menus 1418 may include a list of the underwriters for the vendor or only those underwriters that have the same security access and editing permissions as the underwriter 1421.

Figure 14D:
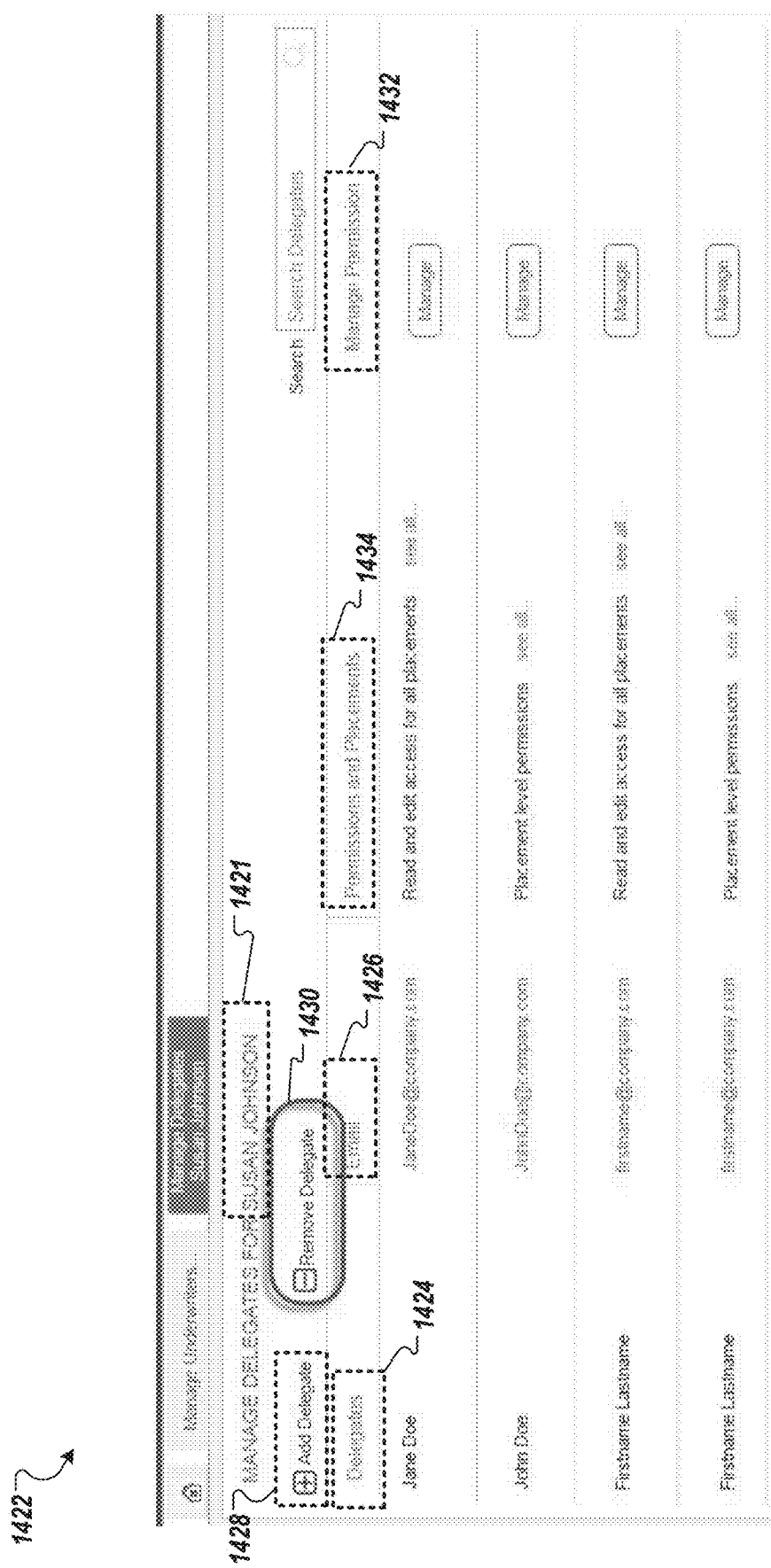
Figure 14E:
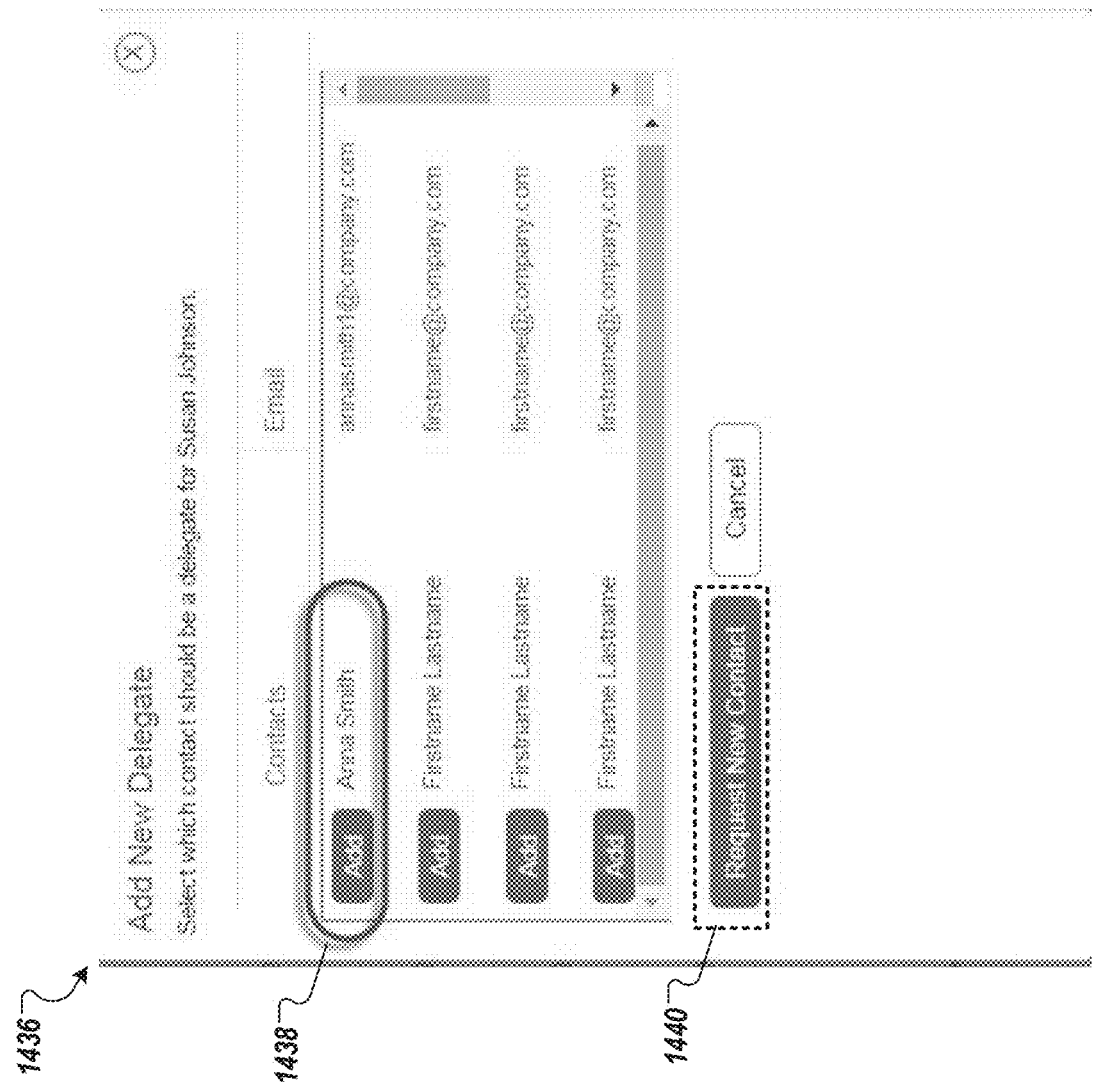
Figure 14G:
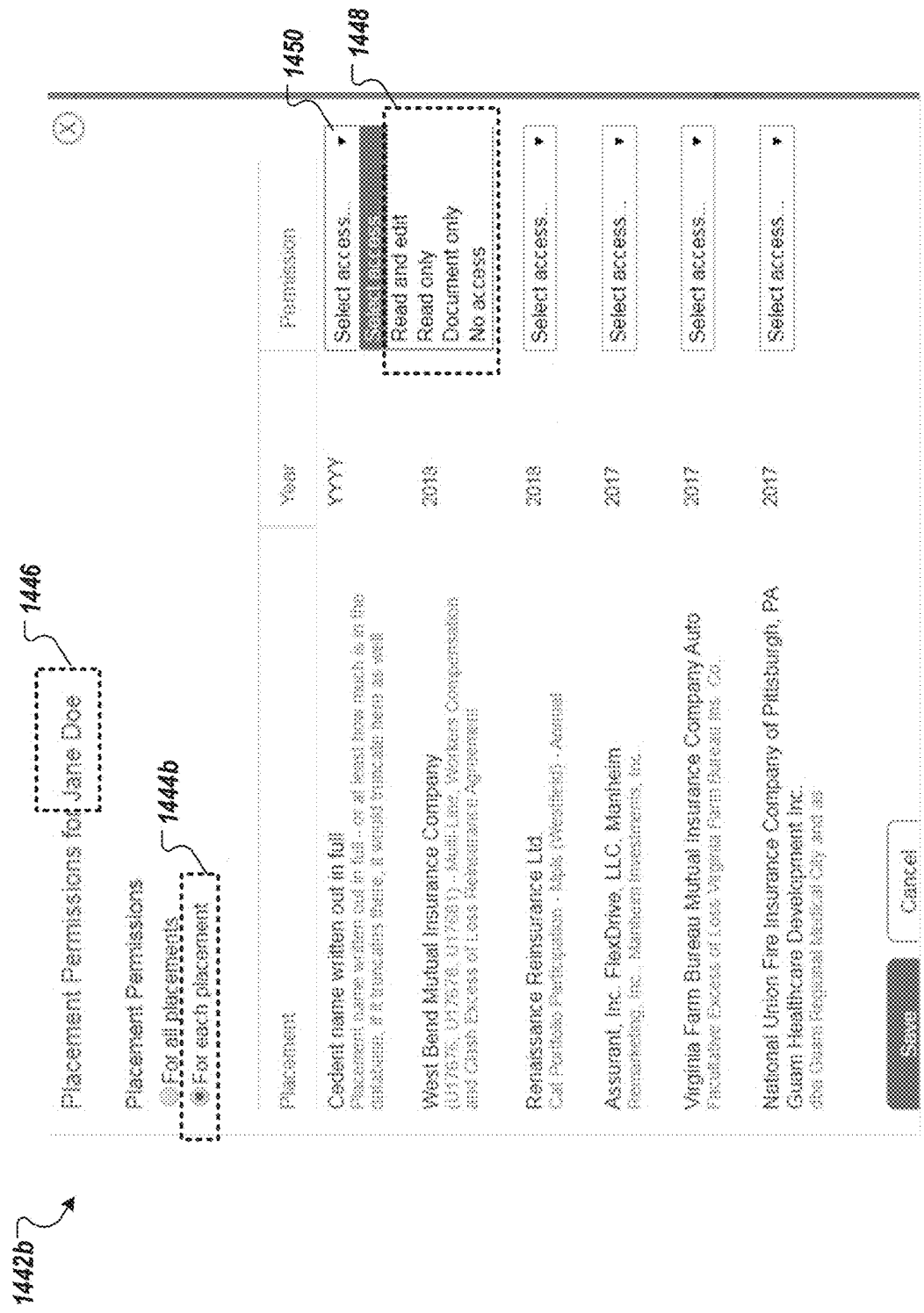
Figure 14H:
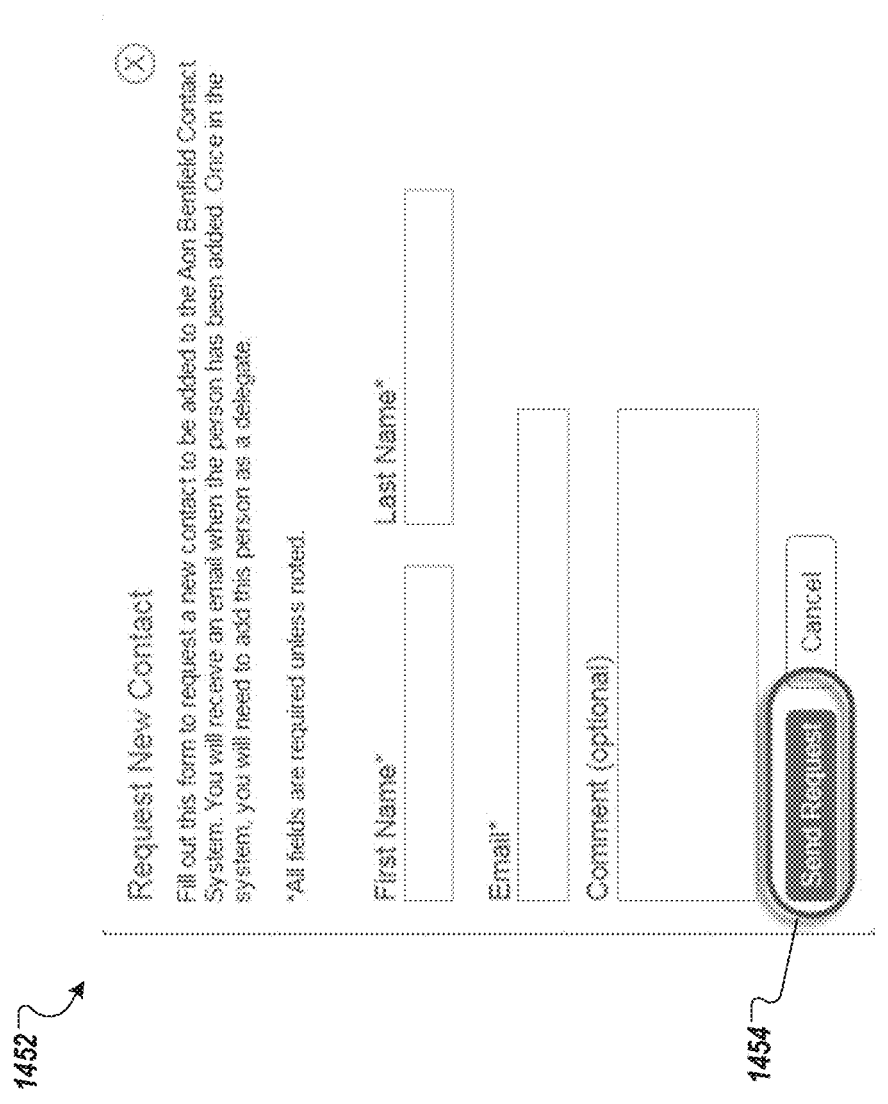
Figure 14I:
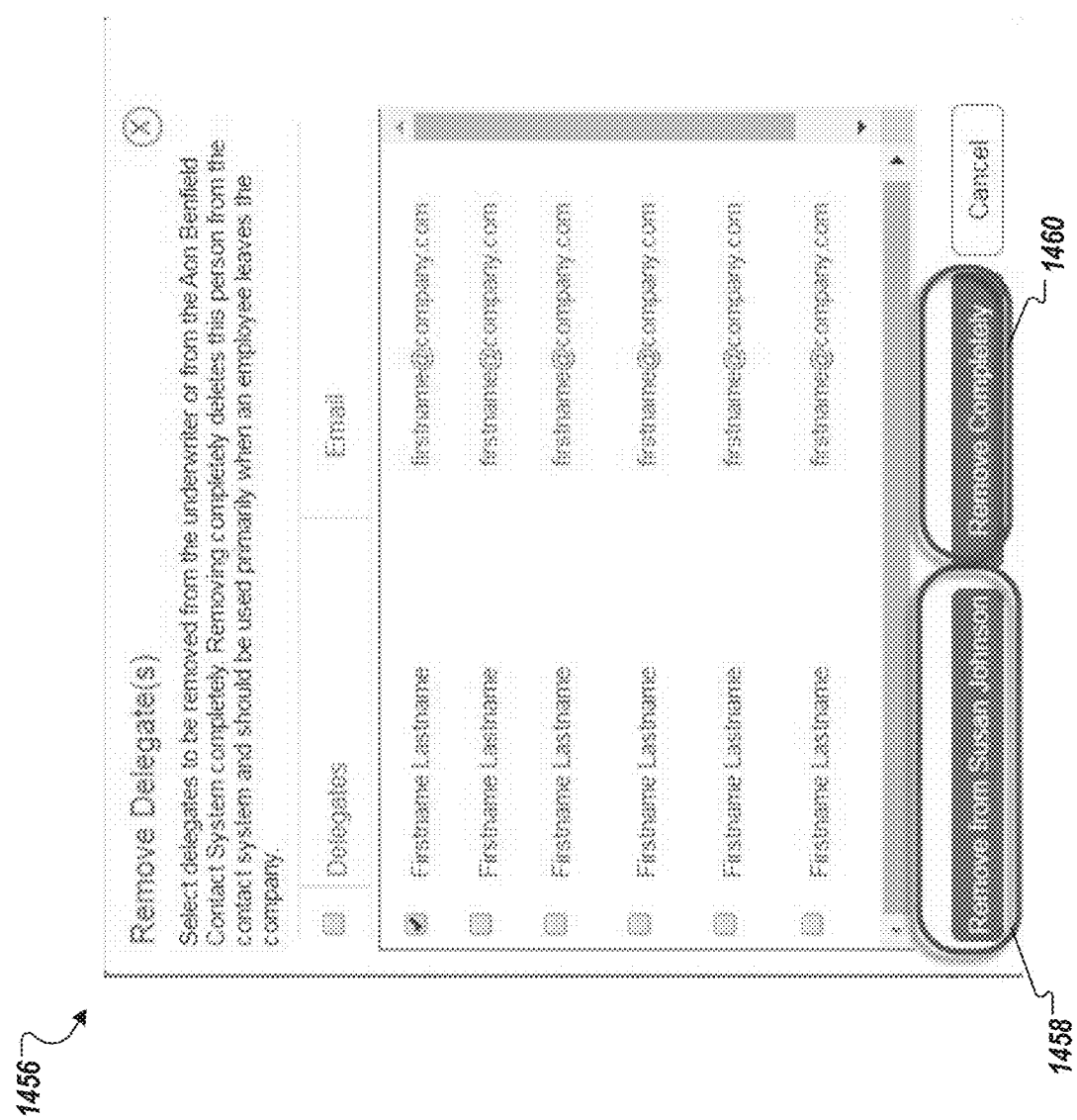

FIGS. 14D-14I illustrate dashboard interface screens 1412 for managing delegates for an underwriter 1406 when the manage selection 1404 is received from the interface screen 1400 at the security management engine 152. In some implementations, delegates may be assigned on behalf of one or more underwriters to carry out one or more differentiated tasks. For example, FIG. 14D represents an overview delegate management dashboard interface screen, FIGS. 14E-14H show a series of dashboard interface screens associated with adding a delegate for an underwriter 1406, and FIG. 14I shows a dashboard interface screen associated with removing a delegate or reducing access levels for a delegate associated with an underwriter 1406.

FIG. 14D represents an overview dashboard interface screen 1422 for managing delegates for an underwriter assigned to and/or employed by a vendor. In some implementations, the dashboard interface screen 1422 includes a list view of delegates 1424 associated with underwriter 1421, contact information 1426 (e.g., email address) for each of the delegates 1424, and placement permissions 1434 for each of the delegates 1424. In some examples, the dashboard interface screen 1422 may also include selections to add 1428 or remove 1430 one or more of the delegates 1424 assigned to the underwriter 1421. The dashboard interface screen 1422 may also include a selection 1432 to manage permissions for individual placements associated with each delegate 1424. In some examples, the delegate 1424 may have the same permissions for all placements assigned to an underwriter 1421, or the delegate may have permissions that are specific to each placement. In some implementations, in response to receiving an add delegate selection 1428, the security management engine 152 may present a series of user interface screens (FIGS. 14E-14H) to the vendor 104 that allow the vendor 104 to link an existing or new delegate to the underwriter 1421. In response to receiving a remove delegate selection 1430, the security management engine 152 may present a user interface screen (FIG. 14I) to the vendor 104 that allow the vendor 104 to remove the delegate from a particular placement or from the system altogether.

FIG. 14E shows an add delegate dashboard interface screen 1436 that is presented to a vendor in response to receiving the add delegate selection 1428 from the overview dashboard interface screen 1422. In some implementations, the dashboard interface screen 1436 allows for addition of an existing delegate 1438 who has already been registered in the system 108. To add a delegate who has not yet been registered in the system 108, selection 1440 may be made. When selection 1438 is made to add an existing contact as a delegate for the underwriter, dashboard interface screen 1442 is displayed, which allows vendors to select placement permissions for the newly added delegate.

For example, FIG. 14F shows an example of a dashboard interface screen 1442a where a selection 1444a is made to assign all placements for the underwriter to the newly added delegate 1446 along with a corresponding permission level 1448 for the delegate 1446. In some examples, the permission level may correspond to allowed tasks the delegate may perform with respect to one or more documents associated with a placement, such as read and edit, read only, document only, or no access. FIG. 14G shows an example of a dashboard interface screen 1442b where a selection 1444b is made to individually assign permission levels 1448 to each placement for the delegate 1446 at individual dropdown menus 1450.

When selection 1440 is made at the delegate dashboard interface screen 1436 to add an unregistered delegate to the system, dashboard interface screen 1452 shown in FIG. 14H is displayed, which allows vendors to input contact information for the unregistered delegate. When the contact information input fields are filled in and submitted by selecting a "send request" selection 1454, the security management engine 152 of the system 108 adds the contact information for the delegate to the vendor data 116 for the vendor. In addition, the delegate may be linked to one or more folders of the data repository 1100 (FIG. 11) to provide access to transaction documents based on the assigned permission levels. Also, a new contact tag may be assigned to the newly added contact for compliance monitoring. For example, newly added contacts may be monitored and cross-referenced to detect fraud situations based on how many contacts have been added by a user and which placements and documents the contacts have access to view and/or edit. In some examples, the security management engine 152 may also perform contact duplication checks for the contact name and/or email address to determine whether the delegate has already been registered with the vendor in the system 108. If a match is detected, then the security management engine 152 may output a contact suggestion notification to determine whether the matched contact corresponds to the contact information input at the dashboard interface screen 1452.

FIG. 14I shows a remove delegate dashboard interface screen 1456 that is presented to a vendor in response to receiving the remove delegate selection 1430 from the overview dashboard interface screen 1422. In some implementations, the vendor may select at least one delegate associated with an underwriter and indicate whether to remove the delegate from being assigned to the underwriter 1458 or to remove the delegate from all system associations 1460. If selection 1460 is made to remove the delegate from all system associations, then the delegate may be unlinked from all assigned placements, tasks, and permissions, which may include unlinking the delegate from one or more assigned folders of the data repository 1100 (FIG. 11) so that the delegate is unable to access any previously-accessible information. In addition, any delegate who is removed completely may not be viewed or externally selected by any underwriter or other user who is accessing the system.

In some examples, when the selection 1460 is made, the security management engine 152 may perform a check to determine whether the delegate is assigned to any contracts, lawsuits, or other work in progress. If the delegate is assigned to any other work currently in progress, then the status of the delegate may be modified to "inactive" so that the delegate is still able to perform tasks associated with the other work. In some implementations where a change in a delegate status may require manual system intervention, the security management engine 152 may flag the delegate with an "other" status. For example, a delegate who has a name and/or address change may be flagged with an "other" status to indicate to a system administrator to verify whether or not a merge of delegate records occurred properly. In another example, if a first vendor company is purchased by a second vendor company, then the security management engine 152 may flag all employees of the first vendor company with an "other" status to indicate that the email extensions for the employees of the first vendor company may need to be updated to reflect the purchase by the second vendor company.

Figure 17:
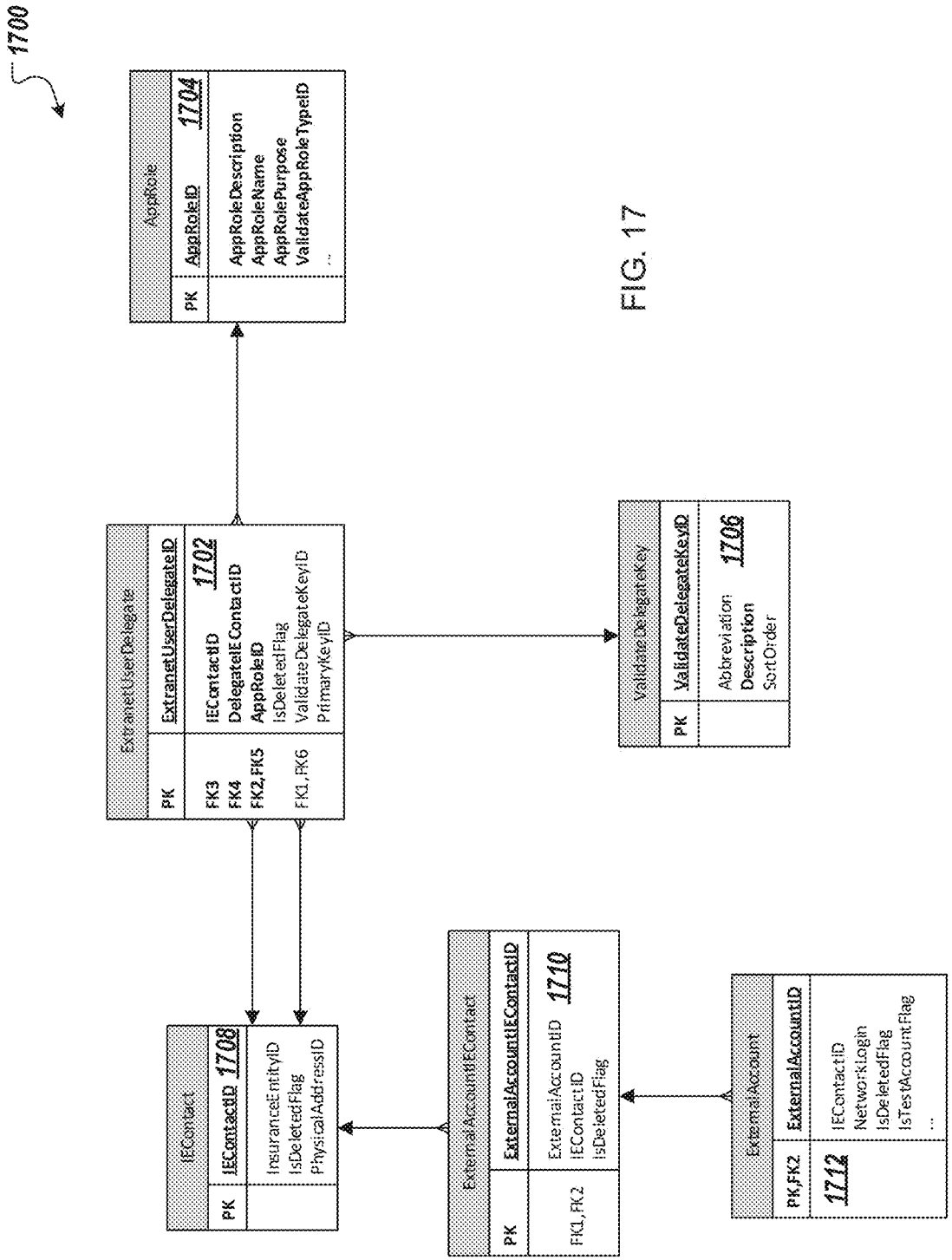
FIGS. 17-18 illustrate entity relationship diagrams for an automated transaction negotiation system.

FIG. 17 illustrates a portion of an entity relationship diagram (ERD) 1700 that allows for maintaining proper security access controls for delegates assigned to a particular underwriter as described above with respect to FIGS. 14A-14I. In some implementations, the relationships within the ERD 1700 may be updated and/or modified based on delegate reassignments, additions, or removals that are made to the system 108 by a system administrator for a particular vendor company. For example, a user that has been added to the system 108 as a delegate can be identified based on a delegate identification block 1702, which may reference a delegate validation key block 1706, an application role identification block 1704, and an insurance entity contact identification block 1708. In addition, the delegate can be further identified based on an external account identification block 1712 and an external account insurance entity contact information block 1710.

Figure 15:
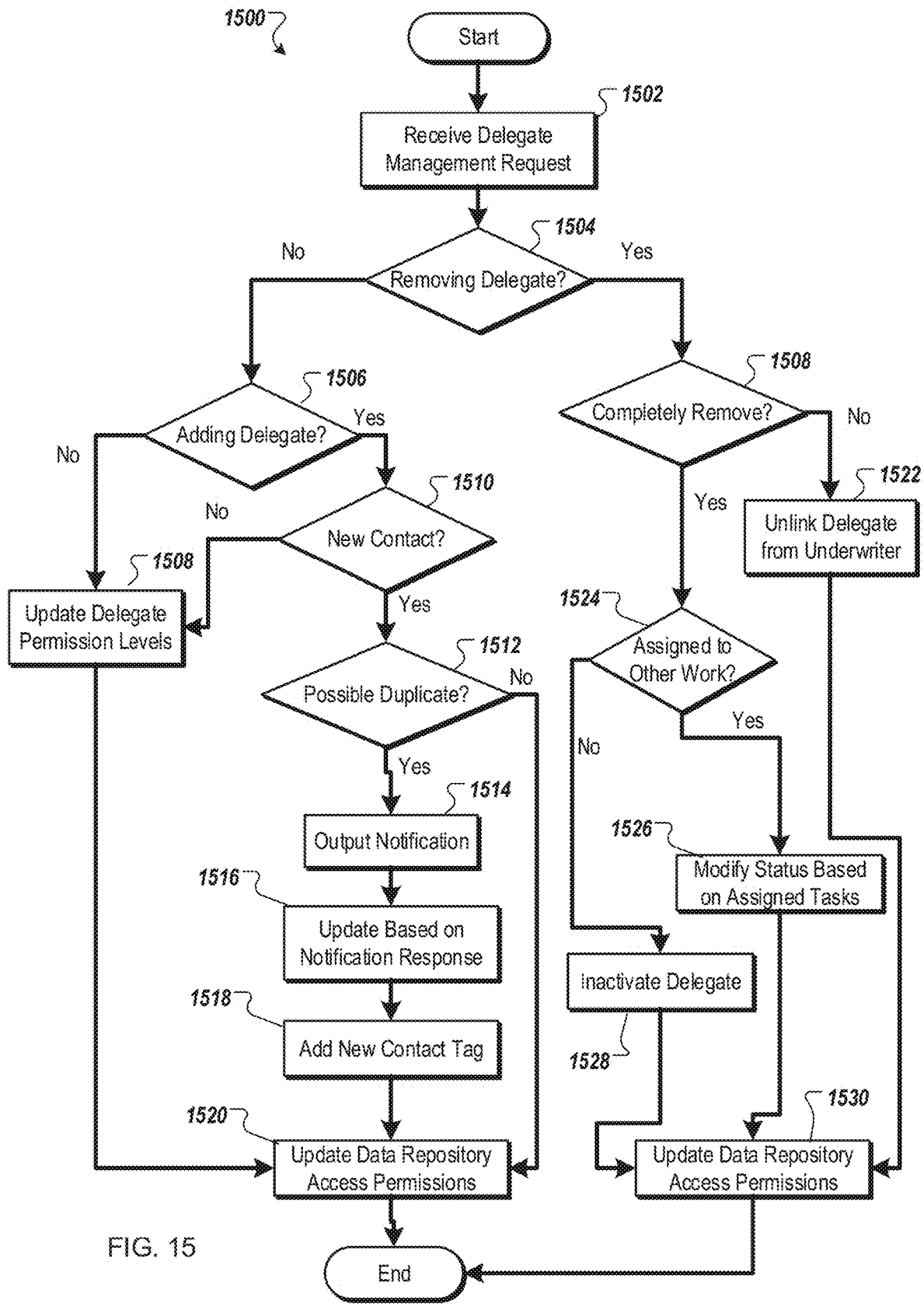
FIG. 15 illustrates a flow diagram of a process for managing delegate assignments to underwriters.

FIG. 15 illustrates a flowchart of a method 1500 for managing delegate assignment and access on behalf of underwriters to a transaction negotiation system. In some implementations, the method begins with receiving a delegate management request (1502) from a vendor to add or remove delegates from an underwriter or modify placement permissions for a delegate. For example, the delegate management request may be submitted at the overview dashboard interface screen 1422 for managing delegates for an underwriter (FIG. 14D), where the vendor can make selections to add a delegate 1428, remove a delegate 1430, and/or manage permissions for delegates assigned to an underwriter 1432.

In certain embodiments, if the received request is not associated with removing a delegate (1504) and not associated with adding a delegate (1506), then the request may be associated with modifying access permission levels for a delegate. In some examples, the system may update stored delegate permission levels based on the submitted modification, which may include modifying the delegate permission level for one or more insurance placements to one of read and edit, read only, document only, or no access (1508). In some implementations, if the received request is associated with adding a delegate to a particular underwriter (1506), and the contact is an existing contact who is already registered in the system (1510), then the system may update the delegate permission levels based on the indicated permission levels included in the delegate management request. For example, the system may update the permission levels based on permission selections 1448 made at the dashboard interface screen 1442 (FIGS. 14F-14G).

If, however, the added delegate is a new contact who is not yet registered in the system (1510), then in some implementations, the submitted contact information for the delegate, such as at dashboard interface screen 1452 (FIG. 14H), is compared to stored contact information to determine whether the new contact may already be registered in the system (1512). If the comparison indicates that duplicate contact information may have been submitted, then in some embodiments, a duplicate suggestion notification may be output to the vendor (1514) to confirm whether the detected duplicate contact is the same contact or not. Based on the received response to the duplicate suggestion notification, in some examples, the system may update the contact information for the newly added delegate (1516).

In some examples, a new contact tag may be assigned to the newly added contact for compliance monitoring (1518).

For example, newly added contacts may be monitored and cross-referenced to detect fraud situations based on how many contacts have been added by a user and which placements and documents the contacts have access to view and/or edit. In addition, in some implementations, the delegate may be linked to one or more folders of a data repository, such as data repository 1100 (FIG. 11), to provide access to transaction documents based on the assigned permission levels (1520).

If the received delegate management request is a delegate removal request (1504), then in some implementations, if the removal request is to remove the delegate from being assigned to one or more underwriters and not to completely remove from the system (1508), then the delegate may be unlinked from the underwriter (1522). If the removal request includes completely removing the delegate from the system (1508), and a check to determine whether the delegate has any other assigned work in the system (1524) indicates that the delegate has no other assigned work in progress (e.g., contracts, law suits), then in some examples, a status of the delegate in the system may be updated to be inactive (1528). If, however, the delegate is assigned to any other work currently that is currently in progress 1524, then, in some examples, the status of the delegate may be modified so that the delegate is still able to perform tasks associated with the other work (1526). In some implementations, access permissions to corresponding folders in the data repository may be removed for the delegate (1530) to reflect the updated delegate status.

Although illustrated in a particular series of events, in other implementations, the steps of the delegate management process 1500 may be performed in a different order. For example, the tagging of the new contact data for the newly added delegate (1518) may be performed before, after, or simultaneously with the updating of the access permissions at the data repository (1520). Additionally, in other embodiments, the transaction process may include more or fewer steps while remaining within the scope and spirit of the delegate management process 1500.

Figure 8A:
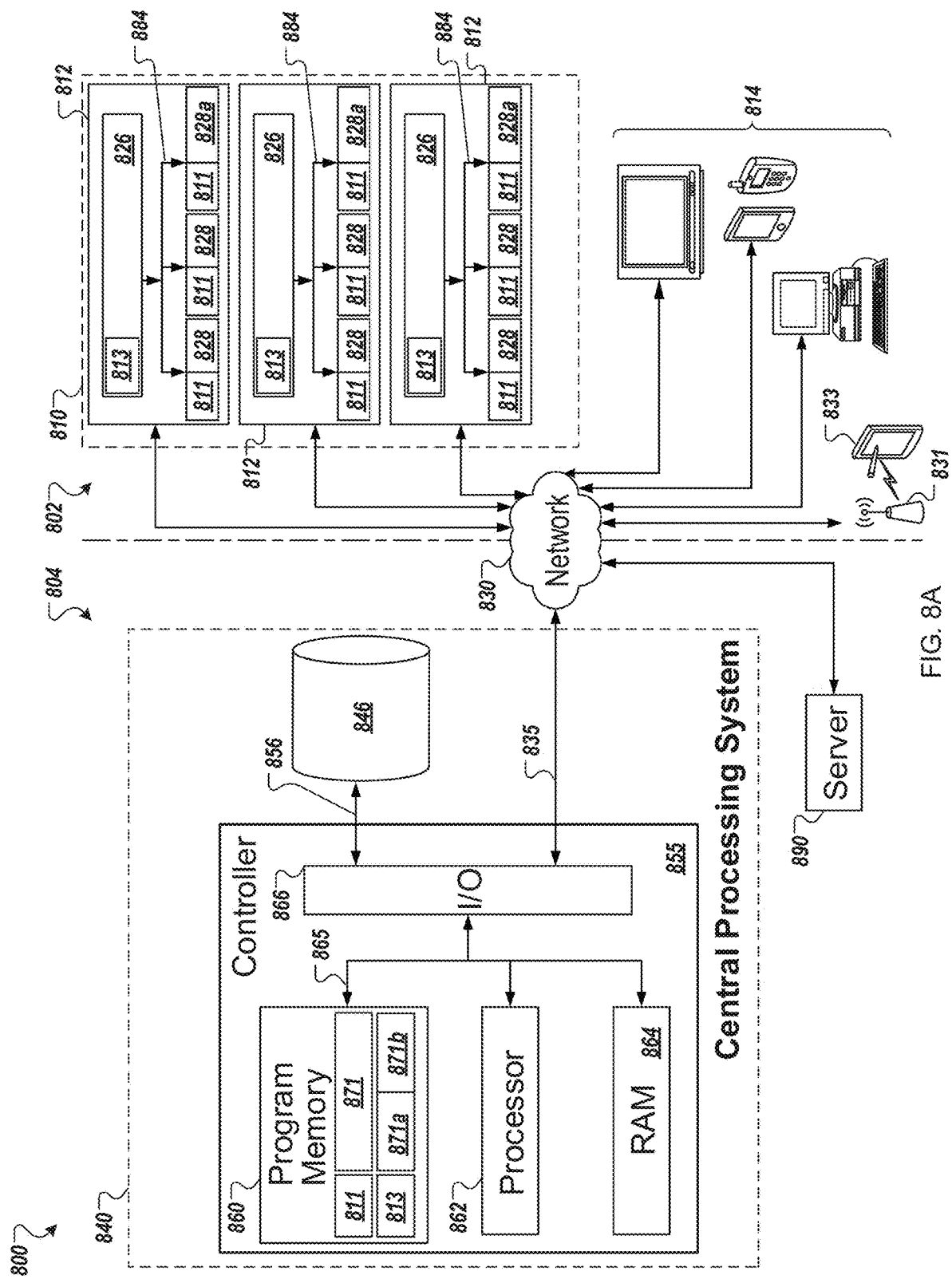
FIGS. 8A and 8B illustrate various aspects of an exemplary architecture implementing a platform for automated transaction negotiation, benchmarking, compliance, and auditing.
Figure 8B:
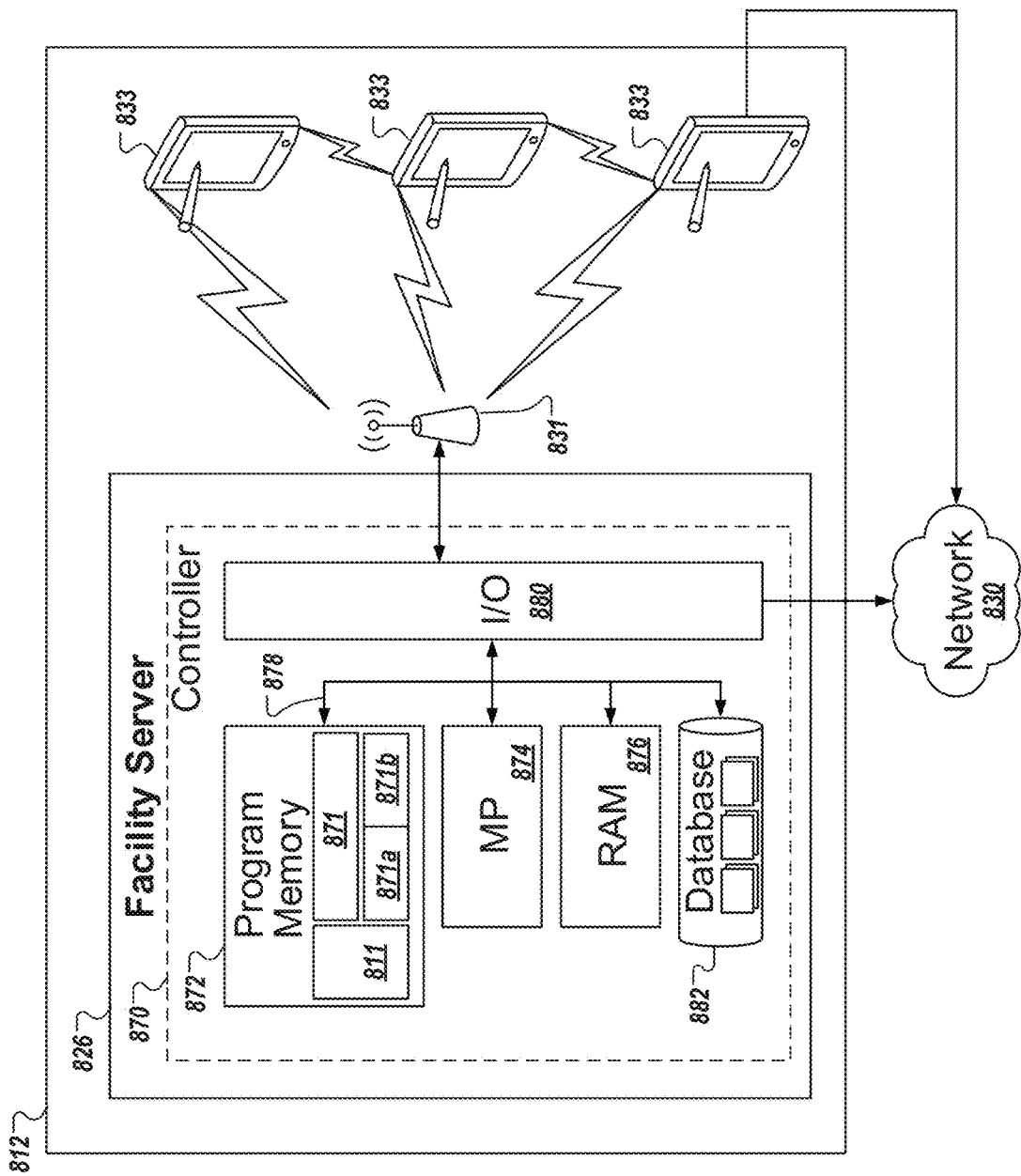

FIGS. 8A and 8B illustrate various aspects of an exemplary architecture implementing a platform 800 for automated transaction negotiation, benchmarking, compliance, and auditing. The high-level architecture includes both hardware and software applications, as well as various data communications channels for communicating data between the various hardware and software components. The platform 800 may be roughly divided into front-end components 802 and back-end components 804. The front-end components 802 are primarily disposed within a client network 810 including one or more clients 812. The clients 812 may be located, by way of example rather than limitation, in separate geographic locations from each other, including different areas of the same city, different cities, different states, or even different countries. The front-end components 802 may include a number of workstations 828. The workstations 828, for example, can be local computers located in the various locations 812 throughout the network 810 and executing various applications for automated transaction negotiation, benchmarking, compliance, and auditing.

Web-enabled devices 814 (e.g., personal computers, tablets, cellular phones, smart phones, web-enabled televisions, etc.) may be communicatively connected to locations 812 and the system 840 through a digital network 830 or a wireless router 2831, as described below.

Referring now to FIG. 8A, the front-end components 802, in some embodiments, include a number of facility servers 826 disposed at the number of locations 812 instead of, or in addition to, a number of workstations 828. Each of the locations 812 may include one or more facility servers 826 that may facilitate communications between the web-enabled devices 814 and the back-end components 804 via a digital network 830, described below, and between the terminals 828, 828A of the locations 812 via the digital network 830, and may store information for a number of customers/employees/accounts/etc. associated with each facility. Of course, a local digital network 884 may also operatively connect each of the workstations 828 to the facility server 826. Unless otherwise indicated, any discussion of the workstations 828 also refers to the facility servers 826, and vice versa. Moreover, environments other than the locations 812, such as the kiosks, call centers, and Internet interface terminals may employ the workstations 828, the web-enabled devices 814, and the servers 826. As used herein, the term "location" refers to any of these points of contact (e.g., call centers, kiosks, Internet interface terminals, etc.) in addition to the locations 812, etc. described above.

The front-end components 802 communicate with the back-end components 804 via the digital network 830. One or more of the front-end components 802 may be excluded from communication with the back-end components 804 by configuration or by limiting access due to security concerns. For example, the web enabled devices 814 may be excluded from direct access to the back-end components 804. In some embodiments, the locations 812 may communicate with the back-end components via the digital network 830. In other embodiments, the locations 812 and web-enabled devices 814 may communicate with the back-end components 804 via the same digital network 830, but digital access rights, IP masking, and other network configurations may deny access of the web-enabled devices 814. The web-enabled devices may also connect to the network 830 via the encrypted, wireless router 831.

The digital network 830 may be a proprietary network, a secure public Internet, a virtual private network or some other type of network, such as dedicated access lines, plain ordinary telephone lines, satellite links, combinations of these, etc. Where the digital network 830 includes the Internet, data communication may take place over the digital network 830 via an Internet communication protocol. In addition to one or more web servers 890 (described below), the back-end components 804 may include a central processing system 840 within a central processing facility. Of course, the locations 812 may be communicatively connected to different back-end components 804 having one or more functions or capabilities that are similar to the central processing system 840. The central processing system 840 may include processing circuitry (e.g., one or more computer processors) 862 adapted and configured to execute various software applications and components of the platform 800, in addition to other software applications, such as a medication management system.

The central processing system 840, in some embodiments, further includes a database 846 (which may include one or more databases). The database 846 can be adapted to store data related to the operation of the platform 800. The central processing system 840 may access data stored in the database 846 when executing various functions and tasks associated with the operation of the platform 800.

Although the platform 800 is shown to include a central processing system 840 in communication with three locations 812, and various web-enabled devices 814 it should be understood that different numbers of processing systems, locations, and devices may be utilized. For example, the digital network 830 (or other digital networks, not shown) may interconnect the platform 800 to a number of included central processing systems 840, hundreds of locations 812, and thousands of web-enabled devices 814. According to the disclosed example, this configuration may provide several advantages, such as, for example, enabling near real-time uploads and downloads of information as well as periodic uploads and downloads of information. This provides for a primary backup of all the information generated in the wireless data transfer process. Alternatively, some of the locations 812 may store data locally on the facility server 826 and/or the workstations 828.

FIG. 8A also depicts one possible embodiment of the central processing system 840. The central processing system 840 may have a controller 855 operatively connected to the database 846 via a link 856 connected to an input/output (I/O) circuit 866. It should be noted that, while not shown, additional databases may be linked to the controller 855 in a known manner.

The controller 855 includes a program memory 860, the processing circuitry 862 (may be called a microcontroller or a microprocessor), a random-access memory (RAM) 864, and the input/output (I/O) circuit 866, all of which are interconnected via an address/data bus 865. It should be appreciated that although only one microprocessor 862 is shown, the controller 855 may include multiple microprocessors 862. Similarly, the memory of the controller 855 may include multiple RAMs 864 and multiple program memories 860. Although the I/O circuit 866 is shown as a single block, it should be appreciated that the I/O circuit 866 may include a number of different types of I/O circuits. The RAM(s) 864 and the program memories 860 may be implemented as semiconductor memories, magnetically readable memories, and/or optically readable memories, for example. A link 835 may operatively connect the controller 855 to the digital network 830 through the I/O circuit 866.

FIG. 8B depicts one possible embodiment of the front-end components 102 [check number] located in one or more of the locations 812 from FIG. 8A. Although the following description addresses the design of the locations 812, it should be understood that the design of one or more of the locations 812 may be different from the design of others of the locations 812. Also, each of the locations 812 may have various different structures and methods of operation. It should also be understood that while the embodiment shown in FIG. 8B illustrates some of the components and data connections that may be present in a location 812, it does not illustrate all of the data connections that may be present in a location 812. For exemplary purposes, one design of a location is described below, but it should be understood that numerous other designs may be utilized.

Each of the locations 812, as illustrated, has one or more portable computing devices 833 (e.g., notebook computers, tablet computers, smart phones, personal data assistants, etc.) and/or a facility server 826. The digital network 884 and wireless router 831 operatively connect the facility server 826 to the number of portable computing devices 833 and/or to other web-enabled devices 814 and workstations 828. The digital network 830 may be a wide area network (WAN), a local area network (LAN), or any other type of digital network readily known to those persons skilled in the art. The digital network 830 may operatively connect the facility server 826, the portable computing devices 833, the workstations 828, and/or the other web-enabled devices 814 to the central processing system 840.

Each portable computing device 833, workstation 828, client device terminal 2828*a*, or facility server 826 includes a controller 870, as depicted in FIG. 8B in relation to the server 826. Similar to the controller 855 from FIG. 8A, the controller 870 includes a program memory 872, processing circuitry (e.g., one or more microcontrollers or microprocessors) 874, a random-access memory (RAM) 876, and an input/output (I/O) circuit 880, all of which are interconnected via an address/data bus 878. In some embodiments, the controller 870 may also include, or otherwise be communicatively connected to, a database 882. The database 882 (and/or the database 846 of FIG. 8A) includes data such as client records, broker, records, reinsurer information records, quote template data, and other rules and miscellaneous information. As discussed with reference to the controller 855, it should be appreciated that although FIG. 8B depicts only one microprocessor 874, the controller 870 may include multiple microprocessors 874. Similarly, the memory of the controller 870 may include multiple RAMs 876 and multiple program memories 872. Although the FIG. 8B depicts the I/O circuit 880 as a single block, the I/O circuit 880 may include a number of different types of I/O circuits. The controller 870 may implement the RAM(s) 876 and the program memories 872 as semiconductor memories, magnetically readable memories, and/or optically readable memories, for example.

Either or both of the program memories 860 (FIG. 8A) and 872 may also contain machine-readable instructions (i.e., software) 871, for execution within the processing circuitry 862 (FIG. 8A) and 874, respectively. The software 871 may perform the various tasks associated with operation of the location or locations, and may be a single module 871 or a number of modules 871*a*, 871*b*. While the software 871 is depicted in FIGS. 8A and 8B as including two modules, 871*a* and 871*b*, the software 871 may include any number of modules accomplishing tasks related to location operation.

In addition to the controller 870, the portable computing devices 833, the workstations 828 and the other web-enabled devices 814 may further include a display and a keyboard as well as a variety of other input/output devices (not shown) such as a scanner, printer, mouse, touch screen, track pad, track ball, isopoint, voice recognition system, digital camera, bar code scanner, RFID reader, etc. A location employee may sign on and occupy each portable computing device 833, workstation 828 or client device terminal 828*a* to assist the employee in performing his or her duties. Employees may sign onto the portable computing device 833, workstation 828 or the client device terminal 828*a* using any available technique, such as entering a user name and password. If an employee signs on to the system using a portable computing device 833, the network 884 communicates this information to the facility server 826, so that the controller 870 may identify which employees are signed onto the platform 800 and which portable computing device 833, workstation 828 or client device terminal 828*a* the employee is signed onto.

Various software applications resident in the front-end components 802 and the back-end components 804 implement functions related to location operation, and provide various user interface means to allow users (e.g., brokers) to access the platform 800. One or more of the front-end components 802 and/or the back-end components 804 may include a user-interface application 811 for allowing a user to input and view data associated with the platform 800, and to interact with the platform described herein. In one embodiment, the user interface application 811 is a web browser client, and the facility server 826 or the central processing system 840 implements a server application 813 for providing data to the user interface application 811. However, the user interface application 811 may be any type of interface, including a proprietary interface, and may communicate with the facility server 826 or the central processing system 840 using any type of protocol including, but not limited to, file transfer protocol (FTP), telnet, hypertext-transfer protocol (HTTP), etc. Moreover, some embodiments may include the user interface application 811 running on one of the web-enabled devices 814, while other embodiments may include the application 811 running on the portable computing device 833 in a location 812. The central processing system 840 and/or the facility server 826 may implement any known protocol compatible with the user-interface application 811 running on the portable computing devices 833, the workstations 828 and the web-enabled devices 814 and adapted to the purpose of receiving and providing the necessary information during the data transfer process.

Figure 8C:
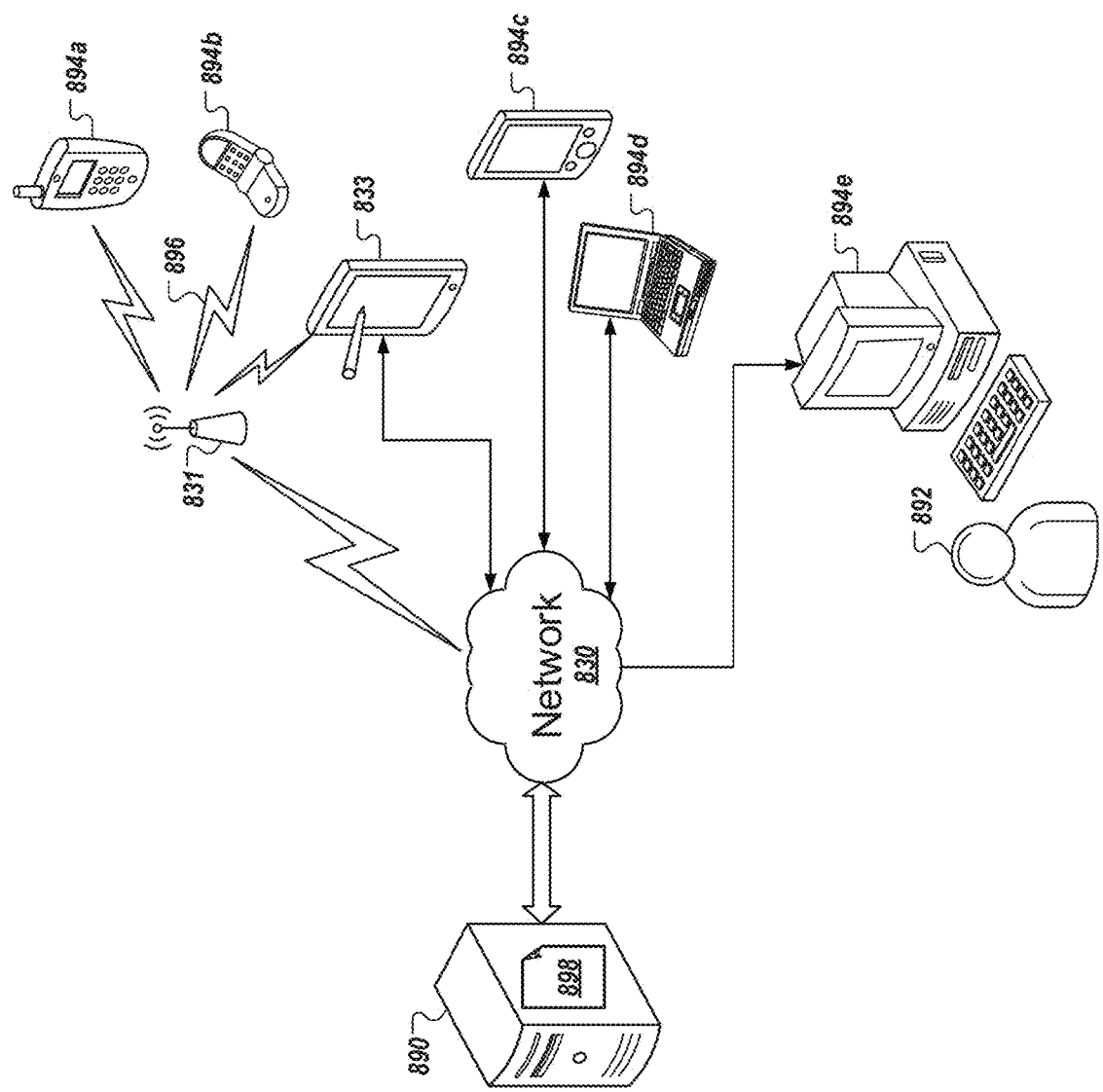
FIGS. 8C and 8D illustrate an example server interface for connecting user computing devices within a platform for automated transaction negotiation, benchmarking, compliance, and auditing.

For purposes of implementing the platform 800, the user interacts with location systems (e.g., the central processing system 840) via a number of web pages. FIG. 8C depicts a web server 890 connected via the network 830 to a number of portable computing devices 833 and other web-enabled devices through which a user 892 may initiate and interact with the platform 800. The web enabled devices may include, by way of example, a smart-phone 894a, a web-enabled cell phone 894b, a tablet computer 833, a personal digital assistant (PDA) 894c, a laptop computer 894d, a desktop computer 894e, a portable media player (not shown), etc. Of course, any web-enabled device appropriately configured may interact with the platform 800. The web-enabled devices 833 and 894 need not necessarily communicate with the network 830 via a wired connection. In some instances, the web enabled devices 833 and 894 may communicate with the network 830 via wireless signals 896 and, in some instances, may communicate with the network 830 via an intervening wireless or wired device 831, which may be a wireless router, a wireless repeater, a base transceiver station of a mobile telephony provider, etc. Each of the web-enabled devices 833 and 894 may interact with the web server 890 to receive web pages, such as the web page 898 depicted in FIG. 8C, for display on a display associated with the web-enabled device 833 and 894. It will be appreciated that although only one web server 890 is depicted in FIG. 8C, multiple web servers 890 may be provided for the purpose of distributing server load, serving different web pages, implementing different portions of the location web interface, etc.

Figure 8D:
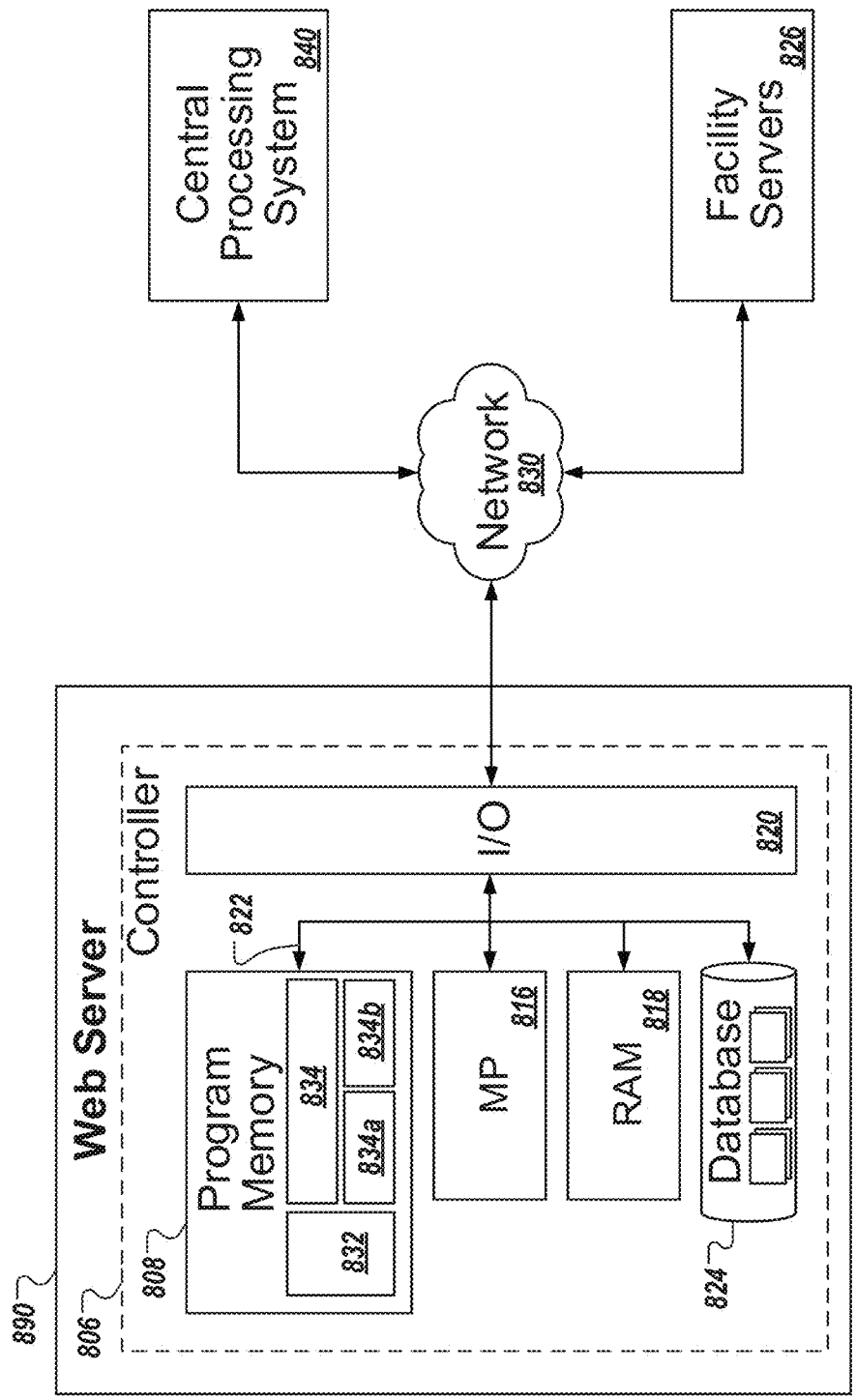

Turning now to FIG. 8D, the web server 890, like the facility server 826, includes a controller 806. Similar to the controllers 855 and 870, the controller 806 includes a program memory 808, processing circuitry (e.g., one or more microcontrollers or microprocessors) 816, a random-access memory (RAM) 818, and an input/output (I/O) circuit 820, all of which are interconnected via an address/data bus 822. In some embodiments, the controller 806 may also include, or otherwise be communicatively connected to, a database 824 or other data storage mechanism (e.g., one or more hard disk drives, optical storage drives, solid state storage devices, etc.). The database 824 may include data such as customer web profiles, product data, web page templates and/or web pages, and other data necessary to interact with the user 892 through the network 830. As discussed with reference to the controllers 855 and 870, it should be appreciated that although FIG. 8D depicts only one microprocessor 816, the controller may include multiple microprocessors 816. Similarly, the memory of the controller 806 may include multiple RAMs 818 and multiple program memories 808. Although the FIG. 8D depicts the I/O circuit 820 as a single block, the I/O circuit 820 may include a number of different types of I/O circuits. The controller 806 may implement the RAM(s) 818 and the program memories 808 as semiconductor memories, magnetically readable memories, and/or optically readable memories, for example.

In addition to being connected through the network 830 to the user devices 833 and 1694, as depicted in FIG. 8C, FIG. 8D illustrates that the web server 890 may also be connected through the network 830 to the central processing system 840 and/or one or more facility servers 826. As described below, connection to the central processing system 840 and/or to the one or more facility servers 826 facilitates the platform 800.

The program memory 808 and/or the RAM 818 may store various applications for execution by the processing circuitry 816. For example, an application 832 may provide a user interface to the server, which user interface may, for example, allow a network administrator to configure, troubleshoot, or test various aspects of the server's operation, or otherwise to access information thereon. A server application 834 operates to populate and transmit web pages to the web-enabled devices 894, receive information from the user 892 transmitted back to the server 890, and forward appropriate data to the central processing system 840 and the facility servers 826, as described below. Like the software 871, the server application 834 may be a single module 834 or a number of modules 834a, 834b. While the server application 834 is depicted in FIG. 8D as including two modules, 834a and 834b, the server application 834 may include any number of modules accomplishing tasks related to implantation of the web server 890. By way of example, the module 834a may populate and transmit the web pages and/or may receive and evaluate inputs from the user 892 to facilitate in the wireless transfer of data from a first tablet to a second tablet, while the module 834b may communicate with one or more of the back end components to provide the requested data.

Typically, a user may launch or instantiate a user interface application (e.g., a web browser or other client application) from a web-enabled device, such as the web-enabled devices 833 and 894, to access the web server 890 cooperating with the system 840 to implement the platform 800.

One or more processors can be utilized to implement any functions and/or algorithms described herein, unless explicitly stated otherwise. Additionally, any functions and/or algorithms described herein, unless explicitly stated otherwise, can be performed upon virtual processing circuitry (e.g., one or more virtual processors, for example on one or more physical computing systems such as a computer farm or a cloud drive).

Reference has been made to flowchart illustrations and block diagrams of methods, systems and computer program products according to implementations of this disclosure. Aspects thereof are implemented by computer program instructions. These computer program instructions may be provided to processing circuitry of a general purpose computer, special purpose computer, or other programmable data processing apparatus to produce a machine, such that the instructions, which execute via the processing circuitry of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system comprising:
   processing circuitry;
   a non-transitory database storage region; and
   a non-transitory computer readable memory coupled to the processing circuitry, the memory storing machine-executable instructions, wherein the machine-executable instructions, when executed on the processing circuitry, cause the processing circuitry to
   receive, from a remote computing device of a first party via a network, a message request for preparing a message to be transmitted to at least one other party,
   provide, in a user interface configured for display on the remote computing device, a message customization user interface including a message template having at least one non-editable input field and at least one editable input field for allowing customization of the message by a user of the remote computing device, wherein the customization user interface includes a document selection portion for presenting one or more documents linked to the message,
   identify, based on the one or more documents linked to the message, one or more message recipients of each party of the at least one other party, wherein the one or more message recipients are identified as having security access permissions corresponding to security access parameters for the one or more documents,
   receive, from the remote computing device responsive to providing the message customization user interface, inputs for the at least one editable input field of the message template,
   convert, responsive to receiving the inputs for the at least one editable input field, the message template into a message transmission format for transmitting the message with the one or more linked documents to at least one remote computing device associated with each party of the at least one other party,
   transmit, to the at least one remote computing device associated with each party of the at least one other party, the message in the message format including the one or more documents,
   automatically generate, in real time responsive to detecting interactions with at least one of the message or a first portion of the one or more linked documents, audit trail data for each of the detected interactions,
       wherein the audit trail data includes one or more data tags associated with legal audit compliance information, and
       wherein generating the audit trail data includes generating copies of a second portion of the one or more linked documents,
   store the audit trail data and the copies of the second portion of the one or more documents in one or more locations of the non-transitory database storage region based on the one or more data tags, and
   output, in real time responsive to receiving a request from a remote computing device of the first party, a summarization of the interactions with the at least one of the message or the first portion of the one or more documents based on respective portions of the generated audit trail data.

2. The system of claim 1, wherein the machine-executable instructions, when executed on the processing circuitry, further cause the processing circuitry to assign a portion of the one or more data tags to at least one of the message or the one or more linked documents, wherein the portion of the one or more data tags are assigned based on a plurality of attributes of both the message and the one or more linked documents that are associated with the legal compliance information.

3. The system of claim 2, wherein the one or more data tags include at least one of vendor information tags associated with a particular vendor of the at least one other party, or vendor interaction tags associated with the particular vendor of the at least one other party.

4. The system of claim 2, wherein each of the one or more locations of the non-transitory database storage region is associated with at least one of the one or more data tags.

5. The system of claim 4, wherein the machine-executable instructions, when executed on the processing circuitry, further cause the processing circuitry to control access by the user to the one or more location of the non-transitory data storage region based on the at least one associated data tag and a security access level of the user.

6. The system of claim 1, wherein the machine-executable instructions, when executed on the processing circuitry, further cause the processing circuitry to provide, within the message, a direct link to the one or more linked documents to provide for direct access of the one or more linked documents by each party of the at least one other party at the at least one remote computing device.

7. The system of claim 6, wherein the machine-executable instructions, when executed on the processing circuitry, further cause the processing circuitry to present, responsive to selection of the direct link to the one or more linked documents within the message at a particular remote computing device, at the at least one remote computing device a document access user interface screen to provide interaction by the at least one user with the one or more linked documents.

8. The system of claim 7, wherein the machine-executable instructions, when executed on the processing circuitry, further cause the processing circuitry to provide, at the document access user interface screen presented at the particular remote computing device, at least one type of interaction with the one or more linked documents based on the security access parameters.

9. The system of claim 8, wherein the at least one type of interaction with the one or more linked documents includes at least one of editing or downloading the one or more linked documents.

10. The system of claim 7, wherein the machine-executable instructions, when executed on the processing circuitry, further cause the processing circuitry to update, responsive to detecting interaction with the one or more linked documents, one or more assigned data tags for the one or more linked documents.

11. The system of claim 1, wherein the machine-executable instructions, when executed on the processing circuitry, further cause the processing circuitry to populate each of the at least one non-editable input field with corresponding vendor information or transaction information, wherein the vendor information relates to a particular party of the at least one other party.

12. A method comprising:
receiving, via a network from a remote computing device of a first party, a message request for preparing a message to be transmitted to at least one other party;
providing, in a user interface configured for display on a remote computing device of the first party, a message customization user interface including a message template having at least one non-editable input field and at least one editable input field for allowing customization of the message by a user of the remote computing device, wherein the customization user interface includes a document selection portion for presenting one or more documents linked to the message;
identifying, based on the one or more documents linked to the message, one or more message recipients from the at least one other party, wherein the one or more message recipients are identified as having security access permissions corresponding to security access parameters for the one or more documents;
receiving, from the remote computing device responsive to providing the message customization user interface, inputs for the at least one editable input field of the message template;
converting, responsive to receiving the inputs for the at least one editable input field, the message template into a message transmission format for transmitting the message with the one or more linked documents to at least one remote computing device associated with each party of the at least one other party;
transmitting, to the at least one remote computing device associated with each party of the at least one other party, the transaction message in the message format including the one or more documents;
automatically generating, in real time responsive to detecting interactions with at least one of the message or a first portion of the one or more linked documents, audit trail data for each of the detected interactions,
wherein the audit trail data includes one or more audit trail tags associated with attributes of the message and the one or more linked documents associated with legal compliance information, and
wherein generating the audit trail data includes generating copies of a second portion of the one or more linked documents;
storing the audit trail data and the copies of the second portion of the one or more documents in one or more portions of a non-transitory database storage region based on the one or more audit trail tags; and
outputting, in real time responsive to receiving a request from a remote computing device of the first party, a summarization of the interactions with the at least one of the message or the first portion of the one or more documents based on respective portions of the generated audit trail data.

13. The method of claim 12, wherein each portion of the one or more portions of the non-transitory database storage region is associated with at least one of the one or more audit trail tags.

14. The method of claim 12, further comprising controlling access by the user to the one or more portions of the non-transitory data storage region based on the at least one associated audit trail tag and a security access level of the user.

15. The method of claim 12, wherein the one or more audit trail tags include at least one of vendor information tags associated with a particular vendor of the at least one other party, or vendor interaction tags associated with the particular vendor of the at least one other party.

16. The method of claim 12, further comprising providing, within the message, a direct link to the one or more linked documents to provide for direct access of the one or more linked documents by each party of the at least one other party at the at least one remote computing device.

17. The method of claim 16, further comprising presenting, responsive to selection of the direct link to the one or more linked documents within the message at a particular remote computing device of the at least one remote computing device, a document access user interface screen to provide interaction by the at least one user with the one or more linked documents.

18. The method of claim 17, further comprising providing, at the document access user interface screen presented at the particular remote computing device, at least one type of interaction with the one or more linked documents based on the security access parameters.

19. The method of claim 17, further comprising updating, responsive to detecting interaction with the one or more linked documents, one or more assigned audit trail tags for the one or more linked documents.

* * * * *